(12) United States Patent
Street et al.

(10) Patent No.: US 7,047,753 B2
(45) Date of Patent: May 23, 2006

(54) REFRIGERATION SYSTEM AND METHOD OF OPERATING THE SAME

(75) Inventors: Norman E. Street, O'Fallon, MO (US); Ted W. Sunderland, Troy, MO (US)

(73) Assignee: Hussmann Corporation, Bridgeton, MO (US)

( * ) Notice: Subject to any disclaimer, the term of this patent is extended or adjusted under 35 U.S.C. 154(b) by 0 days.

(21) Appl. No.: 10/461,202

(22) Filed: Jun. 12, 2003

(65) Prior Publication Data

US 2004/0016251 A1 Jan. 29, 2004

Related U.S. Application Data

(63) Continuation-in-part of application No. 09/849,900, filed on May 4, 2001, now Pat. No. 6,647,735, which is a continuation-in-part of application No. PCT/US01/08072, filed on Mar. 14, 2001, which is a continuation-in-part of application No. 09/524,939, filed on Mar. 14, 2000, now Pat. No. 6,332,327.

(51) Int. Cl.
 F25B 49/02 (2006.01)

(52) U.S. Cl. ............................ 62/126; 62/129; 62/228.3

(58) Field of Classification Search ................. 62/125, 62/126, 127, 129, 130, 228.1, 228.3; 700/79, 700/80, 82, 276, 278
See application file for complete search history.

(56) References Cited

U.S. PATENT DOCUMENTS

| | | | |
|---|---|---|---|
| 3,312,081 A | 4/1967 | Berger et al. | |
| 3,527,059 A | 9/1970 | Rust et al. | |
| 3,735,377 A | 5/1973 | Kaufman | |
| 3,783,681 A | 1/1974 | Hirt et al. | |
| 3,874,187 A | 4/1975 | Anderson | |
| 4,060,716 A | 11/1977 | Pekrul et al. | |
| 4,071,078 A | 1/1978 | Padden | |
| 4,084,388 A | 4/1978 | Nelson | |
| 4,102,394 A | 7/1978 | Botts | |
| 4,152,902 A | 5/1979 | Lush | |
| 4,184,341 A | 1/1980 | Friedman | |
| 4,246,763 A | 1/1981 | Mueller et al. | |
| 4,325,223 A | 4/1982 | Cantley | |
| 4,333,316 A | 6/1982 | Stamp, Jr. et al. | |
| 4,372,119 A | 2/1983 | Gillbrand et al. | |
| 4,381,549 A * | 4/1983 | Stamp et al. ................. 62/126 |

(Continued)

FOREIGN PATENT DOCUMENTS

WO     WO 98/40800     9/1998

(Continued)

OTHER PUBLICATIONS

AS Interface (ASI) News—"AS-Interface accepted as European Standard", 1 page, available at http://www.as-interface.com/news/en50295.html on Sep. 23, 1999.

(Continued)

*Primary Examiner*—Harry B. Tanner
(74) *Attorney, Agent, or Firm*—Michael Best & Friedrich LLP

(57) ABSTRACT

A refrigeration system including an evaporator, a suction header in fluid communication with the evaporator, a compressor in fluid communication with the suction header, and a condenser in fluid communication with the compressor and the evaporator. The refrigeration system further including a controller operable to control the compressor and a sensor coupled to the compressor. The sensor is operable to acquire a parameter for the compressor. The method of operating the refrigeration system includes acquiring a value for the parameter with the sensor, and determining if the sensor is faulty.

26 Claims, 34 Drawing Sheets

U.S. PATENT DOCUMENTS

| | | | |
|---|---|---|---|
| 4,384,462 A | 5/1983 | Overman et al. | |
| 4,390,321 A | 6/1983 | Langlois et al. | |
| 4,390,922 A | 6/1983 | Pelliccia | |
| 4,399,548 A | 8/1983 | Castleberry | |
| 4,425,010 A | 1/1984 | Bryant et al. | |
| 4,429,578 A | 2/1984 | Darrel et al. | |
| 4,479,389 A | 10/1984 | Anderson, III et al. | |
| 4,545,210 A | 10/1985 | Lord | |
| 4,603,348 A | 7/1986 | Yamada et al. | |
| 4,614,089 A | 9/1986 | Dorsey | |
| 4,648,814 A | 3/1987 | Shiibayashi | |
| 4,653,280 A * | 3/1987 | Hansen et al. | 62/127 |
| 4,660,386 A * | 4/1987 | Hansen et al. | 62/126 |
| 4,663,725 A | 5/1987 | Truckenbrod et al. | |
| 4,748,820 A | 6/1988 | Shaw | |
| 4,811,897 A | 3/1989 | Kobayashi et al. | |
| 4,812,997 A | 3/1989 | Okochi et al. | |
| 4,829,779 A | 5/1989 | Munson et al. | |
| 4,842,044 A | 6/1989 | Flanders et al. | |
| 4,884,412 A | 12/1989 | Sellers et al. | |
| 4,885,564 A | 12/1989 | Vercellotti et al. | |
| 4,909,076 A | 3/1990 | Busch et al. | |
| 4,913,625 A | 4/1990 | Gerlowski | |
| 4,951,029 A | 8/1990 | Severson | |
| 4,958,502 A | 9/1990 | Satoh et al. | |
| 4,967,567 A | 11/1990 | Proctor et al. | |
| 5,012,652 A | 5/1991 | Dudley | |
| 5,035,119 A | 7/1991 | Alsenz | |
| 5,050,397 A | 9/1991 | Sugiyama et al. | |
| 5,056,036 A | 10/1991 | Van Bork | |
| 5,062,278 A | 11/1991 | Sugiyama | |
| 5,065,591 A | 11/1991 | Shaw | |
| 5,109,700 A | 5/1992 | Hicho | |
| 5,115,643 A * | 5/1992 | Hayata et al. | 62/115 |
| 5,123,256 A | 6/1992 | Oltman | |
| 5,128,855 A | 7/1992 | Hilber et al. | |
| 5,131,237 A | 7/1992 | Valbjern | |
| 5,142,877 A | 9/1992 | Shimizu | |
| 5,181,389 A | 1/1993 | Hanson et al. | |
| 5,203,178 A | 4/1993 | Shyu | |
| 5,209,076 A | 5/1993 | Kauffman et al. | |
| 5,224,835 A | 7/1993 | Oltman | |
| 5,231,846 A | 8/1993 | Goshaw et al. | |
| 5,249,429 A | 10/1993 | Hanson | |
| 5,279,458 A | 1/1994 | DeWolf et al. | |
| 5,323,385 A | 6/1994 | Jurewicz et al. | |
| 5,327,742 A | 7/1994 | Duff et al. | |
| 5,362,206 A | 11/1994 | Westerman et al. | |
| 5,381,692 A | 1/1995 | Winslow et al. | |
| 5,390,206 A | 2/1995 | Rein et al. | |
| 5,437,163 A | 8/1995 | Jurewicz et al. | |
| 5,448,230 A | 9/1995 | Schanker et al. | |
| 5,460,006 A | 10/1995 | Torimitsu | |
| 5,465,081 A | 11/1995 | Todd | |
| 5,499,512 A | 3/1996 | Jurewicz et al. | |
| 5,509,786 A | 4/1996 | Mizutani et al. | |
| 5,515,693 A | 5/1996 | Cahill-Obrien et al. | |
| 5,533,347 A | 7/1996 | Ott et al. | |
| 5,561,817 A | 10/1996 | McCormack et al. | |
| 5,566,879 A | 10/1996 | Longtin | |
| 5,577,390 A | 11/1996 | Kaido et al. | |
| 5,586,444 A | 12/1996 | Fung | |
| 5,586,446 A | 12/1996 | Torimitsu | |
| 5,592,824 A | 1/1997 | Sogabe et al. | |
| 5,596,878 A | 1/1997 | Hanson et al. | |
| 5,598,566 A | 1/1997 | Pascucci et al. | |
| 5,602,757 A | 2/1997 | Haseley et al. | |
| 5,610,339 A | 3/1997 | Haseley et al. | |
| 5,626,027 A | 5/1997 | Dormer et al. | |
| 5,630,324 A | 5/1997 | Yoshida et al. | |
| 5,634,345 A | 6/1997 | Alsenz | |
| 5,647,223 A | 7/1997 | Wada et al. | |
| 5,701,482 A | 12/1997 | Harrison et al. | |
| 5,707,210 A | 1/1998 | Ramsey et al. | |
| 5,713,724 A | 2/1998 | Centers et al. | |
| 5,763,959 A | 6/1998 | Chambers | |
| 5,797,729 A | 8/1998 | Rafuse et al. | |
| 5,822,739 A | 10/1998 | Kara | |
| 5,825,664 A | 10/1998 | Warrior et al. | |
| 5,853,123 A | 12/1998 | Okano et al. | |
| 5,884,072 A | 3/1999 | Rasmussen | |
| 5,940,337 A | 8/1999 | Jiang | |
| 5,950,709 A | 9/1999 | Krueger et al. | |
| 5,975,854 A | 11/1999 | Culp, III et al. | |
| 5,984,645 A | 11/1999 | Cummings | |
| 6,005,424 A | 12/1999 | Douglass | |
| 6,018,957 A * | 2/2000 | Katra et al. | 62/175 |
| 6,041,605 A | 3/2000 | Heinrichs | |
| 6,098,413 A | 8/2000 | Wada | |
| 6,125,642 A | 10/2000 | Seener et al. | |
| 6,178,362 B1 | 1/2001 | Woolard et al. | |
| 6,294,889 B1 | 9/2001 | Briant et al. | |
| 6,302,654 B1 | 10/2001 | Millet et al. | |
| 6,332,327 B1 | 12/2001 | Street et al. | |
| 6,427,461 B1 | 8/2002 | Whinery et al. | |
| 6,449,715 B1 | 9/2002 | Krivoshein | |
| 6,533,552 B1 | 3/2003 | Centers et al. | |
| 6,647,735 B1 | 11/2003 | Street et al. | |
| 2003/0037555 A1 | 2/2003 | Street et al. | |
| 2004/0093879 A1 | 5/2004 | Street | |

FOREIGN PATENT DOCUMENTS

| | | |
|---|---|---|
| WO | WO 99/17066 | 4/1999 |
| WO | WO 99/24771 | 5/1999 |
| WO | WO 01/069147 | 9/2001 |
| WO | WO 02/075227 | 9/2002 |

OTHER PUBLICATIONS

AS Interface (ASI) News—"Technical Enhancements Extend AS-Interface Capabilities", 2 pages, dated Oct. 28, 1998, available at http://www.as-interface.com/news/en50295.html on Sep. 23, 1999.

Siemens Manual, "Actuator Sensor Interface—System Description", May 1996, Siemens Aktiengesellschaft, Germany, 63 pages.

Siemens Manual, "Actuator Sensor Interface", 1999, Siemens Energy & Automation, Inc., Batavia, Illinois, 128 pages.

Echelon Corporation—"Introduction to the LonWorks® System" (Version 1.0), Published by Echelon Corporation, Palo Alto, California, 1999, 74 pages.

Michael R. Tennefoss, "Echelon White Paper: Implementing Open, Interoperable Building Control systems", Published by Echelon Corporation, Palo Alto, California, 2000, 14 pages.

American Microsystems, Inc., "A2SITM Advanced AS-Interface IC", Published by American Microsystems, Inc., Pocatello, Idaho, Mar. 2000, 27 pages.

Norman E Street et al., U.S. Appl. No. 10/461,123, filed Jun. 13, 2003.

Norman E. Street et al., U.S. Appl. No. 10/460,925, filed Jun. 13, 2003.

Norman E. Street et al., U.S. Appl. No. 10/461,201, filed Jun. 13, 2003.

Norman E. Street et al., U.S. Appl. No. 10/461,711, filed Jun. 13, 2003.

* cited by examiner

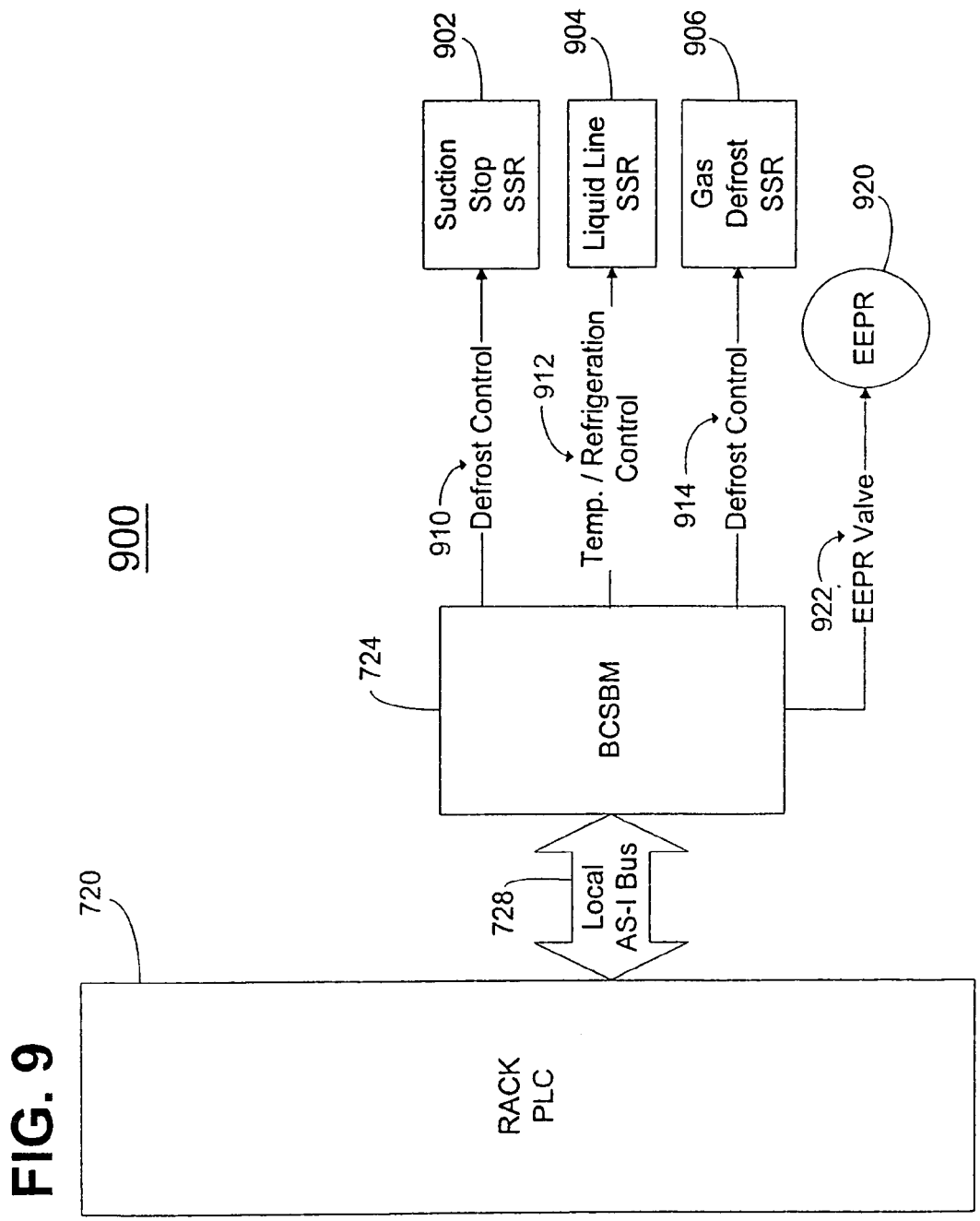

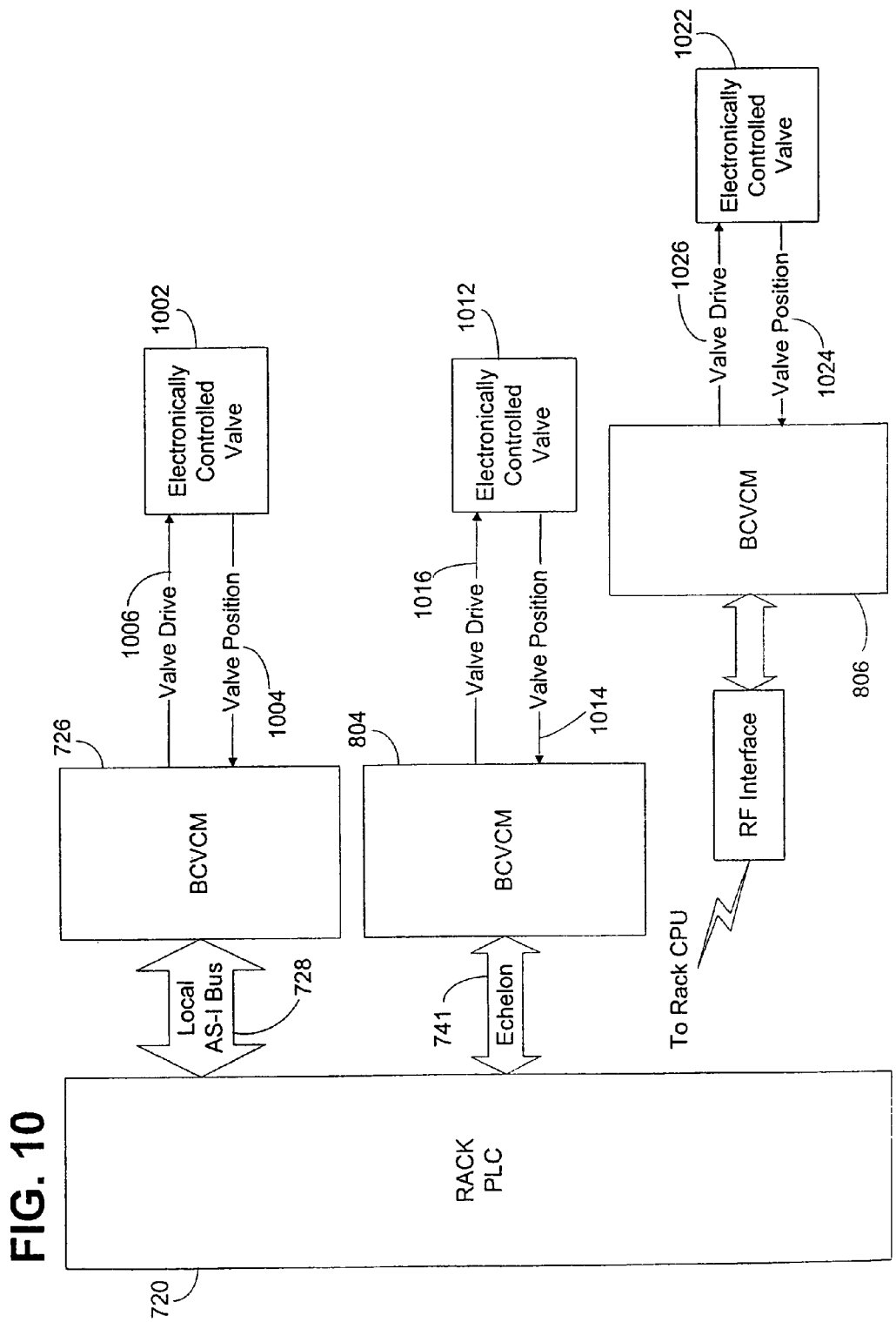

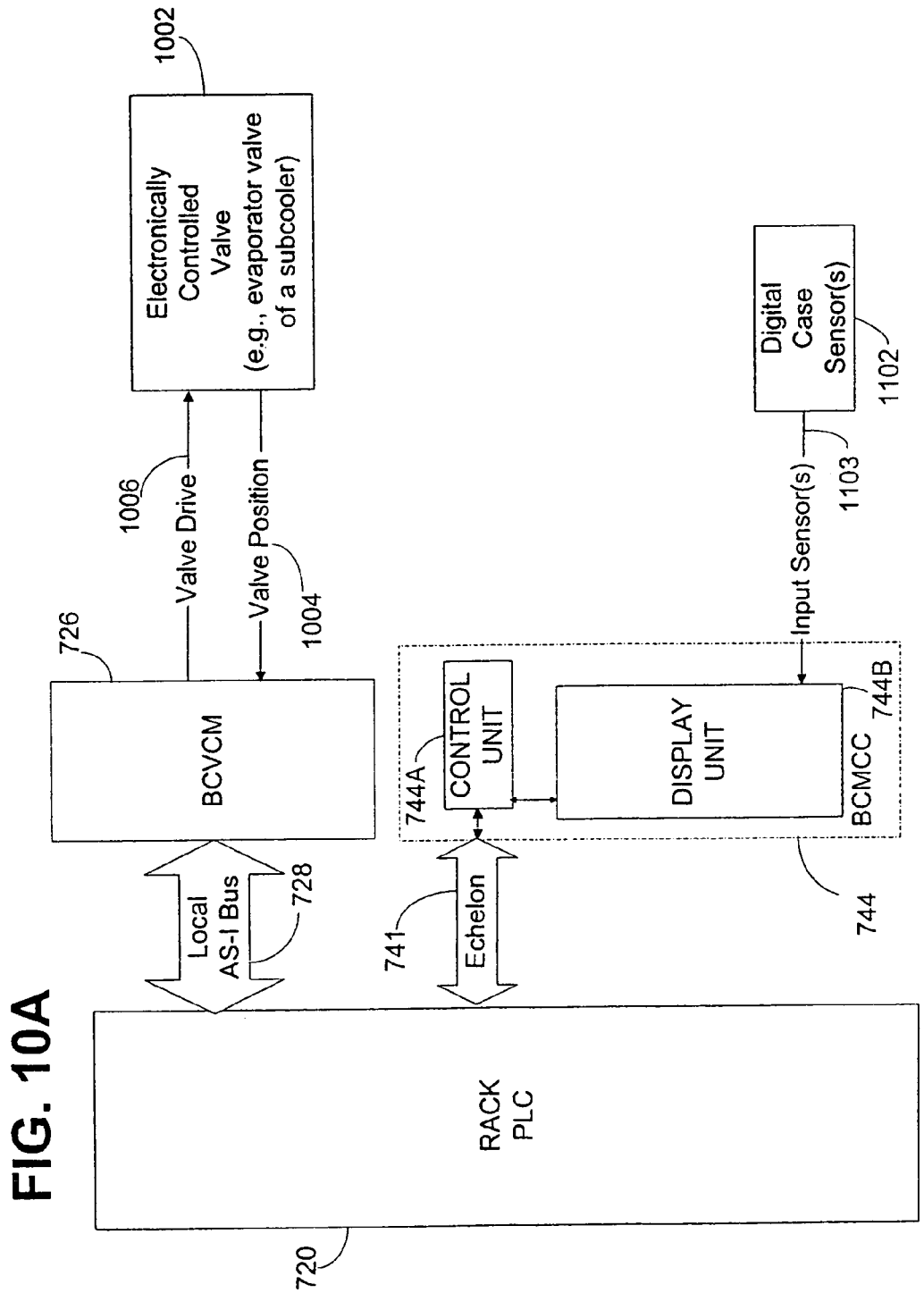

RACK DATA

| PARAMETER | SOURCE | AUTO | MANUAL | STORAGE | CALCULATION PARAMETERS |
|---|---|---|---|---|---|
| RACK NAME | OPERATOR INPUT | | X | C<>P | |
| OPERATING VOLTAGE | OPERATOR INPUT | | X | C<>P>M | |
| REFRIGERANT TYPE | OPERATOR INPUT | | X | C<>P | |
| NUMBER OF SUCTION GROUPS | OPERATOR INPUT | | X | C<>P | |
| NUMBER OF SYSTEMS (N) | NETWORK QUERY | X | | C<>P<AM | TOTAL OF RESPONDING ADDRESSES |
| NUMBER OF COMPRESSORS (N) | NETWORK QUERY | X | | C<>P<AM | TOTAL OF RESPONDING ADDRESSES |
| FLOODING VALVE INSTALLED | NETWORK QUERY | X | | C<>P<AM | |
| RECEIVER PRESSURE REGULATOR INSTALLED | NETWORK QUERY | X | | C<>P<AM | |
| AUTO SURGE VALVE INSTALLED | NETWORK QUERY | X | | C<>P<AM | |
| MAIN LIQUID VALVE INSTALLED | NETWORK QUERY | X | | C<>P<AM | |
| MAIN LIQUID VALVE TYPE | BCVCM | X | | C<P<M | |
| NUMBER OF SATELLITES | OPERATOR INPUT | | X | C<>P | |
| HEAT RECLAIM INSTALLED | OPERATOR INPUT | | X | C<>P | |
| HEAT RECLAIM CONTROL TYPE | OPERATOR INPUT | | X | C<>P | |

SUCTION GROUP DATA

| PARAMETER | SOURCE | AUTO | MANUAL | STORAGE | CALCULATION PARAMETERS |
|---|---|---|---|---|---|
| GROUP NUMBER | OPERATOR INPUT | | X | C<>P | |
| GROUP NAME | OPERATOR INPUT | | X | C<>P | |
| SUCTION PRESSURE SET POINT | CALCULATED | X | | C<>P | REFRIGERANT TYPE, CASE DISCHARGE AIR SET POINT |
| SUCTION PRESSURE HIGH ALARM | CALCULATED | X | | C<>P | REFRIGERANT TYPE, CASE DISCHARGE AIR SET POINT, SUCTION PRESSURE SET POINT |
| SUCTION PRESSURE LOW ALARM | CALCULATED | X | | C<>P | REFRIGERANT TYPE, CASE DISCHARGE AIR SET POINT, SUCTION PRESSURE SET POINT |
| SUCTION PRESSURE RESENT (SPR) INSTALLED | OPERATOR INPUT | | X | C<>P | |
| SPR CONTROL INPUT SYSTEM | CALCULATED | X | | C<>P | LOWEST SYSTEM DISCHARGE AIR TEMP SP |
| ALL COMPRESSORS OFF ALARM ENABLED | OPERATOR INPUT | | X | C<>P | |

COMPRESSOR DATA (REPEATED FOR COMPRESSORS 1-N) ← 1900

| PARAMETER | SOURCE | AUTO | MANUAL | STORAGE | CALCULATION PARAMETERS |
|---|---|---|---|---|---|
| COMPRESSOR MODEL NUMBER | BCCSCM | X | | C<P<M | |
| COMPRESSOR NUMBER | OPERATOR INPUT | | X | C<>P | |
| OPERATING CURRENT DATA | COMPRESSOR DATABASE | X | | C>P>M | |
| MOTOR CURRENT LIMIT | COMPRESSOR DATABASE | X | | C>P>M | |
| DISCHARGE PRESSURE HIGH LIMIT | COMPRESSOR DATABASE | X | | C>P>M | |
| DISCHARGE TEMPERATURE HIGH LIMIT | COMPRESSOR DATABASE | X | | C>P>M | |
| SUCTION GROUP ASSIGNMENT | OPERATOR INPUT | | X | C<>P | |
| CUT-IN PRESSURE (FAIL MODE) | CALCULATED | X | | C>P>M | SUCTION PRESSURE SET POINT, COMPRESSOR CAPACITY IN BTU/H, RUN TIME |
| CUT-OUT PRESSURE (FAIL MODE) | CALCULATED | X | | C>P>M | SUCTION PRESSURE SET POINT, COMPRESSOR CAPACITY IN BTU/H, RUN TIME |
| COMPRESSOR TYPE | COMPRESSOR DATABASE | X | | C>P | |
| OIL FAIL INPUT | COMPRESSOR DATABASE | X | | C>P>M | |
| AS-I ADDRESS | NETWORK QUERY | X | | C<>P<AM | |
| COMPRESSOR CAPACITY IN BTU/H | CALCULATED | X | | C>P>M | CURRENT SUCTION PRESSURE, REFRIGERANT TYPE, CURRENT DISCHARGE PRESSURE |
| MOTOR TEMPERATURE LIMIT | COMPRESSOR DATABASE | X | | C>P>M | |
| MOTOR VOLTAGE LIMIT HIGH | CALCULATED | X | | C<P<M | OPERATING VOLTAGE |
| MOTOR VOLTAGE LIMIT LOW | CALCULATED | X | | C<P<M | OPERATING VOLTAGE |

FIG. 19

SYSTEM DATA (REPEATED FOR COMPRESSORS 1-N) — 2000

| PARAMETER | SOURCE | AUTO | MANUAL | STORAGE | CALCULATION PARAMETERS |
|---|---|---|---|---|---|
| SYSTEM NAME | OPERATOR INPUT | | X | C<>P | |
| SYSTEM NUMBER | OPERATOR INPUT | | X | C<>P | |
| SYSTEM TEMPERATURE INPUT SOURCE | OPERATOR INPUT | | X | C<>P | |
| CASE MODEL NUMBER | BCSBM/BCMCC | X | | C<>P<M | |
| TEMPERATURE CONTROL ENABLED | OPERATOR INPUT | | X | C<>P>M | |
| TEMPERATURE CONTROL DEVICE | OPERATOR INPUT | | X | C<>P>M | |
| CASE DISCHARGE AIR SET POINT | CASE DATABASE | X | | C>P>M | |
| SUCTION GROUP ASSIGNMENT | OPERATOR INPUT | | X | C<>P>M | |
| CASE LOAD IN BTU/H | CASE DATABASE | X | | C>P>M | |
| SYSTEM LOAD IN BTU/H | CALCULATED | X | | C<>P>M | NUMBER OF CASES, CASE LOAD IN BTU/H |
| NUMBER OF CASES | OPERATOR INPUT | | X | C<>P | |
| AS-I ADDRESS | NETWORK QUERY | X | | C<>P<AM | |
| NUMBER OF DEFROSTS PER DAY | CASE DATABASE | X | | C>P>M | |
| DEFROST TYPE | OPERATOR INPUT | | X | C<>P>M | |
| DEFROST DURATION | CASE DATABASE | X | | C>P>M | |
| INITIAL DEFROST START TIME | CALCULATED | X | | C>P>M | DEFROST DURATION, OTHER SYSTEMS REQUIREMENTS |
| SUBSEQUENT DEFROST START TIMES | CALCULATED | X | | C>P>M | DEFROST DURATION, OTHER SYSTEMS REQUIREMENTS, NUMBER OF DEFROSTS PER DAY |
| DRIP CYCLE ENABLED | OPERATOR INPUT | | X | C<>P>M | |
| DRIP CYCLE DURATION | OPERATOR INPUT | | X | C<>P>M | |
| TEMPERATURE TERMINATION ENABLED | OPERATOR INPUT | | X | C<>P>M | |
| TEMPERATURE TERMINATION INPUT | OPERATOR INPUT | | X | C<>P>M | |
| TERMINATION TEMPERATURE SET POINT | CASE DATABASE | X | | C>P>M | |
| TEMPERATURE ALARMS ENABLED | OPERATOR INPUT | | X | C<>P>M | |
| HIGH TEMPERATURE ALARM | CASE DATABASE | X | | C>P>M | |
| HIGH TEMPERATURE ALARM DELAY | CASE DATABASE | X | | C>P>M | |
| LOW TEMPERATURE ALARM | CASE DATABASE | X | | C>P>M | |
| LOW TEMPERATURE ALARM DELAY | CASE DATABASE | X | | C>P>M | |
| DUAL TEMPERATURE CASE | CASE DATABASE | X | | C>P>M | |

FIG. 20

CONDENSER DATA

| PARAMETER | SOURCE | AUTO | MANUAL | STORAGE | CALCULATION PARAMETERS |
|---|---|---|---|---|---|
| CONDENSER MODEL NUMBER | OPERATOR INPUT | | X | C<>P | |
| SPLIT CONDENSER INSTALLED | CONDENSER DATABASE | X | | C>P | |
| NUMBER OF FANS | CONDENSER DATABASE | X | | C>P | |
| CONTROL MODE (FIXED/FLOAT) | OPERATOR INPUT | | X | C<>P | |
| DISCHARGE PRESSURE SET POINT | CALCULATED | X | | C>P | REFRIGERANT TYPE |
| DISCHARGE PRESSURE HIGH ALARM | CALCULATED | X | | C>P | REFRIGERANT TYPE |
| DISCHARGE PRESSURE LOW ALARM | CALCULATED | X | | C>P | REFRIGERANT TYPE |
| DISCHARGE PRESSURE MAXIMUM | CALCULATED | X | | C>P | REFRIGERANT TYPE, LIQUID LINE TEMPERATURE |
| DISCHARGE PRESSURE MINIMUM | CALCULATED | X | | C>P | REFRIGERANT TYPE, LIQUID LINE TEMPERATURE |
| CONDENSER OFFSET | CONDENSER DATABASE | X | | C>P | |
| OPERATING VOLTAGE | CONDENSER DATABASE | X | | C>P | |

REFRIGERATION SYSTEM AND METHOD OF OPERATING THE SAME

RELATED APPLICATIONS

This application is a continuation-in-part of U.S. patent application Ser. No. 09/849,900, filed on May 4, 2001, now U.S. Pat. No. 6,647,735 entitled "DISTRIBUTED INTELLIGENCE CONTROL FOR COMMERCIAL REFRIGERATION"; which is a continuation-in-part of International Patent Application No. PCT/US01/08072, filed Mar. 14, 2001, entitled "DISTRIBUTED INTELLIGENCE CONTROL FOR COMMERCIAL REFRIGERATION"; which is a continuation-in-part of U.S. patent application Ser. No. 09/524,939, filed on Mar. 14, 2000, entitled "DISTRIBUTED INTELLIGENCE CONTROL FOR COMMERCIAL REFRIGERATION," issued as U.S. Pat. No. 6,332,327; all of which are incorporated herein by reference.

FIELD OF THE INVENTION

The invention relates to sensing the failure of a sensor and, more particularly, sensing the failure of a sensor in a refrigeration system.

BACKGROUND

Electronic control systems applied to refrigeration systems (e.g., a commercial refrigeration system such as can be found at a supermarket) require sensing devices to acquire real-time information about the state of the system. The acquired data is used to determine control actions as well as alarm and failure status. Accuracy of the sensed data is imperative in order to maintain system control. Inaccurate or missing data will result in poor system performance and could potentially cause damage to the system components.

SUMMARY

In one configuration of a refrigeration system embodying the invention, implementation of a distributed control methodology places intelligence at the point of control and/or sensing. Division of the control tasks and distribution of the control/monitoring devices segregates system operating parameters. To regain system wide control and monitoring capability, a communication network (or series of networks) is established among subsystems and monitoring devices. The network(s) provides an infrastructure for the sharing of operating parameters among the control and/or monitoring devices and a system wide master control. In order to reduce the potential impact of a failed sensing device, a method of determining sensor and data integrity is required.

Distribution of controls produces redundant sensing devices to support distributed control functions. Each distributed device supports one or more sensing devices. Sensed data is retrieved filtered and scaled by the attached device. During retrieval and manipulation of the sensed data, the control can test for open, shorted, and non-responding sensors. If such a condition exists the sensor is marked as failed and the data ignored. In some constructions, the failed sensor condition is then reported to the system controller. This alerts the system controller not to use data from the failed sensor and to report the failure.

The aforementioned process helps protect the system controller from operating on data from a failed sensing device. In another construction, further testing and comparison of the sensed data from multiple sensing elements detects data skewed by partial sensor failure or garbled data transmission from the distributed controls. As an example, a refrigeration system with multiple (e.g., four) parallel compressors has multiple (e.g., four) suction pressure sensors (i.e., one attached to each compressor). These sensors, under normal circumstances, will report pressures that deviate only 2–3 PSI sensor to sensor. Continued deviations outside this range are indicative of a failed sensing device. The refrigeration system can mark the offending device as failed and remove from calculations affecting control. The failure is also reported to alert service personnel. The reported message can include an error code.

BRIEF DESCRIPTION OF THE DRAWINGS

FIG. 9 is a block diagram of a bus compatible branch control subsystem, suitable for use with the commercial refrigeration system of FIGS. 7 and 8.

FIG. 10 is a block diagram of a commercial refrigeration system including bus compatible valve control.

FIG. 10A is a block diagram of an exemplary construction of the system of FIG. 10 using valve controller to control an evaporator valve associated with a subcooler.

FIG. 17 is a table representing parameters identified as rack parameters, which are communicated to and from the rack PLC in FIG. 7.

FIG. 18 is a table representing parameters identified as suction group parameters, which are communicated to and from the rack PLC in FIG. 7.

FIG. 19 is a table representing parameters identified as system data parameters, which are communicated to and from the rack PLC in FIG. 7.

FIG. 20 is a table representing parameters identified as suction group parameters, which are communicated to and from the rack PLC in FIG. 7.

FIG. 21 is a table representing parameters identified as condenser parameters, which are communicated to and from the rack PLC in FIG. 7.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "coupled" and "communication" and variations thereof herein are used broadly and encompass both direct and indirect mountings, connections, couplings and communications. Further, "connected," "coupled," and "communication" are not restricted to physical or mechanical connections, couplings, or communications.

Figure 1:
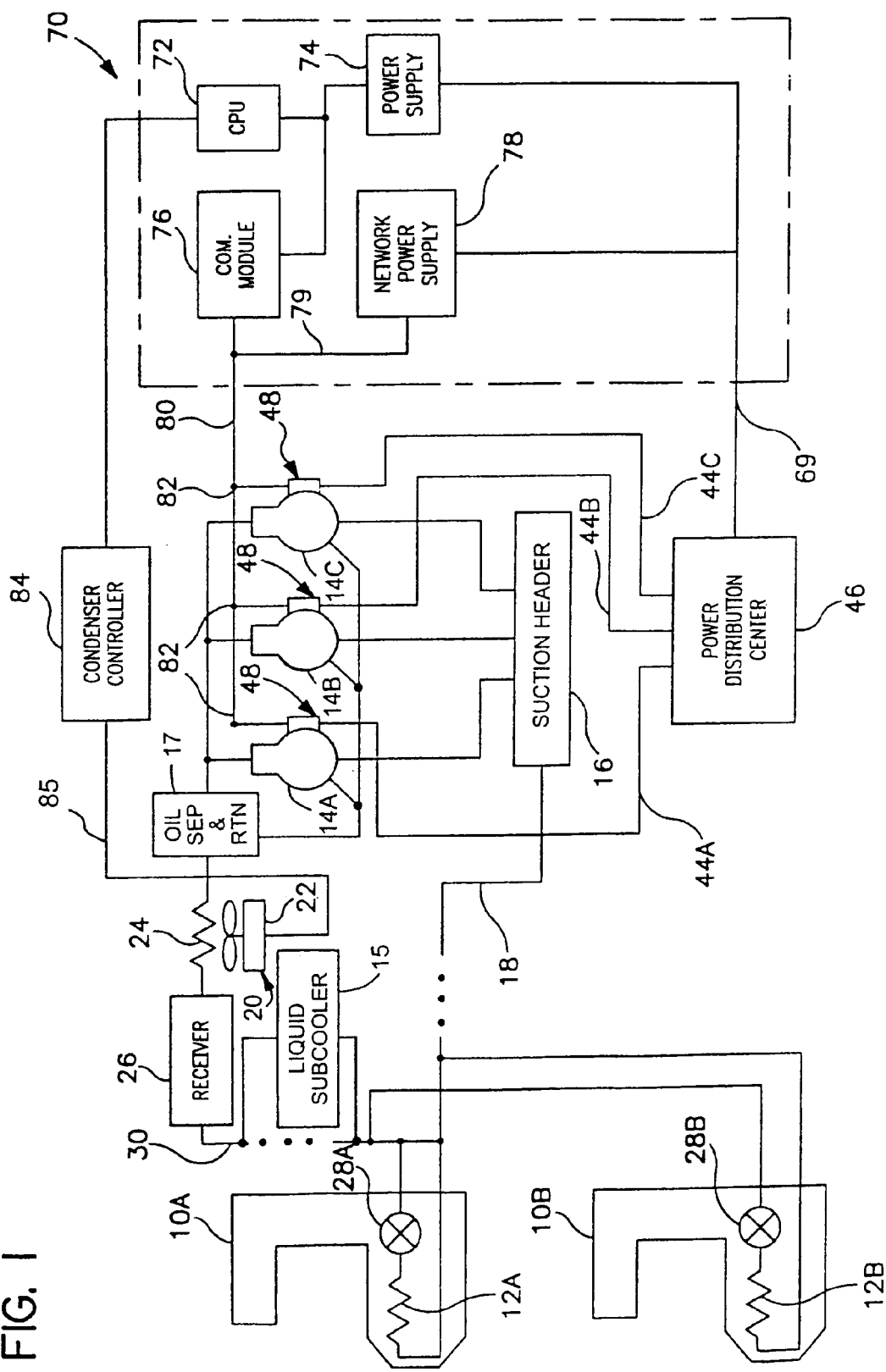
FIG. 1 is a schematic representation of a refrigeration system.

Referring now to FIG. 1, one construction of a refrigeration system (e.g., a commercial refrigeration system for use in a food store) is shown to comprise one or more fixtures (which are illustrated as food display merchandisers 10A and 10B in the shopping arena of a food store). The merchandisers 10A and 10B each incorporate at least one evaporator coil 12A and 12B (or like heat exchanger unit), respectively, disposed for cooling the merchandiser. Three multiplexed compressors (designated 14A, 14B, and 14C, respectively) are connected by way of a suction header 16 and a low side return pipe 18 in fluid communication with the low side of the evaporators 12A and 12B for drawing refrigerant away from the evaporators. A condenser (generally indicated at 20) including a fan 22 and heat exchanger 24 is in fluid communication on the high discharge side of the compressors 14A, 14B, 14C for removing heat and condensing refrigerant pressurized by the compressors. Although an air-cooled condenser 20 is shown, other types of condensers, such as those liquid cooled from a ground source water supply, may be used. Moreover, it is to be understood that the single illustrated fan 22 represents one or more fans typically used in a condenser for commercial refrigeration applications.

Refrigerant from the condenser 20 is stored in a receiver 26 in communication with expansion valves 28A and 28B by way of a high side liquid delivery line 30. The expansion valves 28A and 28B meter refrigerant into respective evaporators 12A and 12B and induce a pressure drop for absorbing heat, to complete the refrigeration circuit. The compressors 14A, 14B, and 14C, and usually also the suction header 16 and receiver 26, are mounted on a compressor (or condensing unit) rack (not shown) prior to shipment to the store location where the refrigeration system is to be installed.

The food display merchandisers 10A and 10B illustrated with the evaporators 12A and 12B can be placed in the shopping arena of a food store. However, it is understood that other types of cooling fixtures could be placed in other parts of the store (e.g., a service area or backroom cooler). The liquid line 30 and suction return line 18 have been broken to indicate connection to other evaporators (not shown) in the system. Evaporators may be connected to the same piping circuit between the receiver 26 and the suction header 16, or in a different circuit or "branch" (not shown) connected to the receiver. Further, the number of compressors 14 in the refrigeration system can be more or less than three (including only a single compressor). The refrigeration system typically includes a compressor, a condenser, an expansion valve and an evaporator. Other components can be included but are not essential, and the precise mounting or location of the system components may be other than described. Moreover, the same aspects of the refrigeration system have application outside the food store environment; for example, the invention can be used with cooling other perishable, non-food products such as blood, plasma and medical supplies. Also, some aspects of the communications network (discussed below) have application in other systems.

Figure 3:
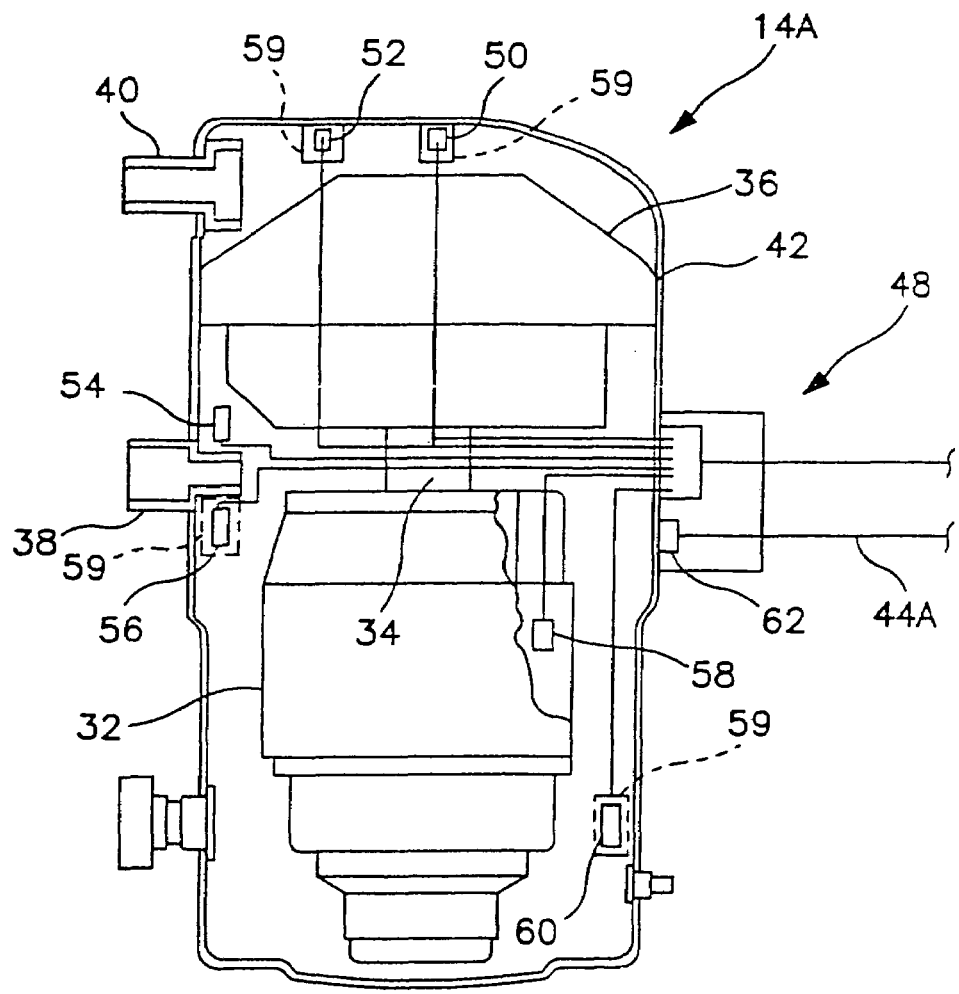
FIG. 3 is a schematic representation of a compressor.

As shown in FIG. 3 and in one construction, each compressor 14A, 14B, and 14C comprises an electric motor 32 driving a shaft 34 connected to a pressurizing unit 36. For purposes of the description herein, compressor 14A will be referred to; the other compressors 14B and 14C preferably having the same construction. The pressurizing unit may take on any suitable form. In one construction, reciprocating pistons driven by a motor constitute the pressurizing device, but more and more, the quieter rotary devices found in scroll compressors and screw compressors are being employed to compress the vaporous refrigerant. A scroll compressor is illustrated in FIG. 3. The compressor 14A has a low side suction inlet 38 that receives the vaporous refrigerant from the evaporators 12A and 12B and a high side discharge outlet 40 through which hot, pressurized refrigerant is discharged from the compressor. In one construction, the motor 32 and pressurizing unit 36 are semi-hermetically or hermetically sealed within an outer casing or shell 42. The motors 32 of the compressors are each connected to a respective high voltage (e.g., three phase 480 V AC or 208 V AC) power line 44A, 44B, and 44C (FIG. 1) extending from a power distribution center 46 within the food store. These lines are shielded, such as by placement within a conduit, as may be required by electrical codes.

In one construction, the compressors 14A, 14B, and 14C each have a bus compatible compressor safety and control module 48 (also referred to as "BCCSCM," "compressor operating unit," "compressor control module," or "compressor controller") for monitoring at least one, but preferably several operating conditions or parameters of the compressor. The "operating parameters," in one construction, include (1) control parameters providing information used for controlling the compressor 14, and (2) safety parameters providing information about whether the compressor 14 is operating within its designed operational envelope or in a manner which could damage the compressor 14. It is envisioned that any number of parameters could be monitored, including only safety parameters or, less likely, only control parameters. Control parameters for the compressor 14 may include, but not limited to, suction temperature, suction pressure, and discharge pressure. Safety parameters for the compressor 14 can include, but not limited to, discharge pressure, discharge temperature, oil level (or pressure), phase loss/reversal, and motor winding temperature. As is apparent, some of the control parameters are also classified as safety parameters.

The bus compatible compressor safety and control module ("BCCSCM") 48 is constructed and arranged to receive and/or detect the various operating parameters and control operation of the compressor. In one construction, the BCCSCM comprises a processor 49 and multiple sensors in communication with the processor 49. In the illustrated construction of FIG. 3, the compressor 14A is built with individual continuous reading analog sensors including a discharge pressure sensor 50, a discharge temperature sensor 52, a suction pressure sensor 54, a suction temperature sensor 56, and a motor winding temperature sensor 58 (FIG. 3). In one construction, the temperature sensors 52, 56 and 58 are variable resistance, RTD-type sensors. An oil level sensor 60 can be of the type that changes the state of a circuit when the oil level falls below a predetermined minimum, and does not provide a continuous reading of the oil level. A power phase monitoring device 62 incorporated into the BCCSCM 48 is capable of detecting both phase loss and phase reversal on the three phase power line 44A coming into the compressor 14A. It is to be understood that other sensors can be used (e.g., digital sensors as discussed below).

In one construction of the commercial refrigeration system, the sensors 50–62 are installed at the compressor assembly site and disposed within the hermetically (or semi-hermetically) sealed shell 42 of the compressor (FIG. 3). This construction allows the sensors 50–62 to be protected in the shell 42 and, particularly in the case of the suction pressure sensor 54, are located close to the pressurizing unit 36 for more accurate readings of compressor function. However, it is to be understood that the sensors 50–62 could be located other than in the shell 42. For instance, it is envisioned that sensors could be replaceably received in openings 59 in the shell (schematically illustrated in phantom in FIG. 3) accessible from the exterior, or external to the compressor shell as in the case of a reciprocating semi-hermetic compressor, or any other motor driven compression device.

The processor 49 of the BCCSCM 48, in one construction, is a dual processor system, including a host controller (such as a microcontroller, an ASIC, or a microprocessor, any of which may be connected to a memory) and a communication slave controller. The host controller and communication slave are not separately represented in FIG. 2, but are collectively represented as the processor 49. In one construction, the host controller has a 256 byte internal RAM, 8 kilobytes of flash program memory, and 16 input/output pins for control interface. The communication slave, in one construction, is an application specific integrated circuit (ASIC) that communicates with the field bus network (described in one construction below as AS-Interface® network). The communication slave translates the protocol of the field network into a signal understood by the host controller, and vice versa.

For an exemplary construction of the communication slave, if the field bus network provides four data bits per message, the communication slave can be configured to extend the data capabilities of the field bus network by interfacing with an intermediate memory device (an additional RAM) between the communication slave and the host controller. In such a construction, the communication slave and the host controller interface with the RAM to extend the data capabilities of the field bus network by using sequential read or write cycles of the field bus network to build larger data sizes. In other words, rather than limiting the data sizes to four bits, larger data sizes are constructed by grouping multiple four-bit data transmissions. The communication slave sequentially writes the data into (or reads the data from) the additional RAM. The host microcontroller reads the data from or writes the data to the additional RAM. Thus, for example, a sixteen-bit data parameter may be constructed over the course four successive data cycles.

Figure 15:
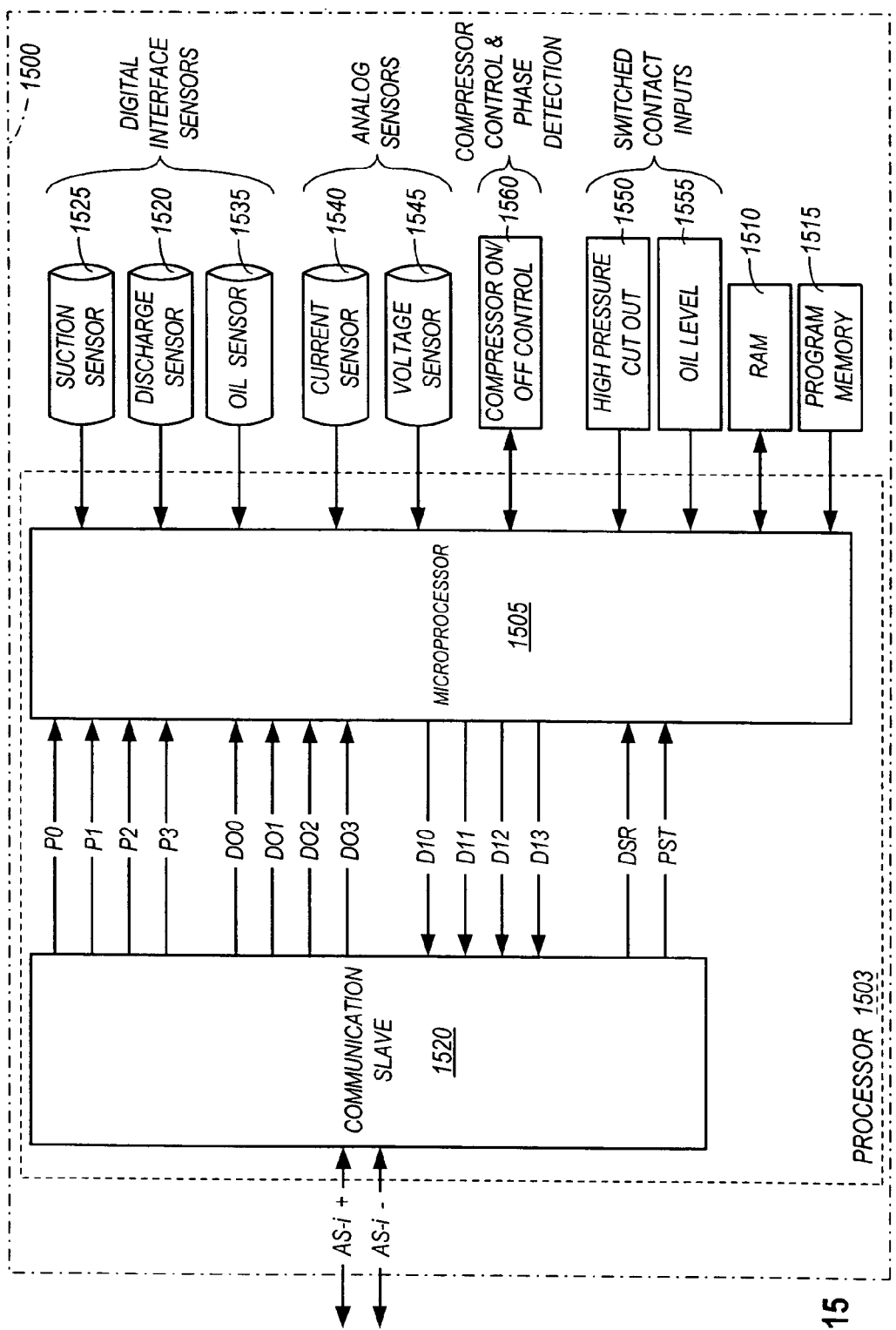
FIG. 15 is a schematic representation of a second construction of a bus compatible compressor safety and control module.

Alternative structures of the BCCSCM can also be employed. For example and as shown in FIG. 15, the BCCSCM 1500 includes a microprocessor 1505, RAM 1510, and program memory 1515. The BCCSCM 1500 also includes a communication slave 1520, a suction sensor 1525, a discharge sensor 1520, an oil sensor 1535, a current sensor 1540, and a voltage sensor 1545. The BCCSCM 1500 also further communicates with the compressor 14 to receive switched contact input from a high-pressure cut out 1550 and oil level sensor 1555 and communicates with a compressor on/off control 1560.

In other constructions of the refrigeration system, a field bus protocol having larger inherent data sizes could be accommodated, thereby potentially eliminating the need for a communication slave to translate the protocol. In yet another construction, the communication slave and the host controller (or microprocessor 1505) are combined as single controller (e.g., a single ASIC) or as a single microprocessor and memory. Unless specified otherwise, when referring to the construction shown in FIG. 2, the description also applies to the construction shown in FIG. 15.

The host controller (e.g., microprocessor 1505) is adapted to receive signals from the sensors indicative of the values of the sensed operating parameters. The host controller also stores safety limit values for the measured safety parameters, respectively. The host controller is capable of generating digital status information indicative of the values of the operating parameters. When a safety limit is traversed, the host controller is capable of generating a digital status information signal including specific information as to which safety parameter is out of specification. The signals are translated by the communication slave for sending over the field bus network. This will be discussed in further detail below.

In one construction, the BCCSCM 48 for each compressor 14 further includes a switch device 64. The switch device 64, in one construction, is a three pole solid state relay such as SSRD Series panel mount heavy duty solid state AC relay. The SSRD Series is made by Teledyne, Inc. of Los Angeles, Calif. and available from Allied Electronics of O'Fallon, Mo. The relay operates, upon receiving a command from the processor 49 (or processor 1503), to block at least two of the three phases of the electrical power to the compressor motor 32, thereby turning the motor off. It is to be understood that other switch devices can be used. The processor 49 is programmed to cause the relays to turn off the compressor (14) when a safety limit value of one of the safety parameters is traversed.

In another embodiment, the SSRD is constructed to include an overcurrent protection capability. A current sensor (shown as current sensor 1540 in the BCCSCM 1500), which can be associated with the switch device, monitors the current through the SSRD. If the sensed current exceeds a threshold (e.g., 350A for 1.5 line cycles), the SSRD is shut off (rendered non-conducting) to protect the compressor motor 32. Such an overcurrent condition can occur, for example, if the rotor of the compressor motor 32 locks. Thus, a current sensor associated with the SSRD serves as a locked rotor detector. The sensed current information may also be used to detect other compressor abnormalities.

A current sensor that is a self-contained part of the compressor-controlling device provides certain benefits. For example, current information is available on the system control bus via the BCCSCM for use in safety and control applications, and the value of the current can be used for energy management/monitoring functions. The current sensor may be constructed internal to the SSRD, or it may be a sensor external to the SSRD. For example, a current sensing toroid could be used external to the SSRD to sense current. Alternatively, a high power, current sensing resistor may be included within the SSRD to sense current.

Figure 6:
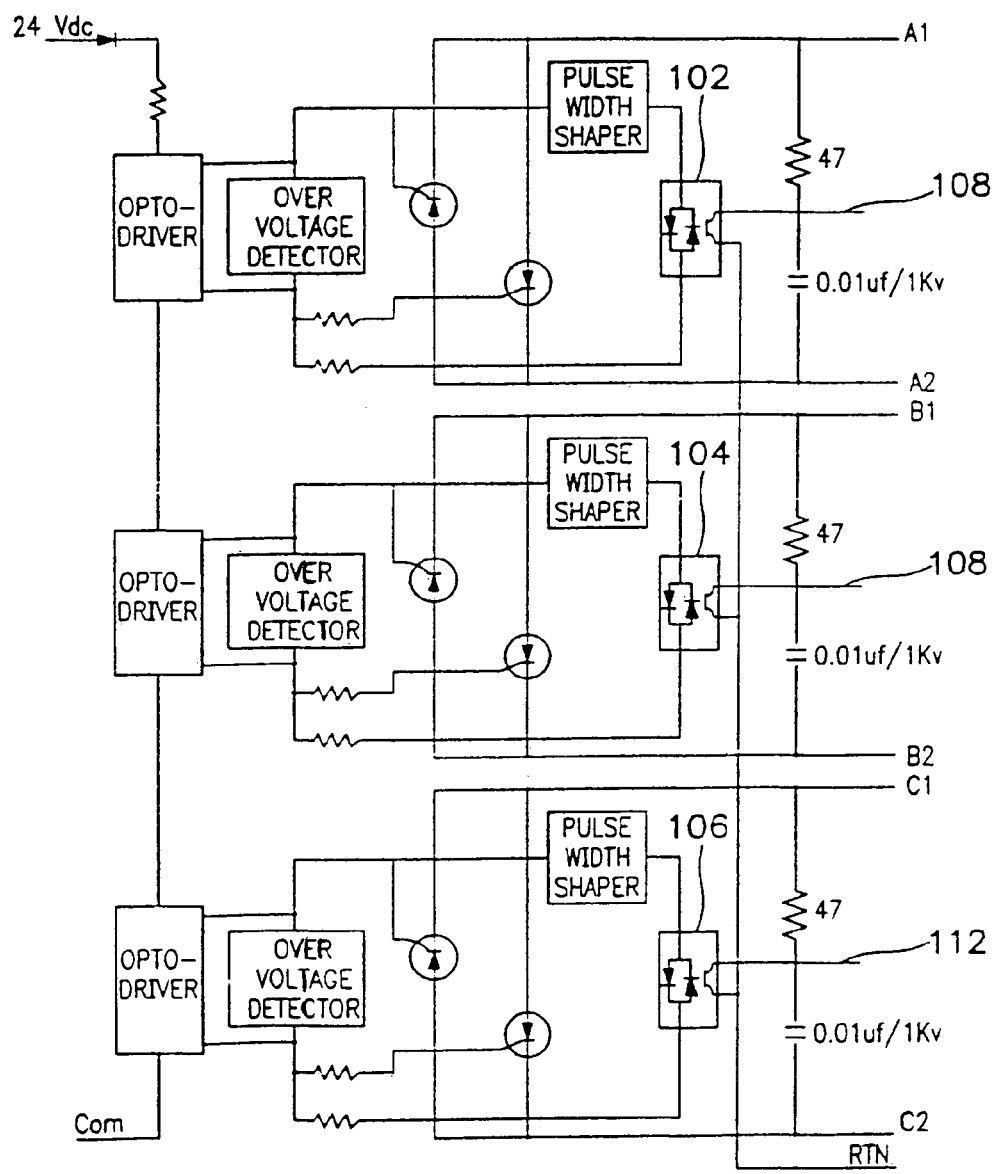
FIG. 6 is a schematic representation of aspects of a solid state relay device.

FIG. 6 is a schematic representation of another aspect of an SSRD. A typical commercial refrigeration compressor system uses three-phase electrical power. Thus, by controlling the SSRD, the application of phases A, B, and C of such a three-phase power system is also controlled.

As illustrated in the construction of FIG. 6, the SSRD includes three opto-isolators 102, 104, and 106 that are constructed as an integral component of the overall SSRD assembly. Opto-isolator 102 is associated with phase A, opto-isolator 104 is associated with phase B, and opto-isolator 106 is associated with phase C. The opto-isolators 102, 104, and 106 detect the zero-crossing of the respective phases with which they are associated. Thus, when phase A crosses zero, opto-isolator 102 produces an output, via its collector, on line 108. Likewise, when phase B crosses zero, opto-isolator 104 produces an output on line 110. Similarly, when phase C crosses zero, opto-isolator 106 produces an output on line 112. As one skilled in the art can appreciate from the foregoing, such zero-crossing information amounts to phase reference information, which may be compared to determine the relationship between the power phases.

As those skilled in the art will also appreciate, if power is applied to the compressor motor 32 when an improper phase relationship exists, the compressor motor 32 may be damaged or destroyed. For example, if a scroll compressor is run backwards, for even an instant, because of an improper phase relationship, the compressor may be seriously damaged or ruined. The zero-crossing detection capability of the SSRD shown in FIG. 6 is integral to the SSRD and available when the SSRD is open-circuited—when it is non-conducting and no power is applied to the compressor motor 32. Hence, a BCCSCM with the SSRD shown in FIG. 6 can monitor the phases for a proper polarity relationship before applying power to the compressor motor 32. Stated differently, a BCCSCM with the SSRD shown in FIG. 6 can determine the presence of an improper phase relationship by comparing the phase information to an acceptability standard and prevent potential damage to the compressor motor 32 that would otherwise occur if power were applied to the motor. In contrast, prior art phase polarity detection schemes rely on devices external to the SSRD. Such prior art schemes do not detect an improper phase relationship before applying power. Rather, such systems check the phase relationship only after power application. In such systems, if an improper phase relationship is detected, power is removed. As those skilled in the art can appreciate, the compressor motor 32 may be damaged or destroyed before power is removed, even if it is removed relatively rapidly. Thus, the SSRD, as shown in FIG. 6 (and as shown as 1560 in FIG. 15), provides for phase detection prior to the application of power.

Referring again to FIG. 1, a master controller 70 (also referred to as a system controller) for controlling all of the compressors 14A, 14B, and 14C of the refrigeration system is in electronic communication with all of the BCCSCMs 48 of the refrigeration system via line 80. In one construction, the controller 70 includes a CPU 72 (or simply a processing unit) which coordinates data transfer among the components of the system. The CPU 72 also processes data acquired from the BCCSCMs 48 and determines control commands to be sent to the BCCSCMs. Other logic devices can be used in place of the CPU 72 to perform the function of the CPU 72.

In one specific construction, the CPU 72 includes a 16-bit RISC processor, has 64 kilobytes of read only memory (ROM), 16 kilobytes of random access memory (RAM), a real time clock to perform time-based control functions, and at least two interfaces (e.g., serial interfaces) to permit connection to a local human-machine interface (hereinafter, "HMI"), as well as a remote interface. The local and remote interfaces may also be referred to herein as input/output devices. The CPU 72 can also include both digital and analog inputs and outputs, and is powered by a 24-VDC power supply 74 transformed and rectified from a 120-VAC feed line 69.

The controller 70 further includes a communications module 76 to permit the CPU 72 to work with a field bus networking system. The field bus networking system is designed to connect sensors, actuators, and other control equipment (e.g., BCCSCM 48) at the field level. An example of a suitable field bus networking system is the AS-Interface® (or AS-i) networking system. Components for the AS-i network are sold commercially by Siemens Aktiengesellschaft of Germany, and available in the United States from Siemens Energy Automation and Control, Inc. of Batavia, Ill. The communications module 76 can be powered by the same 24-VDC power supply 74 used by the CPU 72.

In one construction, the controller 70 includes a network power supply 78, which provides a 24-VDC to 30 VDC power supply connected to the 120-VAC feed line 69. The network power supply 78 provides power to the field bus network via line 79 as further discussed below.

In one construction, the field bus network includes an unshielded two wire bus 80 connecting the communications module 76 (and hence the CPU 72) to all of the BCCSCMs (and, as discussed below, other control modules). One wire is a ground wire and the other is a communication and power line which carries all communication and power for the BCCSCMs 48. Power for the BCCSCMs is supplied from the network power supply 78 through line 79, which has a communications decoupling feature allowing communications and power to be supplied over the same line. The BCCSCMs 48 are each connected to the bus 80 at nodes 82 by a respective coupling that penetrates insulation of the bus cable and makes contact with the wires. Each BCCSCM 48 is plugged into the coupling to connect the control and safety module to the network.

In the construction shown in FIG. 1, the master controller 70 also controls cycling of the condenser fans 22. For example, the master controller 70 can monitor discharge pressure and liquid refrigerant temperature to determine when to cycle the condenser fans 22. Similarly, the master controller 70 can monitor discharge pressure and outdoor ambient temperature to determine whether to split the condenser.

In the illustrated construction, the master controller 70 transmits these cycling commands from the CPU 72 to a condenser controller 84 located close to the fans 22. The condenser controller 84 executes the commands for shutting down or energizing the condenser fans 22. Because the condenser is, in some constructions, located remotely from the compressor rack, it may be undesirable or impractical to locate the condenser controller 84 on the same field network bus (e.g., AS-i bus) as the CPU 72. FIG. 1 illustrates such a situation, in which the condenser controller 84 has its own field bus network (e.g., another AS-i bus 85). In other words, the condenser controller 84 can have its own field bus network for controlling the condenser fans, just like the network of the compressors 14A, 14B, and 14C with the master controller 70. For example, the CPU 72 can communicate with the condenser controller 84 over a relatively longer distance network. The Multipoint Interface or "MPI", available from Siemens, is an example of such a longer distance network/field bus. Another example is the Profi-BUS standard. In this way, the condenser controller 84 acts as a gateway to extend the range of the master controller 70 in a situation in which the primary field bus network associated with the compressor rack could not practically be used. Thus, the master controller 70 provides operating and control functions to the condenser controller 84. The condenser controller 84, via its own field bus network 85, supplies the control information to a BCFCM 86 which drives the fans 22. Likewise, data available at the condenser (e.g., an ambient air temperature associated with the condenser and information regarding which fan(s) is/are on) may be transmitted to the master controller 70. In one construction, an air temperature sensor provides ambient air temperature data directly to the condenser controller 84 (i.e., independently of any field bus network), which transmits such data to the master controller 70.

Advantageously, if the master controller 70 ceases communications with the condenser controller 84, the condenser controller is preferably programmed to independently determine and provide at least some of the control information required to drive the fans 22 via the BCFCM. Other condenser control arrangements may be used. For instance, the condenser controller 84 could be eliminated and its functions programmed into the master controller.

The BCFCM 84 includes, in one construction, a communication slave controller and a microprocessor and memory as described in connection with the BCCSCM 1500 of FIG. 15. However, the BCFCM would include different inputs and outputs connected to the microprocessor of the BCFCM than the microprocessor 1505. In other words, the inputs and outputs connected to the microprocessor of the BCFCM would be the inputs and outputs associated with the condenser 20.

Figure 4:
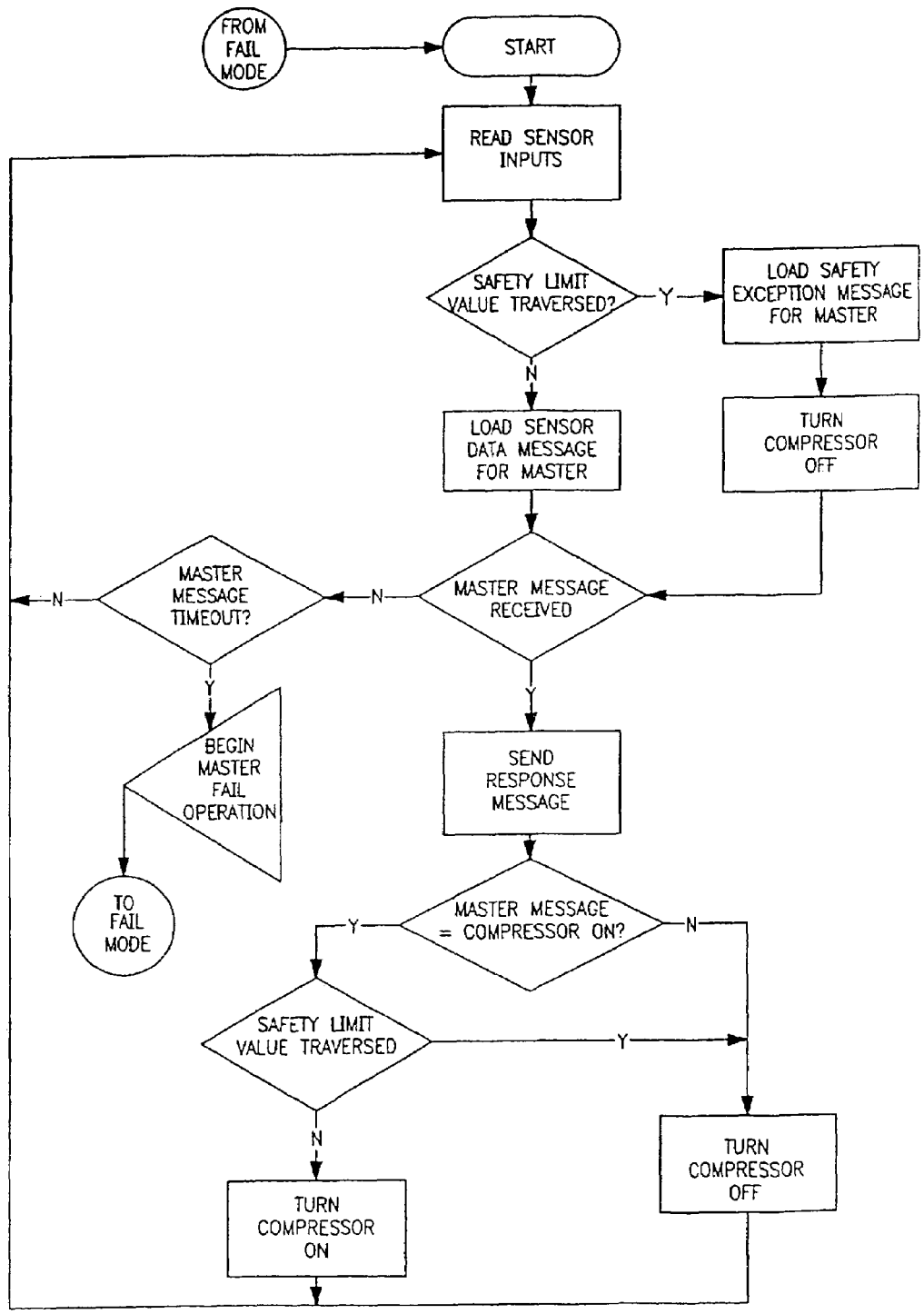
FIG. 4 is a flow diagram illustrating an exemplary operation of the control and safety module in a standard operating mode.

Referring now to FIG. 4, in one operation of the refrigeration system, the sensors 50–62 or 1525–1545 of each BCCSCM 48 or 1505 (e.g., the BCCSCM associated with compressor 14A) provide information regarding the operating parameters monitored by the sensors. The information provided by the sensors 50–62 or 1525–1545 could be limited to whether or not a pre-set safety limit value has been traversed. However, in one construction, at least some of the sensors provide signals to the processor of each BCCSCM 48 or 1500 indicative of the actual value of the operating parameter at the time sampled.

In one construction, the sensors for discharge pressure 50 and temperature 52, and suction pressure 54 and temperature 56 provide digital signals to the processor 49 indicative of the actual value of the parameter measured. Thus, the sensor/transducer converts the analog data to a digital format before providing the information to the processor 49.

In the construction shown in FIG. 15, the sensors 1525, 1530, and 1535 are dual function pressure/temperature sensors having an addressable, 14 bit analog to digital converter. That is, each sensor includes a first sensing device (e.g., thermistor) that senses a temperature and a second sensing device (e.g., a strain gauge) that senses a pressure. Both the first and second sensing devices are disposed within a single housing. The A/D converter is also located within the sensor housing and converts the analog signals from the detecting devices to a single digital signal conveying the measured parameters. The AID converter can include other channels (e.g., a channel for monitoring the supply voltage to the sensors), and the digital signal can convey information relating to the other channels. Additionally, the digital signal can send an error code to the processor 1503 when an error code occurs at the sensor. For example, if the A/D converter does not receive a signal from the temperature sensing device, it can generate an error code that is communicated to the processor 1503. The processor 1503 can then communicate to the system controller that a sensor error has occurred. An example dual function pressure/temperature sensor is a ML 200 psis per SCD1126, part no. 9310101, manufactured by Honeywell.

The motor winding temperature sensor 58, and the current and voltage sensors 1540 and 1545 provide an analog signal to the processor 1505 indicative of the actual value of the parameter measured. The oil level sensor 60 (or 1555) provides a circuit open or circuit-closed signal to the processor indicative of whether an oil level safety limit has been traversed. The high pressure cut out 1550 provides a circuit open or circuit-closed signal to the processor indicative of whether a pressure limit has been traversed.

As explained above with respect to FIG. 6, phase loss or phase reversal can be monitored/detected by monitoring the zero crossings of each phase with a plurality of opto-isolator devices. An alternative, separate power phase monitoring device 62 may also be used. Such a separate power phase monitoring device 62 would, for example, provide a circuit open or a circuit closed signal to the microcontroller to indicate whether a phase loss or phase reversal has occurred.

The processor 49 or 1503 of each BCCSCM 48 or 1500 checks the inputs from each sensor to determine whether a safety limit value for any of the measured compressor characteristics has been exceeded. If no safety limit values are exceeded, the processor 49 loads the sensor data for transmission to the master controller 70 when the processor is queried. The master controller 70 is the system network controller in standard operation of the refrigeration system shown in FIG. 1. In the illustrated embodiments, the host controller (or the microprocessor 1505) stacks the information to await transmission to the master controller 70. The processor 49 (or 1503) then waits for a message from the master controller 70 containing commands and a query for the sensor data. As soon as the message is received, the processor 49 responds over the communication and power line of the two-wire bus 80 to the controller 70 with the information data stored from the sensors 50–62.

For the construction shown in FIG. 1, data from all of the processors flows in a stream over the communication and power line of the bus 80 to the communication module 76 and thence to the CPU 72 of the master controller 70. The communication protocol allows the CPU 72 to associate the operating parameter information received with particular compressors, and to discriminate between different operating parameters for each compressor. In one construction, more specifically, each BCCSCM is assigned a particular address, which allows the controller 70 to communicate individually with each of the BCCSCMs over the same line, and also allows the BCCSCM processors to identify themselves to the master controller.

The data is now available through interfacing with the master controller 70, either remotely or by a local human machine interface, to view individual compressor data. The processor 49 (or 1503) also looks for the command portion of the master controller 70 message for a command to turn the compressor (14A, 14B, or 14C) on or off. If such a command is present, the processor 49 executes it by operating the solid state relay (switch device 64) to turn the compressor on or off. However, if the command is to turn the compressor on, the processor 49 will not execute it if the processor 49 has previously determined that a safety limit value of one of the safety parameters has been traversed and remains in a safety exception state. It is envisioned that other capacity control commands could be received and executed by the processor 49 such as when the compressor was of a variable capacity type. The software of the processor then returns to the initial step of reading the sensor inputs.

Before proceeding further, another method of communication between the master controller 70 and the BCCSCM 1500 (or 48) will now be discussed. The method below will be described for the master controller 70 in communication with the BCCSCM 1500 via an AS-i cable (i.e., bus80); however, other networks can utilize the method below. For example, other networks that do not utilize an AS-i bus can implement the method.

The communication slave 1520 shown in FIG. 15 is an AS-i compatible ASIC that is in communication with the communication module 76 (referred to below as the master). The communication module 76 is or includes an AS-i compatible ASIC. The communication slave 1520 is in further communication with the microprocessor 1505. More specifically, the communication slave 1520 and the microprocessor 1505 are electrically coupled by four "control" (or "parameter") channels P0, P1, P2, and P3; four "output" channels DO0, DO1, DO2, and DO3; four "input" channels DI0, DI1, DI2, and DI3; a DSR channel; and a PST channel. Each channel P0, P1, P2, P3, DO0, DO1, DO2, DO3, DI0, DI1, DI2, DI3, DSR, and PST is coupled to the communication slave 1520 at a respective terminal. Other configurations can be utilized for the communication method described below. For example, the method is not limited to four "input" or four "output" channels. Additionally, other devices can be used in place of the master ASIC, slave ASIC, and the microprocessor.

The AS-i networking solution was originally designed to control four actuators (relays, solenoids, etc.) and/or read four switched inputs. To control the four actuators, the AS-i master transmits requests via the two-wire interface, which also carries the 30 VDC power, to the AS-i slave. In response to the master requests, the AS-i slave either switches its outputs to the state directed by the AS-i master or responds to the master with the current state of its inputs. In accordance with this communication activity, four data bits representing the desired output state or current input state are transmitted during each master-request/slave-response communication cycle. The AS-i slave can also use parameter bits to define or control operation of the attached slave (e.g., to logically AND or OR with the other inputs/outputs). A data exchange with the AS-i slave causes the data strobe output DSR to pulse, while a parameter write to the AS-i slave causes the parameter strobe PST to pulse.

For communication between the communication module 76 and the BCCSCM 1500, a redefinition of the use of the inputs and outputs of the slave 1520 allows the slave 1520 to be connected to a microprocessor as a communication gateway via the AS-I bus. When coupled in this fashion, the slave/microprocessor 1520/1505 combination creates an AS-i bus accessible slave device capable of communicating variable length data elements from an addressable array of bytes. Further, by defining some of the available addressable bytes as pointers into the microprocessor memory space, additional data space is available for transmission over the AS-i bus.

The AS-i protocol calls for communication between the AS-i master and AS-i slave to be in four-bit data packets. That is, each request or response across the AS-i bus includes a wholly self-contained message of four-bits. Please note, however, each request and response can include other bits (e.g., addressing bits, parity bit(s), etc.) for communication between devices on the network.

Generally speaking, a master request controls the output states of the output terminals P0–P3 or DO0–DO3 and the AS-i slave 1520 responds by including the states of the inputs DI0 and DI3. The control (or parameter) bits P0–P4 provide additional information to the microprocessor. The P0 and P1 bits are data block selection bits (discussed below), the P2 bit is a read/write selection bit, and the P3 bit is a compressor ON/OFF bit. The microprocessor 1505 monitors activity on the communication channels with the slave 1520 and controls the inputs to the slave 1520.

The microprocessor is coupled to a 256-bit memory. The 256-bit memory is divided into four, eight-byte blocks. When writing to or obtaining data from the 256-bit memory, the P0 and P1 bits select one of the blocks. Therefore, the number of blocks ($2^{(m)}$ blocks) can vary if the number of selection bits (m) varies. FIGS. 22A, 22B, 22C, and 22D represent one configuration for the four blocks 2210, 2220, 2230, and 2240.

Each block is further divided into sixteen sub-blocks. For the construction shown in FIGS. 22A–22D, each sub-block includes four-bits (or a nibble). The size of each sub-block (e.g., (n) bits) is equal to the number of input/output channels (e.g., (n) channels). The total number of sub-blocks in a block is equal to $2^{(n)}$, and a binary number from 0 (e.g., 0000) to $2^{(n)}$ (e.g., 1111) identifies each sub-block. However, other configurations are possible.

Referring to FIGS. 22A–22D, each sub-block contains one or more pieces of information (e.g., one or more parameters), one or more sub-blocks can be combined to form a piece of information (e.g., form a parameter), one or more sub-blocks can be used as a pointer, or a sub-block can be unused. For example, block 2240 uses sixteen nibbles for storing six parameter values. More specifically, nibbles 0000 and 0001 (byte 0) represent a value for the "suction pressure cut in" parameter; nibbles 0010 and 0011 (byte 1) represent a value for the "suction pressure cut out" parameter; nibbles 0100 and 0101 (byte 2) represent a value for the "split suction assignment" parameter; nibbles 0110, 0111, 1000, and 1001 (bytes 3 and 4) represent a value for the "discharge pressure limit" parameter; nibbles 1010, 1011, 1100, and 1101 (byte 5 and 6) represent a value for the "discharge temperature limit" parameter; and nibbles 1110 and 1111 (byte 7) represent a value for the "oil pressure limit" parameter. As another example, nibbles 1110 and 1111 (byte 7) of block 2210 include values for eight parameters. As yet another example, nibbles 1110 and 1101 (byte 6) of block 2220 is unused in the configuration shown.

In the construction shown in FIG. 22, bytes 0 and 1 of block 2230 include a 16-bit pointer. The 16-bit pointer points to data stored in RAM 1510. The resulting value corresponding to the pointer is stored in bytes 2 and 3 of block 2230. By using the pointer, additional storage capabilities can by used at the processor 1503. Other pointers, pointer sizes, and data sizes can be used. Also, it should be noted, that the data blocks 2210 to 2250 are mirrored at the master controller 70.

Figure 23:
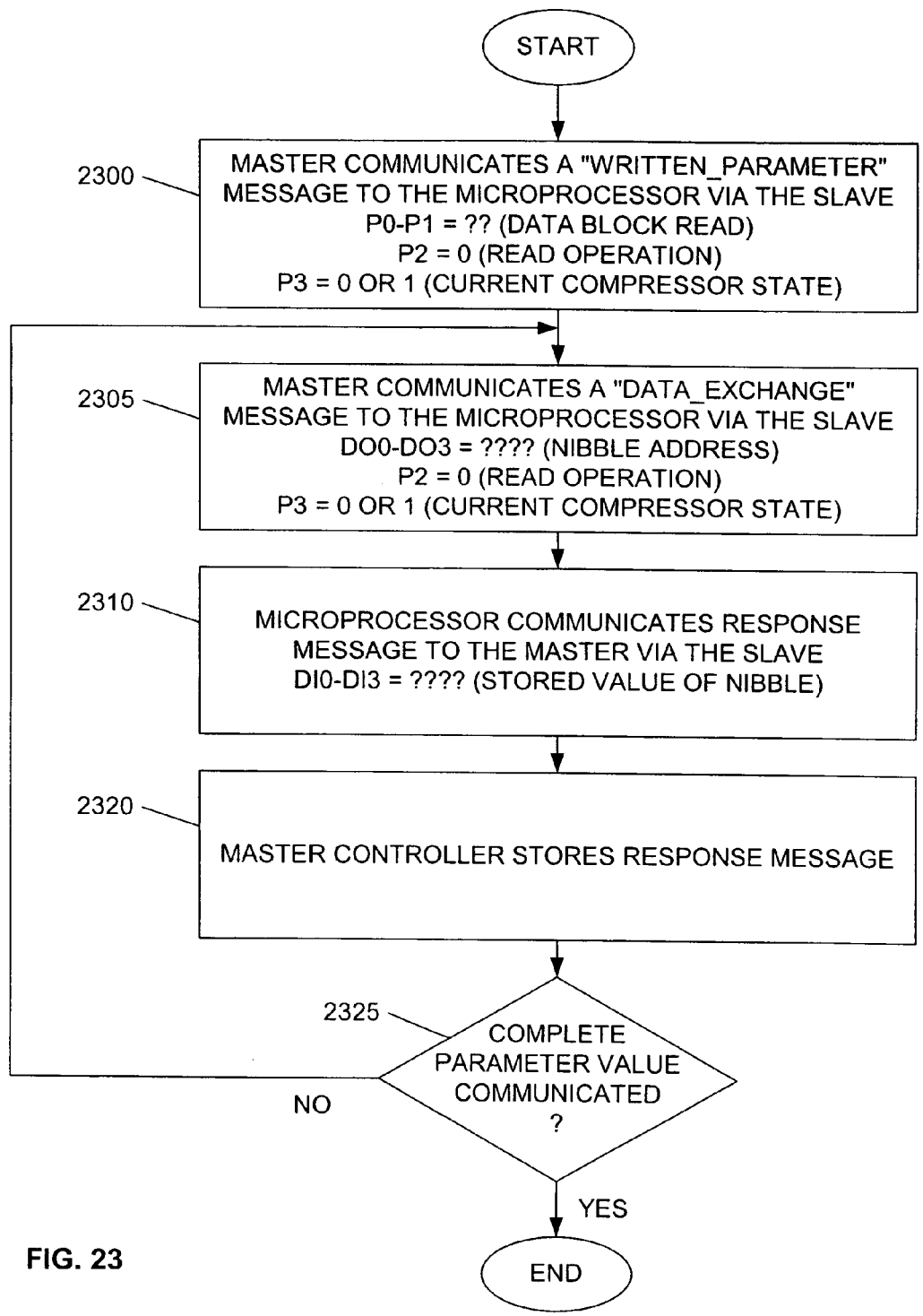
FIG. 23 is a flowchart of a read sequence for one method of communication between the master controller 70 and the BCCSCM 1500.

Because there is only a four-bit control architecture, the network uses an operation sequence for reading and writing data of particular length. FIG. 23 includes a flow diagram representing a read sequence. At 2300, the AS-i master issues a "write_parameter" message to the AS-i slave 1520. The "write_parameter" message includes a two-bit value for selecting a data block, a one-bit value for informing the processor 1503 a read operation is beginning, and a one-bit value for the current compressor state. The "write_parameter" message is then communicated from the communication slave 1520 to microprocessor 1505 on channels P0–P3.

At block 2305, the master issues a "data_exchange" message to the slave 1520. The "data_exchange" message includes a four-bit value pointing to one of the sixteen nibbles of the selected block. The "write_parameter" message is then communicated from the communication slave 1520 to the microprocessor 1505 on channels DO0 to DO3.

At block 2310, the microprocessor 1505 responds by obtaining the stored bits of the identified nibble, and communicating the obtained bits to the slave 1520 on channels DI0 to DI3. The slave then communicates the obtained nibble to the master in the next state change. At block 2320, the master controller 70 stores the obtained nibble in its mirrored 256-bit storage.

At block 2325, the master controller determines whether all nibbles for the requested parameter have been obtained. If the result is affirmative, the master controller combines the stored nibbles (or divided if the parameter is less than a nibble), resulting in the requested parameter value. If the result is not affirmative, then the network repeats blocks 2305, 2310, 2320 and 2325. Therefore, the network decomposes, transmits, and composes variable length data in four-bit packets.

Figure 24:
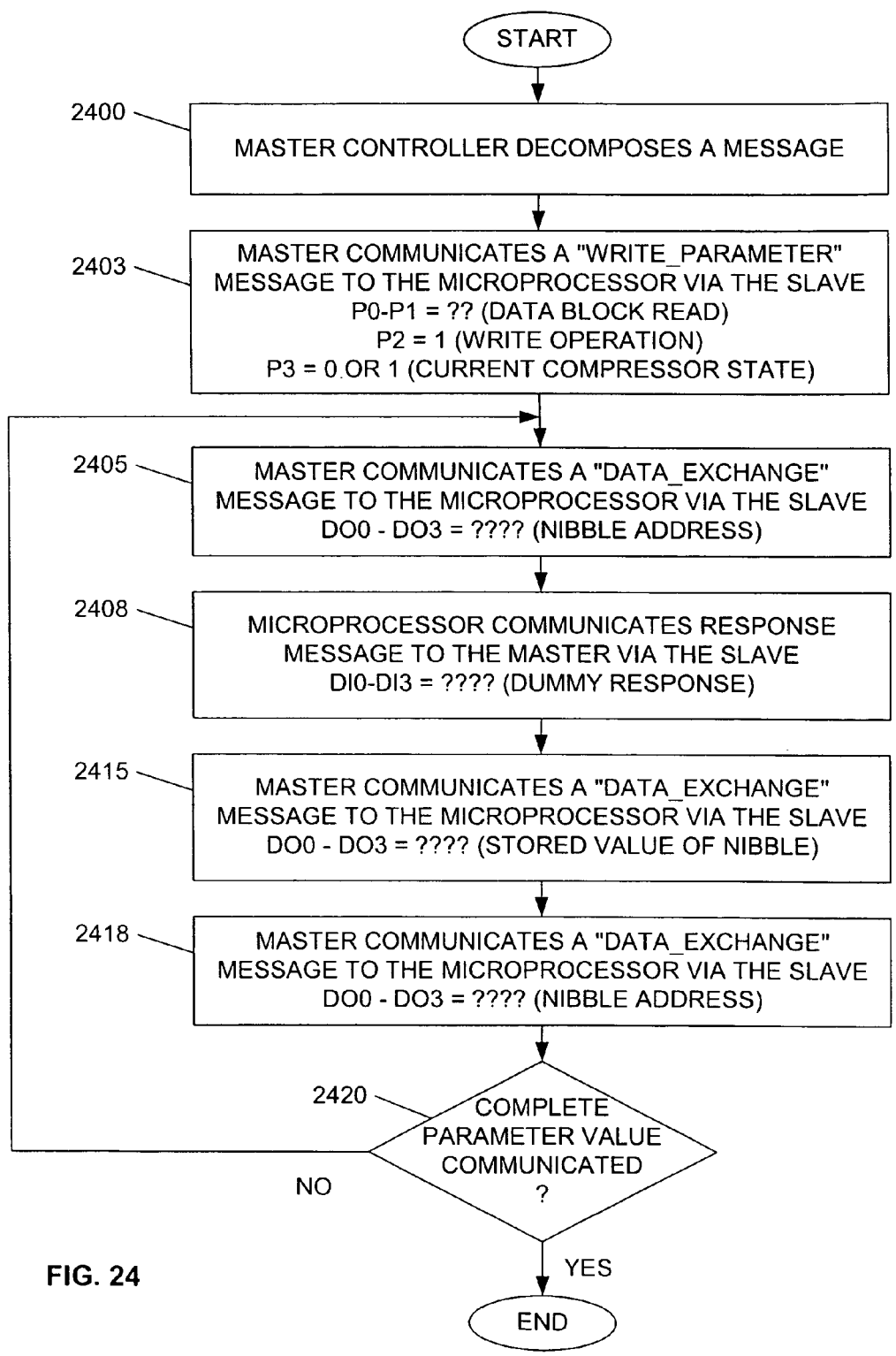
FIG. 24 is a flowchart of a write sequence for one method of communication between the master controller 70 and the BCCSCM 1500.

FIG. 24 includes a flow diagram representing a write sequence. At 2400 the master controller decomposes a message to be communicated to the microprocessor 1505 into a plurality of nibbles (or creates a nibble if a message is less than a nibble). At 2403, the AS-i master issues a "write_parameter" message to the AS-i slave, which is then communicated to the microprocessor 1505 on channels P0–P3. The "write_parameter" includes a two-bit value for selecting a data block, a one-bit value for informing the processor 1503 a write operation is beginning, and a one-bit value for the current compressor state.

At block 2405, the AS-i master issues a "data_exchange" message to the AS-i slave 1520, which is then communicated to the microprocessor 1505 on channels DO0 to DO3. The "data_exchange" message includes a four-bit value pointing to one of the sixteen nibbles of the selected block. The slave responds with a dummy value, which is ignored (block 2405).

At block 2410, the AS-i master issues a second "data_exchange" message to the AS-i slave 1520, which is then communicated to the microprocessor 1505 on channels DO0 to DO3. The second "data_exchange" message includes a four-bit value that is written to the selected nibble. The slave responds with a dummy value, which is ignored (block 2418). At block 2420, the master controller determines whether all nibbles for the requested parameter have been communicated. If the result is affirmative, the master controller exits the write routine. If the result is not affirmative, then the network repeats blocks 2405, 2408, 2415, 2418 and 2420. Therefore, the network decomposes, transmits, and writes variable length data in four-bit packets.

Figure 2:
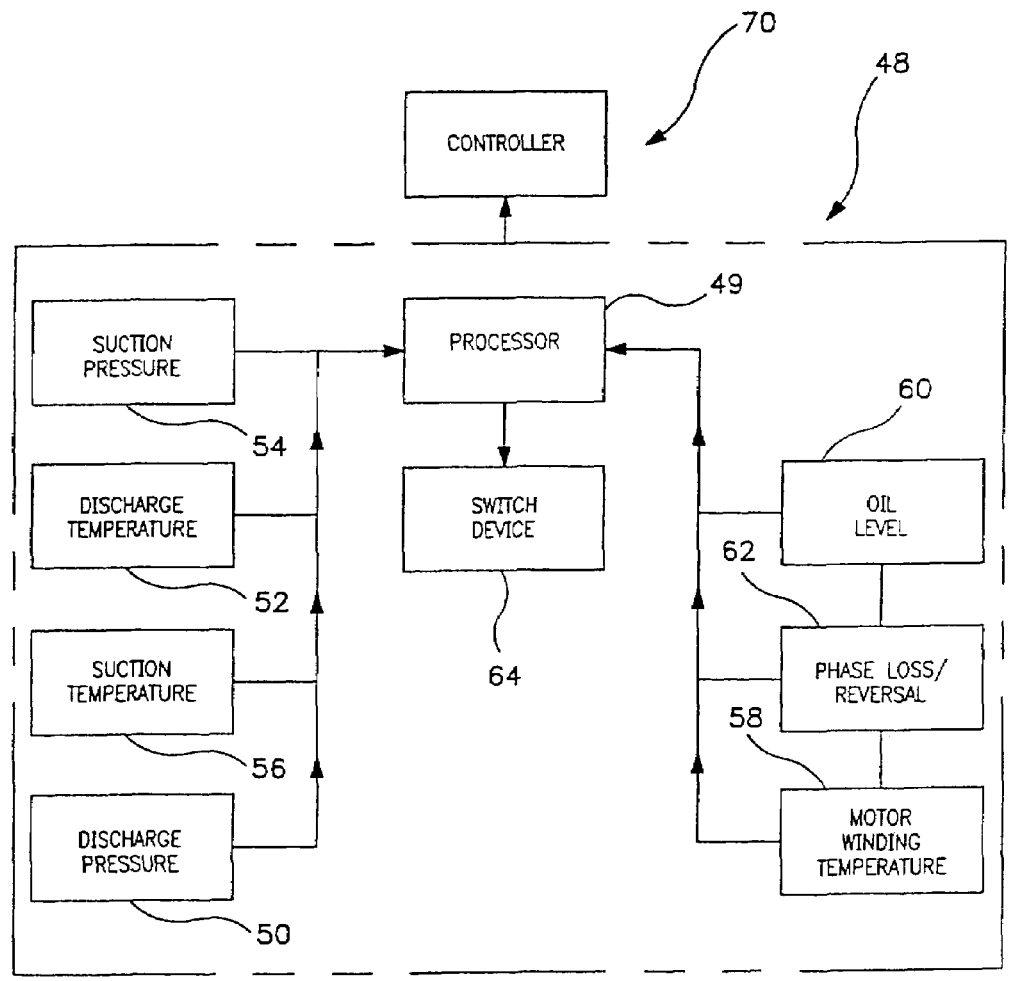
FIG. 2 is a schematic representation of one construction of a bus compatible compressor safety and control module.

Referring again to the constructions shown in FIGS. 1, 2, and 15, when one or more of the inputs from the sensors 50–62 (or 1525–1555) to the processor 49 (or 1503) traverses a safety limit value, the processor 49, for these constructions, loads a safety exception message for the master controller 70 and immediately shuts down the compressor (e.g., compressor 14B). The safety exception message is loaded into the top of the stack of information to be sent to the master controller. When the processor 49 receives a message from the master controller 70, it responds by including the safety exception message for the master controller. The master controller 70 knows not only that one of the safety limit values for a particular compressor was traversed, but which safety parameter or parameters were traversed and in most instances the actual values of those parameters. An alarm can be activated by the master controller 70 to alert the appropriate persons that a problem exists. The information can be accessed by a technician via a suitable HMI in the system (located, for example, at the controller 70), or remotely such as through an Internet connection. The information regarding the operating parameters of the properly functioning compressors (e.g., 14A, 14C) can also be accessed in this manner.

In some constructions, the BCCSCM 1503 (or 48) includes digital sensors. If a sensor is a digital sensor, the digital sensor can communicate a code indicating a fault has occurred at the sensor. Alternatively, the digital value or voltage received from the sensor can indicate faulty wiring (e.g., an open or short circuit) or a faulty transducer. Similar to what was discussed above, the processor 1503 (or 49) can load a message for the master controller 70 informing the controller of the sensor error. The message is loaded into the top of the stack of information to be sent to the master controller 90. When the processor 1503 receives a message from the master controller 70, it responds by including the message for the master controller. An alarm can be activated by the master controller 70 to alert the appropriate persons that a problem exists. Other control modules (discussed below) can operate similarly.

In some constructions, the compressor having a faulty sensor may continue to operate. For example, in one construction, each BCCSCM 1500 includes sensors that sense, among other things, suction pressure. Theoretically, the suction pressure for each compressor 14 attached to the same suction header should have the same pressure (but practically, may slightly differ due to filters and pipe length). If one of the compressors (e.g., compressor 14A) has a faulty suction pressure sensor, the master controller 70 can use the sensed suction pressure of the other compressors (e.g., 14B and/or 14C) attached to the same suction header (e.g., suction header 16) as the compressor (e.g., 14A) having the faulty sensor to control that compressor (e.g., 14A). Alternatively, the system can include a pressure sensor coupled to the suction header 16 (or piping in communication with the suction header) to control operation of a compressor having a faulty sensor. In addition to using the redundant value at the master controller 70, the master controller can communicate the redundant value to the BCCSCM having the faulty suction pressure sensor. Therefore, the refrigeration system can use the redundancy of the attached sensing devices to continue operation of a compressor (or other subsystem) having a faulty sensor, even though the compressor (or other subsystem) includes the faulty sensor.

Before proceeding further, it should be noted that, although the failed sensor was a sensor that measures suction pressure, the system can perform similarly for other sensors (e.g., suction temperature, discharge pressure, discharge temperature, etc.) and for other sensors attached to other control modules (discussed below). Additionally, the master controller 70 can compare values acquired from sensors that should have similar or substantially similar values to determine whether one of the sensors is faulty (e.g., a faulty sensor due to drift). Continuing the above example, the master controller 70 can compare the sensed suction pressure for compressors 14A, 14B, and 14C. If one of the sensed values (e.g., the suction pressure for compressor 14A) is significantly different than the values of the other compressors (or different than a sensor attached to the suction header 16), then the master controller 70 can mark the suction pressure sensor having the significantly different value as faulty. An alarm can be activated by the master controller 70 to alert the appropriate persons that a problem exists. Additionally, the master controller can communicate the fault to the compressor having the faulty sensor.

As discussed herein, the master controller 70 receives information concerning operation parameters of the compressors 14A, 14B, and 14C. A primary control parameter is suction pressure. The controller 70 is programmed so that it manipulates (e.g., such as by averaging) the suction pressure readings from the BCCSCMs 48 to determine the refrigeration level produced by the multiplexed compressors 14A, 14B, and 14C. The controller 70 uses this information to strategize cycling compressors in the system to achieve the desired refrigeration capacity level.

One exemplary method of dynamically controlling a plurality of multiplexed compressors (e.g., compressors 14A, 14B, and 14C) is schematically shown in FIGS. 16A–16F. The flowcharts represent one or more software modules that are continuously called by the CPU 72 to dynamically control the multiplexed compressors. Before proceeding further, it should be noted that the blocks of FIGS. 16A–16F represent software instructions received, interpreted, and executed by the CPU 72, resulting in the CPU 72 (and the master controller 70) performing the operations of the blocks. It should also be noted that FIGS. 16A to 16F is one exemplary method. Other acts can be included with the method shown in FIGS. 16A–16F, one or more acts shown in FIGS. 16A–16F can be removed, and the order or sequence of the acts shown in FIGS. 16A–16F can vary. Furthermore, while the method shown in FIGS. 16A–16F will be described in connection with software, the method can be implemented by other means (e.g., an ASIC).

Figure 16A:
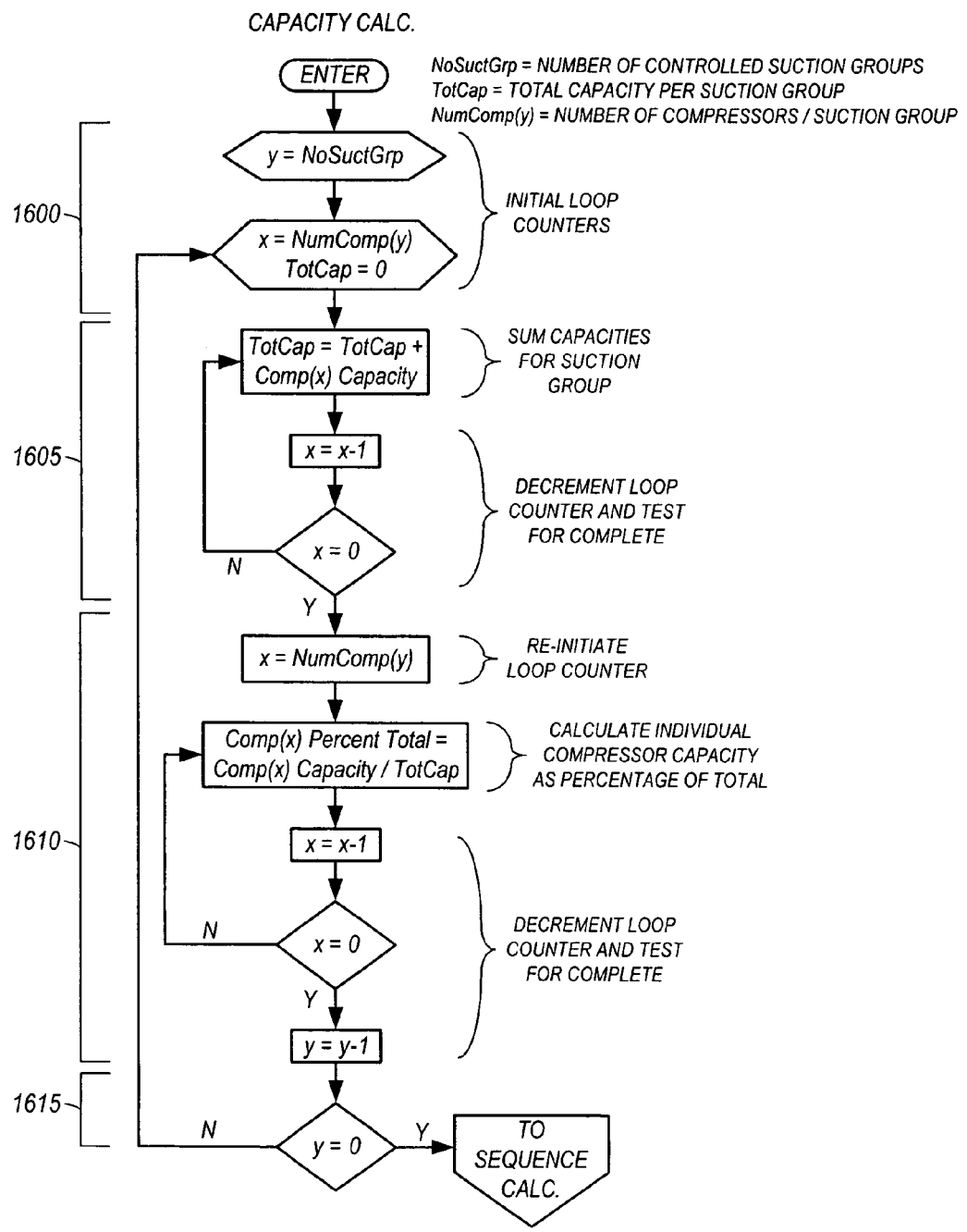
FIG. 16A-16F are flowcharts representing one method of dynamically controlling a plurality of multiplexed compressors.
Figure 16B:
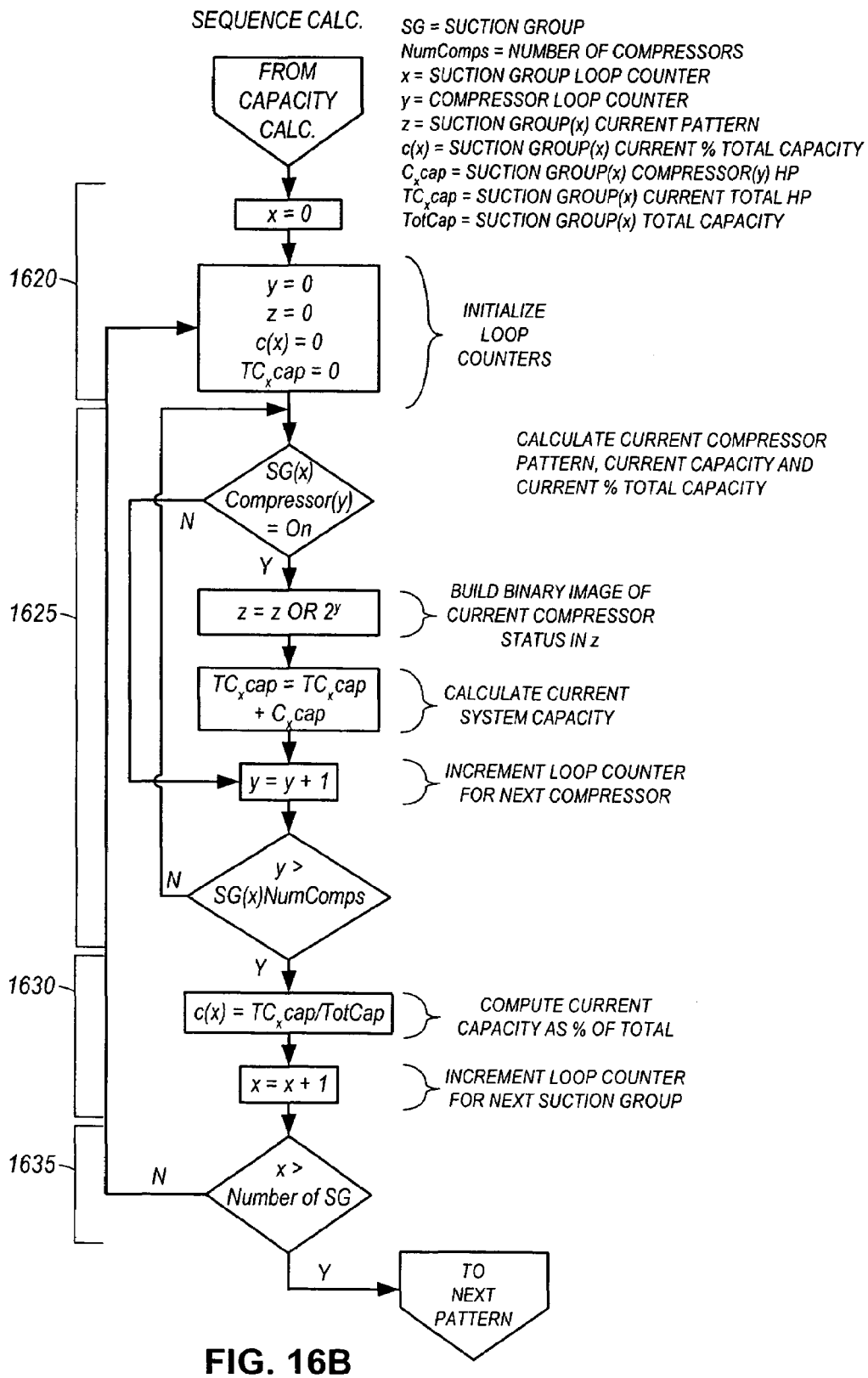

As discussed earlier, the refrigeration system includes one or more multiple suction groups, where each suction group has one or more compressors. If a suction group has a plurality of compressors, the compressors are multiplexed in an arrangement (typically a parallel arrangement). Referring to FIG. 16A, the master controller 70 performs a capacity calculation for each suction group and each compressor of each suction group. At blocks 1600, the master controller 70 initializes the loop counters. At blocks 1605, the master controller 70 determines (e.g., calculates by adding capacities for each compressor (as shown in FIG. 16A), obtain previous calculations from storage, etc.) the total capacity for the suction group at a given operating point. The master controller 70 uses known equations for determining the capacity of each compressor at the current operating pressures when performing the capacity calculations. At blocks 1610, the master controller 70 determines the capacity of each individual compressor as a percentage of the total capacity. By way of example, if a first suction group has three compressors (e.g., 14A, 14B, and 14C), the first compressor (e.g., 14A) may have a 50% capacity, a second compressor (e.g., 14A) may have a 25% capacity, and a third compressor (e.g., 14A) may have a 25% capacity. At block 1615, the master controller determines whether the capacity calculations were performed for all of the suction groups. If the answer is affirmative, then the master controller proceeds to block 1620 (FIG. 16B). Otherwise, the master controller returns to block 1605.

Figure 16C:
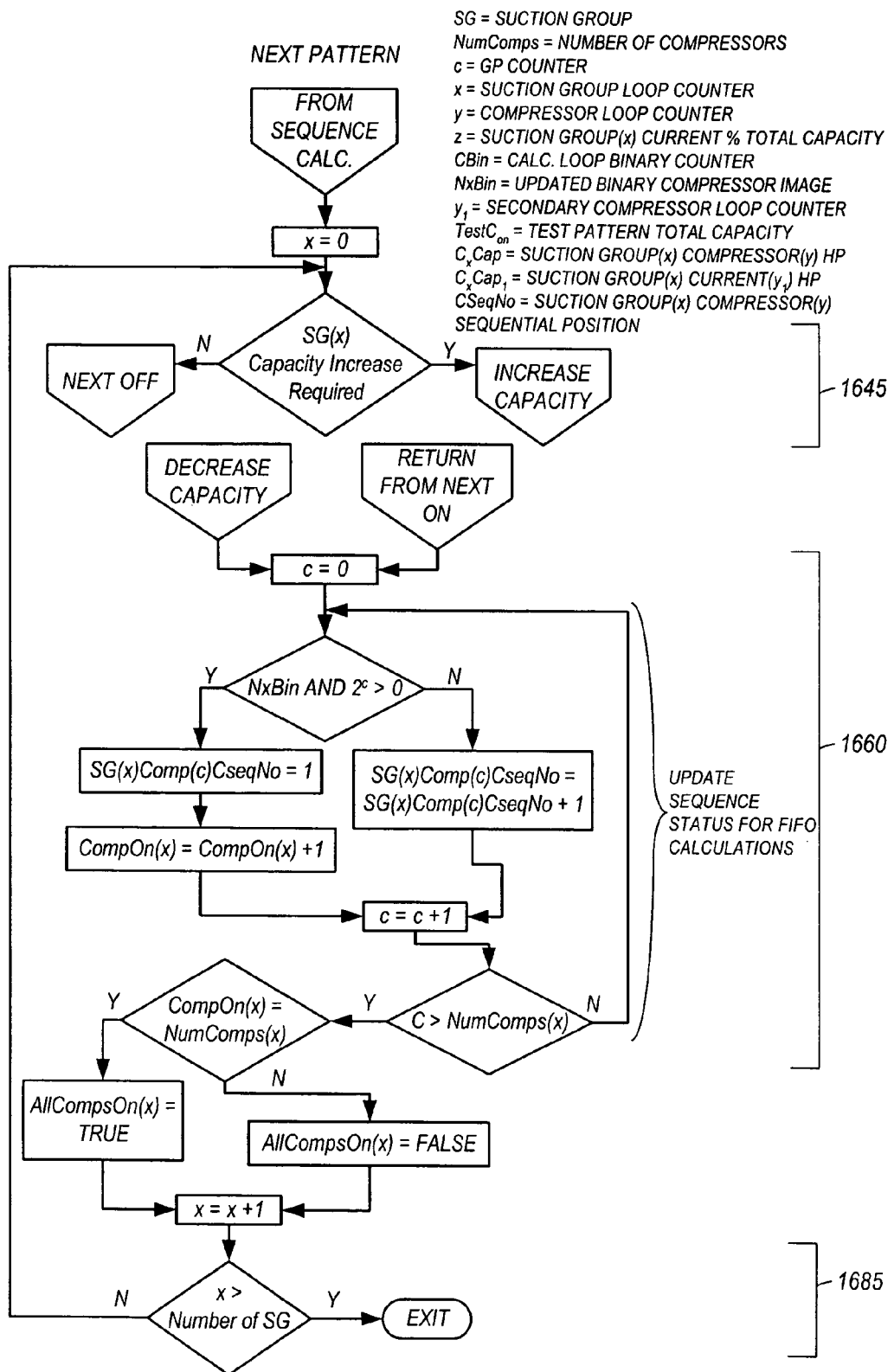

At FIG. 16B, the master controller determines a current compressor run pattern, current run capacity, and current % total capacity. At blocks 1620, the software initializes the loop counters. At blocks 1625, the master controller 70 builds a binary image of the status of the compressors 14 and determines the current run capacity of each suction group. More specifically, the master controller 70 determines which compressors 14 are currently on, and adds the capacity of each activated compressor 14 to the current run capacity for the respective suction group(s). At block 1630, the master controller 70 determines the current run capacity of each suction group as a percentage of the total capacity of each suction group. Continuing the earlier example, if the second and third compressors 14B and 14C are ON, then the current run capacity is 50% of the total capacity. At block 1635, the master controller determines whether the capacity calculations were performed for all of the suction groups. If the answer is affirmative, then the master controller proceeds to block 1640 (FIG. 16C). Otherwise, the master controller returns to block 1620.

Figure 16D:
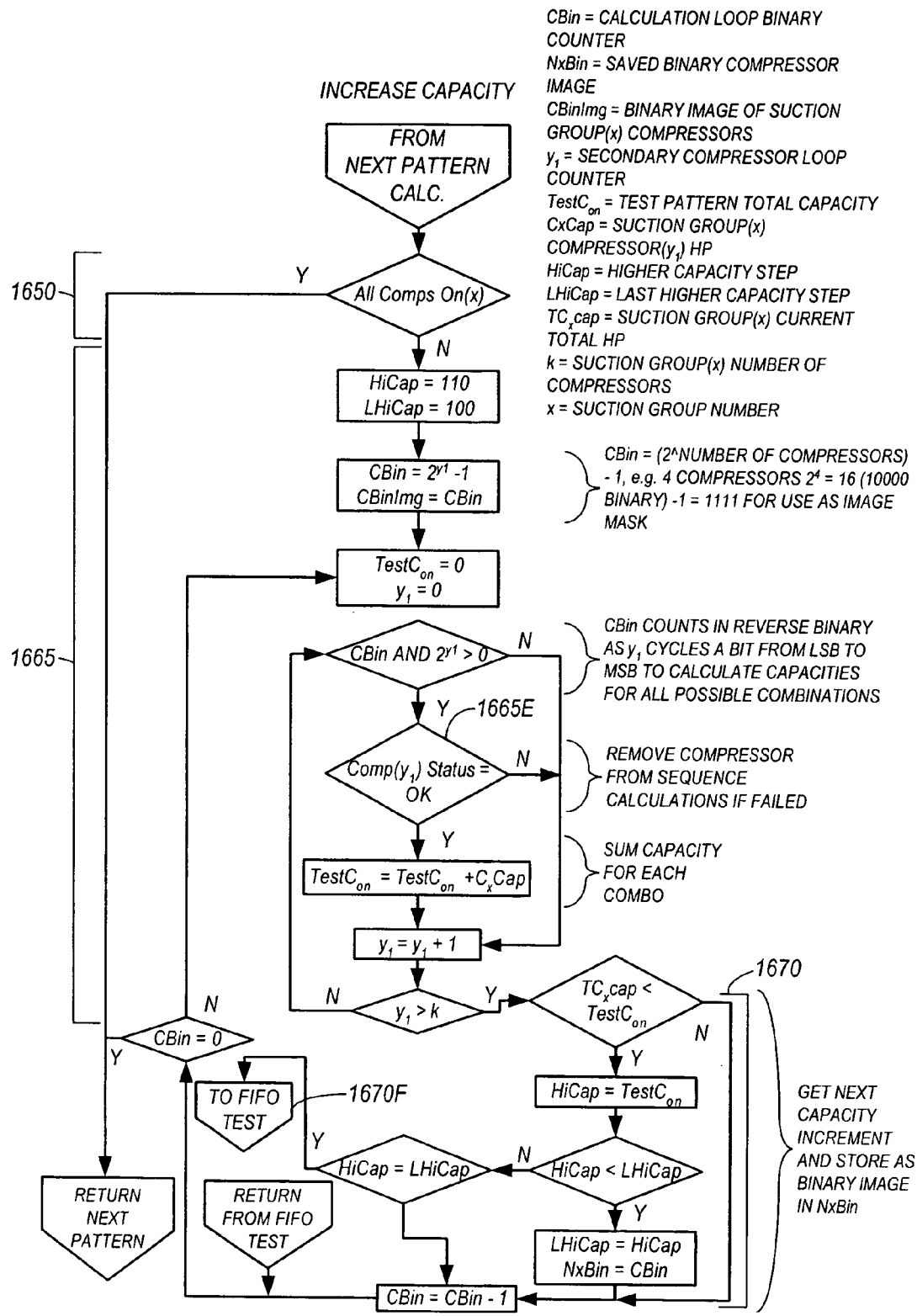
Figure 16E:
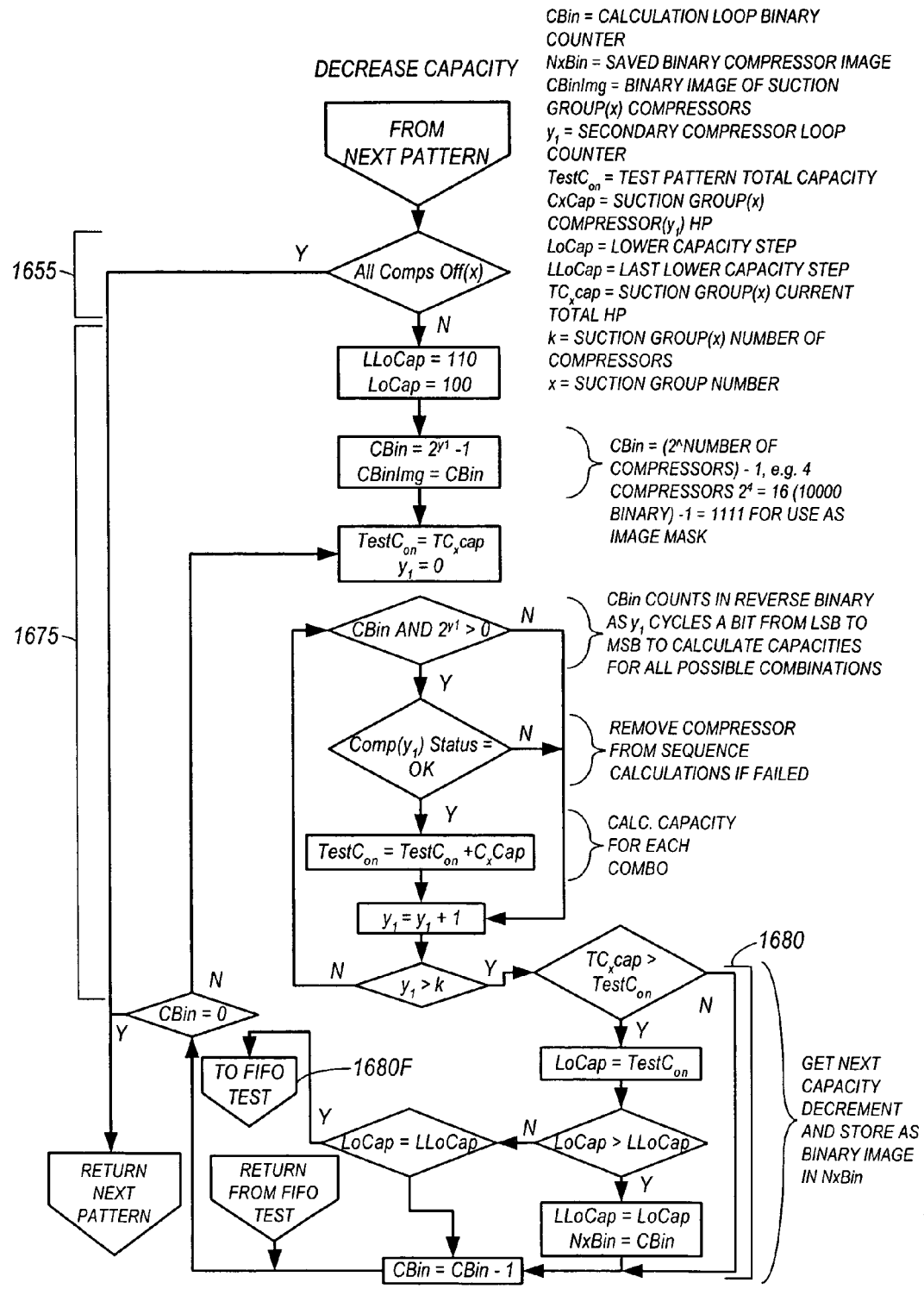
Figure 16F:
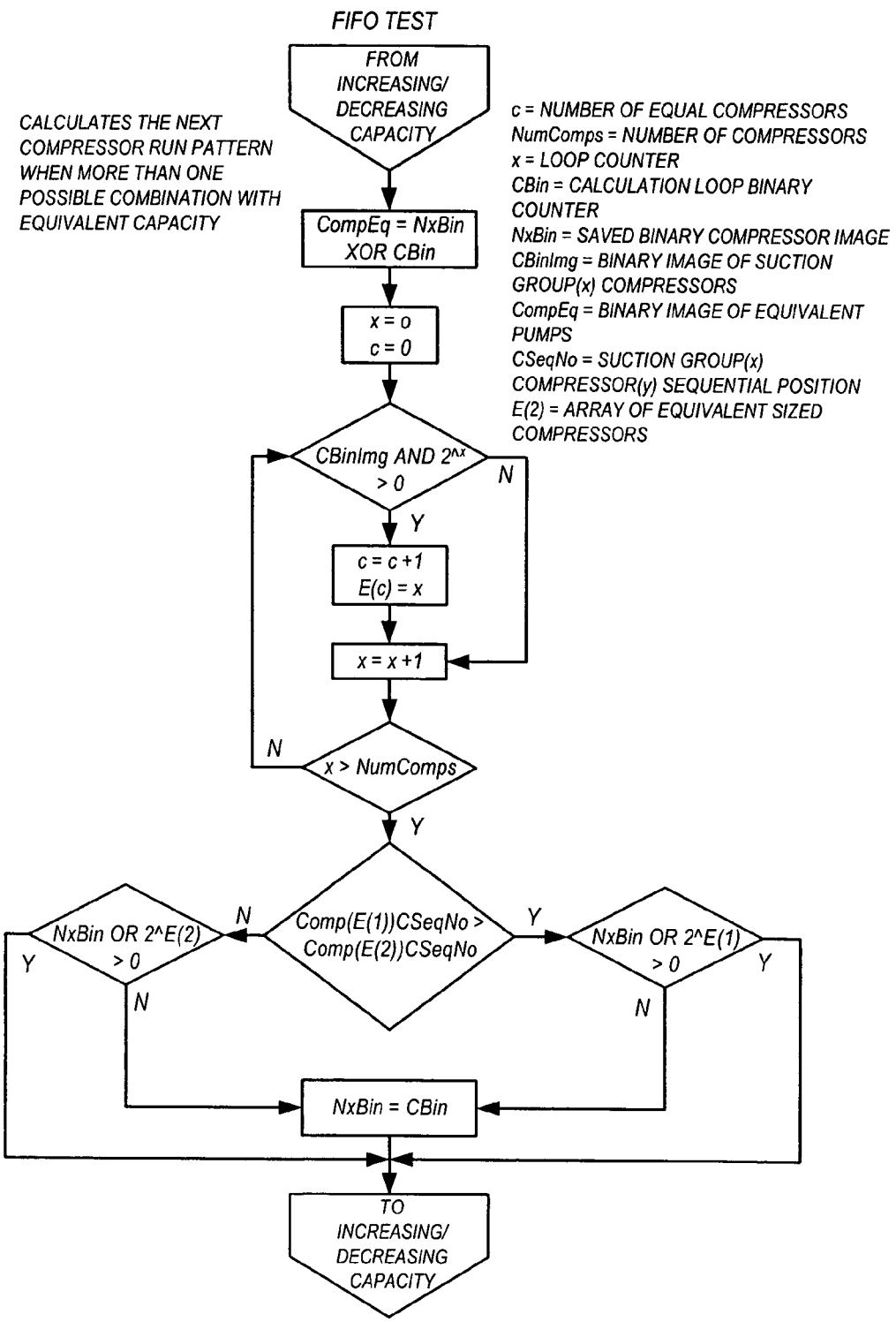
Figure 22A:
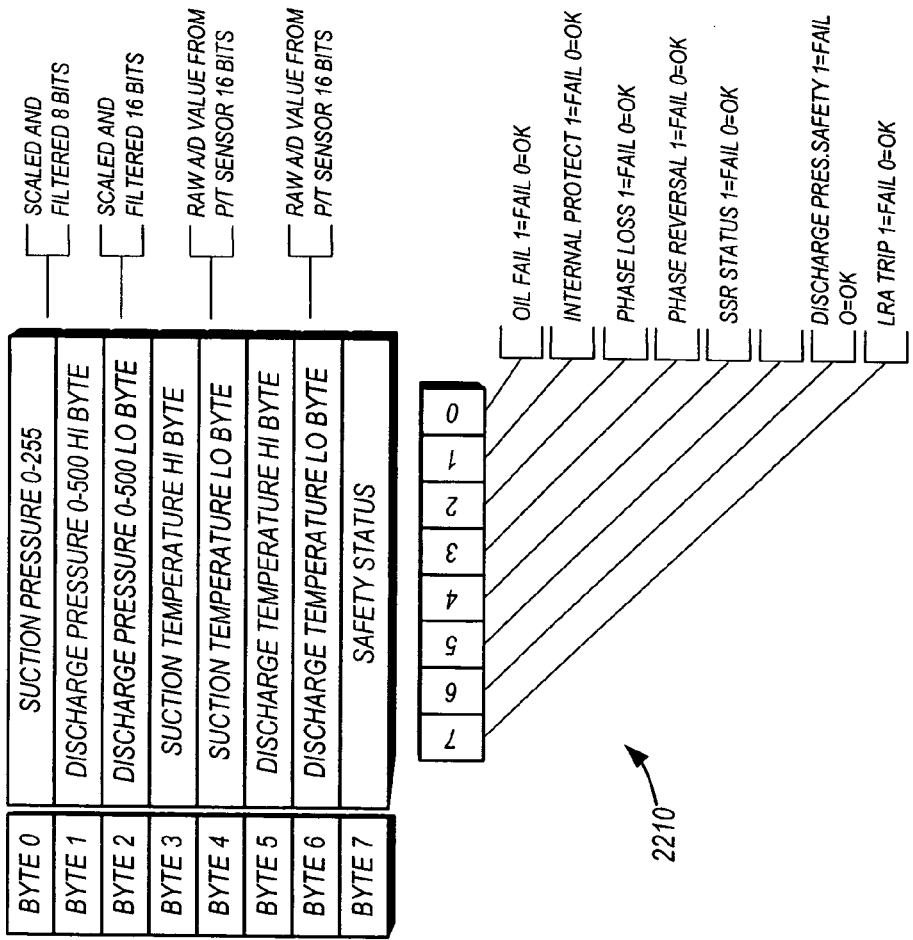
FIGS. 22A, 22B, 22C, and 22D are schematic representations of a 256-bit memory coupled to the microprocessor 1505 in FIG. 15.
Figure 22B:
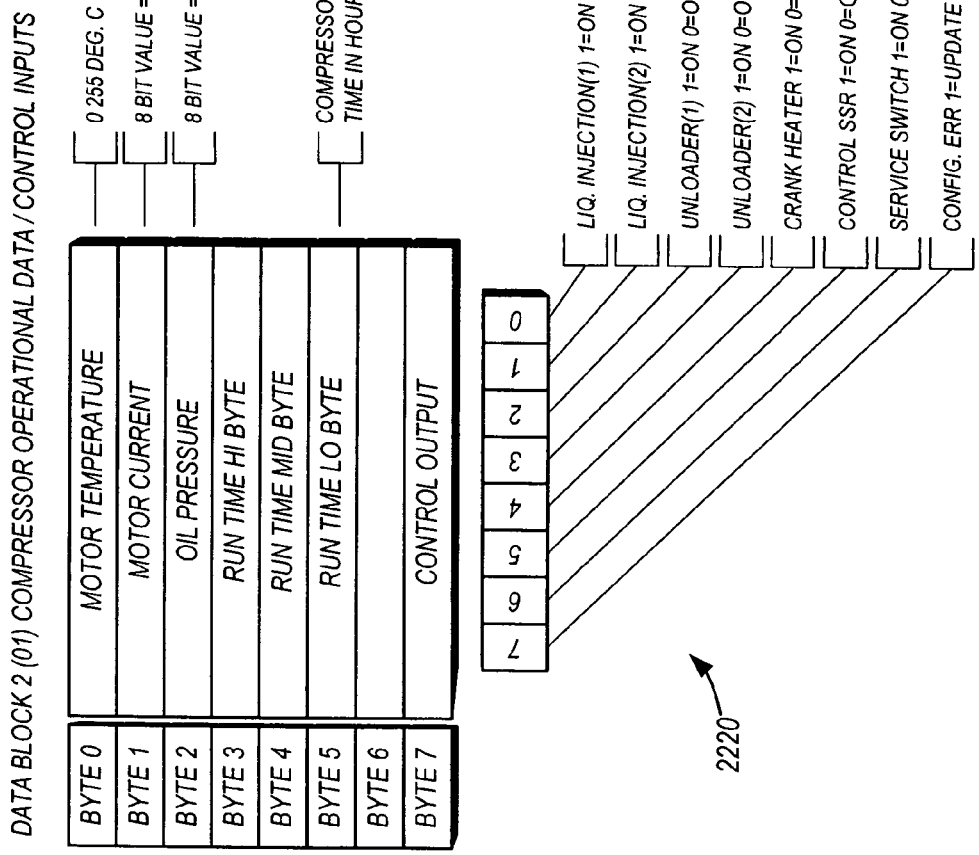
Figure 22C:
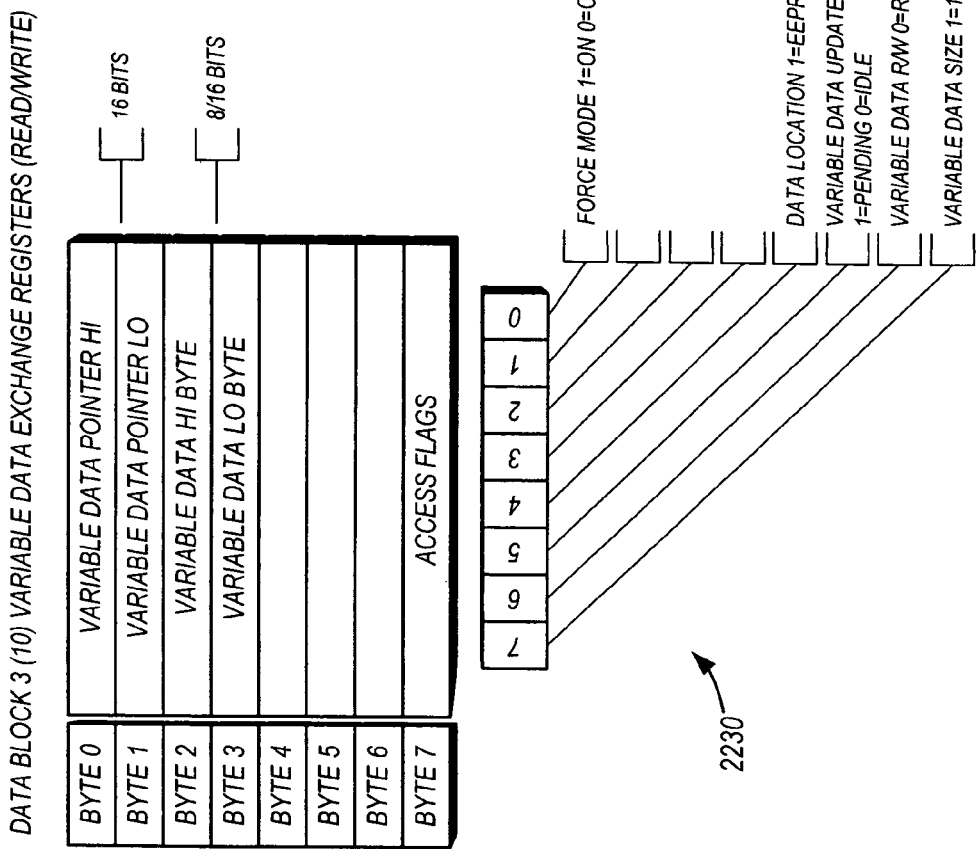
Figure 22D:
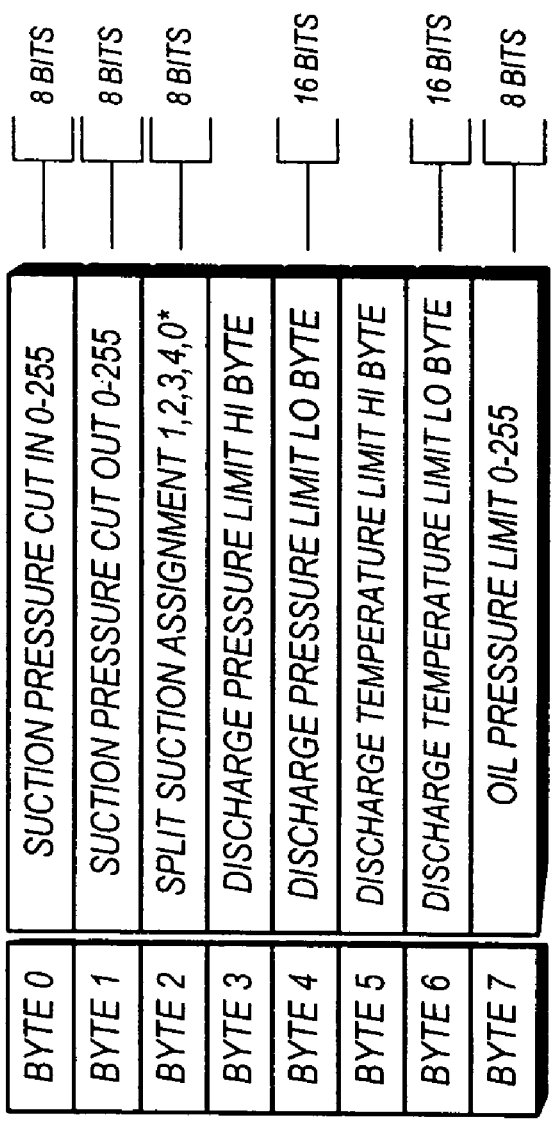

In FIGS. 16C–16F, the master controller 70 determines the control pattern for the next cycle. At block 1645, the master controller 70 determines whether an increase in run capacity is required. If the answer is affirmative, then the master controller proceeds to block 1650 (FIG. 16D). Otherwise, the master controller proceeds to block 1655 (FIG. 16E).

With reference to FIG. 16D, the master controller 70 determines the next control pattern, which requires an increase in run capacity. Increasing the run capacity of a suction group typically requires activating an inactive compressor. At block 1650, the master controller determines whether all compressors are ON. If the answer is affirmative, then the master controller proceeds to block 1660 (FIG. 16C). Otherwise, the master controller proceeds to blocks 1665 (FIG. 16E). At blocks 1665, the master controller 70 determines each available capacity percentage combination for each suction group. Continuing the earlier example, the percentage combinations for compressors 14A, 14B, and 14C include 25%, 25%, 50%, 50%, 75%, 75%, and 100%. However, if one of the compressors has an alarm condition, that compressor is removed from the possible combinations (block 1665E). At blocks 1670, the master controller 70 determines the next capacity increment. Revisiting the earlier example, the second and third compressors 14B and 14C were ON resulting in a 50% run capacity. The next available run capacity is 75% (i.e., activating the first compressor 14A with either the second or third compressors 14B or 14C). At block 1670F, the master controller 70 performs a "FIFO test." The FIFO test (shown in detail in FIG. 16F) determines the next compressor run pattern when multiple possible combinations have an equivalent run capacity. That is, if blocks 1665 and 1670 result in multiple combinations for the next available capacity, the FIFO test determines the next compressor run pattern. Continuing the earlier example, the next available run capacity for the three compressors 14A, 14B, and 14C is 75%, and there are two combinations that result in that run capacity (i.e., compressors 14A and 14B, or compressors 14B and 14C). In the configuration shown in FIG. 16F, the master controller 70 selects the most optimal run pattern for the compressors 14. For example, the most optimal run pattern can include compressor run time as a variable. Optimizing the run pattern with compressor run time attempts to equitably distribute compressor run time over the compressors of the suction group. However, other tests can be included in selecting the next compressor run pattern.

Returning to block 1645, the master controller determines whether an increase in run capacity is required. If the answer is negative, then the master controller 70 proceeds to block 1655 (FIG. 16E). In general, the control scheme of FIG. 16E corresponds to FIG. 16D; however, the master controller 70 decreases the run capacity of the suction group. Decreasing the run capacity typically requires deactivating an active compressor.

At block 1655, the master controller 70 determines whether all compressors 14 are OFF. If the answer is affirmative, then the master controller 70 proceeds to block 1660 (FIG. 16C). Otherwise, the master controller 60 proceeds to blocks 1675 (FIG. 16E). At blocks 1675, the master controller 70 determines each available percentage combination for each suction group. Blocks 1675 generally correspond to blocks 1665 (FIG. 16D). At blocks 1680, the master controller determines the next capacity decrease. Revisiting the earlier example, the first and second compressors were ON resulting in a 50% run capacity. The next available run capacity decrement is 25% (i.e., activating the second or third compressors 14B or 14C). Similar to 1670 discussed above, at block 1680F, the master controller 70 performs a "FIFO test." The FIFO test (shown in detail in FIG. 16F) determines the next compressor run pattern when multiple possible combinations have an equivalent capacity. That is, if blocks 1675 and 1680 result in multiple combinations for the next available capacity, the FIFO test determines the next compressor run pattern. Continuing the earlier example, the next available capacity for the three compressors 14A, 14B, and 14C is 25%, and there are two combinations that result in that capacity (i.e., activating the second or third compressors 14B or 14C). In the configuration shown in FIG. 16E, the master controller selects the next compressor run pattern.

Returning back to blocks 1660 (FIG. 16C), the master controller 70 updates sequence status information in view of FIFO calculations. More specifically, the master controller keeps a continuous runtime for each compressor 14A, 14B, and 14C. This information is used in the FIFO calculations when multiple capacities are possible. At block 1685, the master controller 70 exits the software routine, resulting in a pattern for each suction group.

In one construction, the routine shown in FIG. 16 is called when a change in capacity for a suction group is required. More specifically, in one construction of the refrigeration system, a PID error signal is used for controlling the operation of the compressors 14. If the error signal requires a change in capacity, the CPU 72 invokes the routine in FIG. 16, resulting in a new run pattern.

Figure 5:
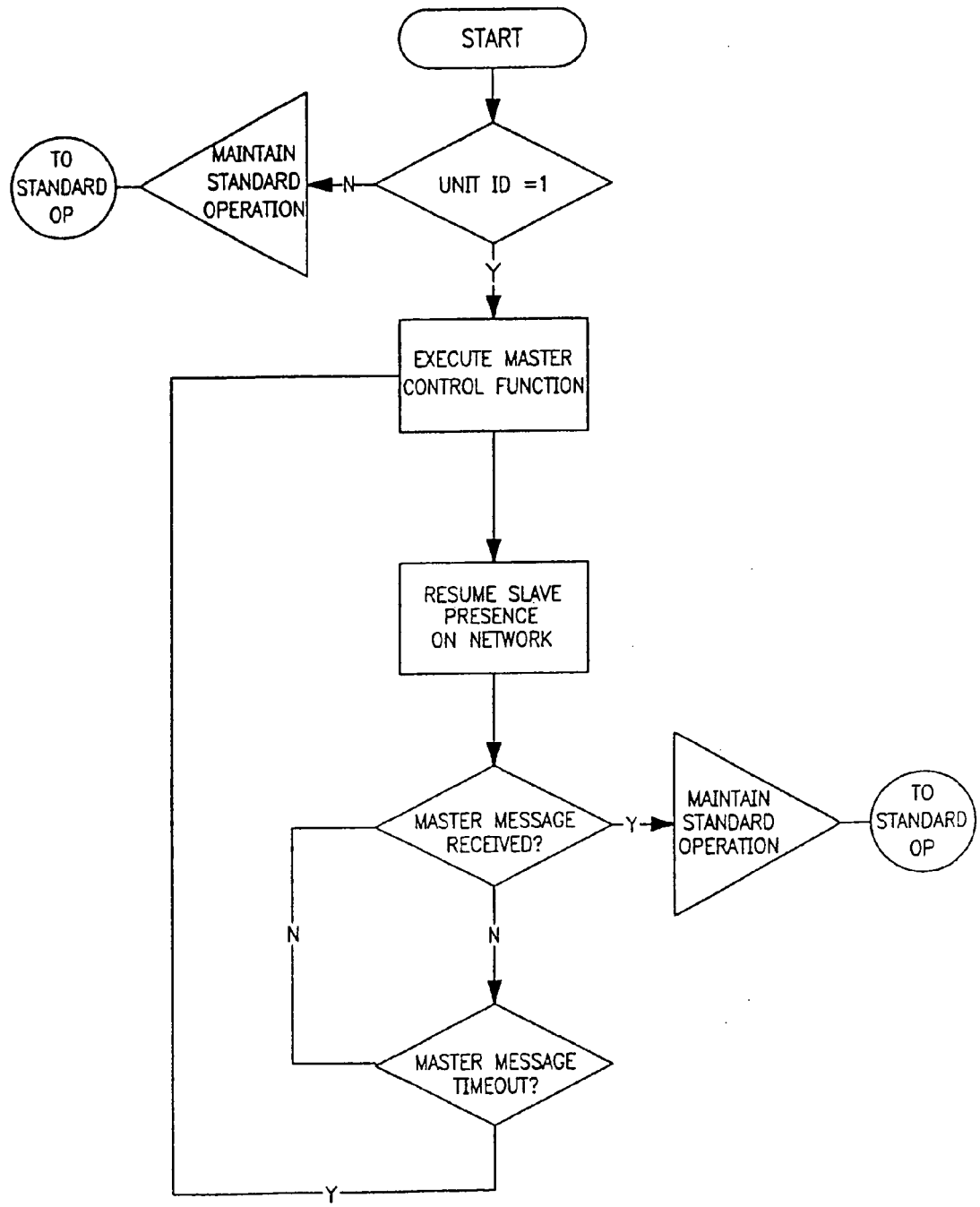
FIG. 5 is a flow diagram illustrating an exemplary operation of the control and safety module in a master controller failure mode.

In one construction, should the master controller 70 (and in particular the CPU 72) fail, the BCCSCMs 48 and 1500 are capable of performing the controller functions for the compressors 14A, 14B, and 14C. A flowchart of the one operation of the processors 49 (or 1503) in the master fail mode is shown in FIG. 5. As stated above with reference to FIG. 4, the processor 49 of each BCCSCM 48 waits a predetermined time period for a message from the master controller 70. If the period times out with no message, the processor 49 defaults to a master fail operation mode.

In the operation shown in FIG. 5, the BCCSCMs 48 (and/or 1500) communicate with each other over the communication and power line of the bus 80, in addition to communicating with the controller 70. In the failure mode, each processor 49 (or 1503) determines whether it is to have primary control. One processor of the BCCSCMs will have previously been programmed with a certain identification or address, e.g., ID=1. Typically, this would be the BCCSCM 48 of the first compressor 14A in the system. Any BCCSCM 48 not having this identification will continue to operate only responsively to commands received over the field bus network (i.e., it resumes standard operation as a slave). It is also envisioned that the slave processors (i.e., processors associated with compressors 14B, 14C) would start a second timer once entering the failure mode to look for a message from the processor of the BCCSCM 48 designated for primary system control in the failure mode (i.e., the processor 49 associated with compressor 14A). If the other processors 49 do not receive such a message, a second BCCSCM 48 would be pre-selected (e.g., the BCCSCM having ID=2 associated with compressor 14B) to control the operation of the system in the failure mode. Thus, the system is highly granular, allowing for multiple failures while maintaining operation.

In one method of operation, the processor 49 (or 1503) of the BCCSCM 48 (or 1500) of compressor 14 is identified as the primary control or master, in case of failure of the master controller 70, and will execute a master control function involving at least basic compressor cycling. In that regard, the primary control processor 49 is capable of determining the collective suction pressure of the operating compressors 14A, 14B, and 14C and providing control commands for itself and the other slave processors to turn compressors on and off to maintain the refrigeration capacity requirements of the system. After performing this function, the "primary" processor 49 resumes a slave presence on the network which allows it to again look for a message from the master controller 70 for a period of time before returning again to perform a system control function. Once the master controller 70 is detected, the primary control processor 49 returns to its standard (slave) mode of operation.

In general, the distributed intelligence control provides for ease of assembly and installation and enhances control. The compressors 14A, 14B, and 14C are configured with one or more sensors to optimize uniformity of measurement of operation parameters and to minimize installation variances as well as provide protection of such sensor devices. The modularity and intelligence of the compressor controllers interface with the master controller 70 to assure optimum compressor performance, as well as granularity of the system.

For the constructions utilizing a two wire bus that provides power and communication to the control modules (e.g., via an AS-i bus), assembly of a refrigeration system is made easier by simplification of the wiring which is normally done upon installation. The high voltage lines 44A, 44B, and 44C are still used to run the compressors 14A, 14B, and 14C for primary operation. According to electrical codes, it is typically required to shield these lines such as by placing them in conduit. However, for the construction shown in FIG. 1, no separate power lines other than three phase high voltage lines 44 must be run to the compressor motors 32. Additionally, it is unnecessary to run additional high voltage lines to the BCCSCM's. Instead, a single high voltage feed line 69 supplies the power supply 74 for the CPU 72 and communication module 76 and also the network power supply 78.

Power for all of the BCCSCMs 48 (and/or 1500) is supplied through the same two wire bus 80 extending from the communications module 76 to the control and safety modules 48. The bus 80 does not need to be shielded because it carries only 30 VDC power. Preferably, the wiring of the BCCSCMs 48 to the master controller 70 is done at the factory where the compressors 14A, 14B, and 14C are mounted together with the controller on a compressor rack (not shown) so that no power wiring of any kind for the BCCSCMs is required at the building site. The number of BCCSCMs 48 attached to the bus 80 up to some upper limit of the controller 70 (e.g., 31) is immaterial and requires no special re-configuration of the controller.

As stated above, the connection of the BCCSCMs 48 (and/or 1500) to the communication bus 80 achieves not only power, but communications for the control and safety modules. No separate feedback wiring from the individual sensors is necessary. The processor 49 (or 1503) of the BCCSCM executes commands from the master controller 70 and is capable of reporting back to the controller 70 that the command has been executed. The processor 49 reports the readings from all of the sensors 50–58 or 1525–1555, and not only whether a safety limit value has been exceeded, but exactly which one it is and what the exact value was. This enables the master controller 70 to provide specific information to a repair technician without any additional wiring between the controller 70 and the BCCSCM 48. In addition to permitting refrigeration level control by the controller 70, the system allows the controller 70 to make other adjustments in the system and to monitor trends for use in failure prediction/avoidance.

The processors 49 (and/or 1503) of the BCCSCMs also, in one construction, have the embedded intelligence to operate the refrigeration system in case the master controller 70 fails. In that regard, the BCCSCMs 48 (and/or 1500) are capable of communicating with each other as well as the master controller 70 over the two wire bus 80. In case of failure of the master controller, one of the BCCSCMs will take over as master or "primary" and can perform at least the function of averaging the measured suction pressure readings from the operating compressors to determine refrigeration level and determine how to cycle the compressors to maintain a predetermined capacity.

Referring still to FIG. 1, the commercial refrigeration system may also optionally include one or more liquid subcoolers 15 and an oil separation and return subsystem 17. The general operation of liquid subcoolers is known in the art. An exemplary embodiment of a control system for controlling such a subcooler and/or such an oil separation and return system, in accordance with aspects of the present invention, is described in further detail below with respect to FIGS. 10 and 10A. Examples of oil separation systems are included in U.S. Pat. Nos. 4,478,050, 4,503,685, and 4,506,523, which are incorporated herein by reference.

Figure 1A:
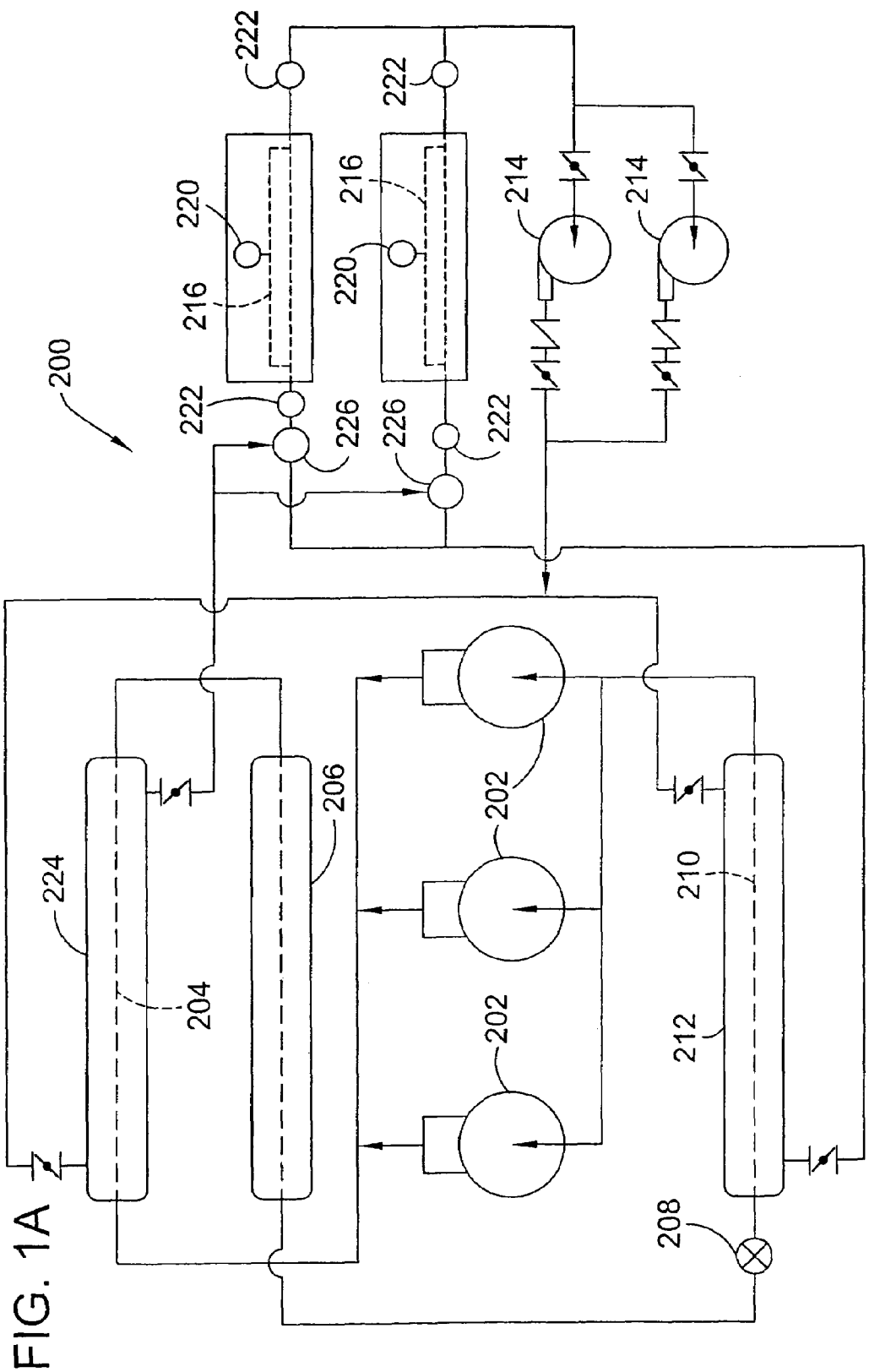
FIG. 1A is an schematic flow diagram of a second refrigeration system suitable for use in connection with a distributed intelligence control system.

For purposes of disclosure and simplicity, the refrigeration so far described herein has been, primarily, a vapor phase evaporative cooling system. The invention, however, is not to be so limited in its application. For example, FIG. 1A is a schematic diagram of one exemplary form of a modular secondary refrigeration system 200 which could also be modified to be implemented and controlled by an integrated distributed intelligence control system. Such a secondary cooling system is described in exacting detail in U.S. Pat. No. 5,743,102, the entire disclosure of which is incorporated herein by reference.

Referring to FIG. 1A, the refrigeration system 200 comprises a primary vapor phase refrigeration system including a plurality of parallel, multiplexed compressors 202. The compressors deliver liquid refrigerant at high temperature and pressure to a first condenser 204 and a second condenser 206 from which the liquid refrigerant passes to an expansion valve 208 feeding the refrigerant into an evaporator 210. Vaporous refrigerant is drawn from the evaporator 210 back to the compressors 202 to complete a conventional vapor phase refrigeration cycle. However, the evaporator 210 is incorporated as part of a first heat exchanger including a first reservoir 212 holding a coolant liquid (e.g., glycol). Typically, this reservoir 212 is located close to the compressors and condensers so that the vapor phase refrigerant loop is short, requiring minimal refrigerant. The first reservoir 212 is part of a secondary refrigeration system including pumps 214 which drive coolant fluid through the reservoir to second heat exchangers 216 located in respective fixtures 218, which may constitute refrigerated merchandisers in the shopping arena of a supermarket. The coolant liquid absorbs heat from items (not shown) in the fixtures 218, while remaining in a liquid state, and then is forced by the pumps 214 back to the first reservoir 212 where that heat is removed to the vapor phase refrigeration system. The vapor phase refrigeration system may beneficially be, but is not necessarily, located adjacent to the fixtures 218. The temperature of the fixtures 218 may be maintained through the use of sensors (e.g., sensors 220) which control valves 222 and the pumps 214. The control system, in one construction, may be beneficially used to control the operation of the primary vapor phase and secondary liquid refrigeration systems according to the principles set forth herein.

The refrigeration system 200 further includes a coolant liquid defrost system comprising a second coolant liquid reservoir 224 that contains the first condenser 204. The coolant liquid system pumps 214 are valved to divert some of the coolant liquid to the reservoir 224 where it is heated by the hot refrigerant passing through the first condenser 204. At a predetermined interval or when it is sensed that frost has built up on the second heat exchangers 216, valves including defrost valves 226 are controlled to stop the flow of cold coolant liquid from the first reservoir 212 to the second heat exchangers 216 and to permit flow of heated coolant liquid to the second heat exchangers for defrosting. Again, the control system can be beneficially employed to control operation of the defrost of the system 200. Additional aspects of secondary cooling systems, including specific valving and flow control structures, are disclosed in U.S. Pat. No. 5,743,102. Accordingly, one skilled in the art having the benefit of the present disclosure could adapt the teachings herein for use with secondary cooling systems by providing similar distributed, modular control and monitoring of the compressors, valves, set points, and other components/sensors associated with such secondary cooling systems.

Figure 7:
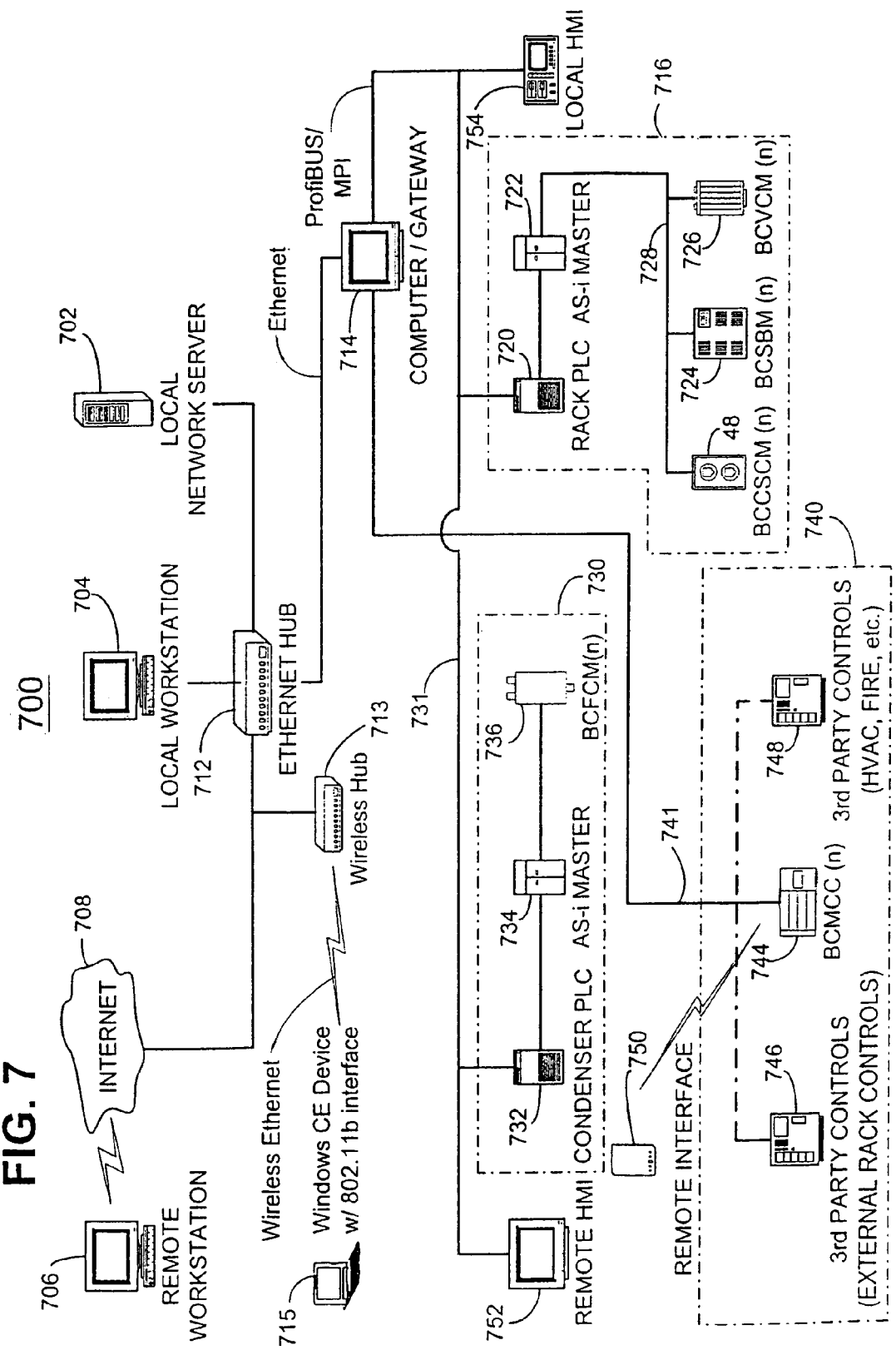
FIG. 7 is a system block diagram illustrative of aspects of a commercial refrigeration system.

FIG. 7 is a system block diagram illustrative of an integrated distributed intelligence control system 700 for use in a refrigeration application, such as a commercial refrigeration application. As depicted therein, the system 700 preferably includes several field bus communication networks that cooperate to provide distributed intelligence system monitoring and control. A local network server 702, a local workstation 704, and a remote workstation 706 provide top-level control. In one construction, the local network server 702 and the local workstation 704 will be installed near the refrigeration system (e.g., inside the facility containing the refrigeration system). In one construction, the remote workstation 706 is constructed and configured to communicate via a wide-area network such as the Internet 708. Other network levels are preferably connected to the top-level via a communications interface, such as, for example, an Ethernet hub 712.

A first field bus control network 716, which preferably comprises an AS-i bus as previously described herein, is connected to the Ethernet hub 712 via a gateway interface device 714 and a rack PLC 720 (also referred to as the system controller). It is to be understood and appreciated that the rack PLC 720 illustrated in FIG. 7 corresponds to the CPU associated with master controller 70, which is illustrated and described with respect to FIGS. 1 and 2 above. Accordingly, the rack PLC 720 may also be referred to as the CPU or even as the master controller. One construction of the gateway interface device 714 is a Siemens IPC, which is a Windows NT® based computer. As explained in greater detail below, gateway interface device 714 is constructed and arranged to provide a gateway between similar and dissimilar field bus networks having similar and dissimilar network protocols. In other constructions, one or more operations described in connection with the remote workstation 706, the local workstation 704, and/or the local network server 702 can be performed by the gateway interface device 714 and vice-versa. For one exemplary construction, the device 714 can function as both the local workstation and the gateway interface. As another example, in some constructions that are discussed below, the device 714 includes one or more tables for use by the rack PLC 720. However, these tables can be located at the remote workstation 706 or the local workstation 704.

A wireless hub 713 may optionally be included to allow access to the control network by a work station over a wireless interface (e.g., a wireless Ethernet link), such as between a wireless computing device 715 (e.g., a Windows CE® compatible computer) and the Ethernet hub 712.

Local workstation 704, remote workstation 706, and wireless computer 715 can be used to access system information such as, for example, set points, defrost schedules, alarm logs, current system conditions (e.g., temperatures), and other system status and set point information. Likewise, these devices may be used to input system information such as set points or system schedules (e.g., defrost schedules or maintenance schedules).

The first field bus control network 716 also includes an AS-i master interface 722 which serves as a communication interface between rack PLC 720 and various control modules. The AS-i master interface 722 corresponds to the communication module 76 discussed above with respect to FIG. 1. The devices associated with the first field bus control network 716 may be generally referred to as "rack devices," or as being "located at the rack." This nomenclature is used because in the embodiment illustrated in FIG. 7, rack PLC 720 is installed at or near the rack of compressors for which it provides system integration and control. For example, a rack will typically include between two and thirty-one compressors, and a given installation may include multiple racks. Thus, a large system might have thirty-two racks of compressors, each controlled by a separate rack PLC that interfaces with a common processor or gateway device. In one construction, each rack PLC interfaces with computer/gateway interface device 714. The gateway device 714 accommodates for set point control, status monitoring, fault logging, data storage, and the like for each rack PLC (and the devices integrated by such rack PLC) in the system. For simplicity, FIG. 7 depicts an installation having only a single rack, and, accordingly, a single rack PLC 720.

Before proceeding further, it should be noted that aspects of the refrigeration system discussed herein are not limited to a refrigeration system having compressors located on a rack. Rather, one or more aspects discussed herein can be applied to systems having a single compressor unit and to systems having multiple single compressor units not located on a rack.

The control modules illustrated in FIG. 7 preferably include one or more compressor controllers (e.g., Bus Compatible Compressor Safety and Control Modules or BCCSCMs 48 or 1500), one or more branch controllers 724 (also referred to herein as Bus Compatible System Branch Modules 724 or BCSBMs), and one or more valve controllers 726 (also referred to herein as Bus Compatible Valve Control Modules or BCVCMs). The one or more compressor controllers 48 (or 1500), one or more branch controllers 724, and the one or more valve controllers 726 will also be generically referred to herein as device controllers and subsystem controllers. When connected to the first field bus control network 716, each of these modules 48, 724, and 726 communicates with rack PLC 720, via an AS-i compatible bus 728 and AS-i master 722. The operation of BCCSCM 48 has previously been described. The operational aspects of the BCSBM 724 and the BCVCM 726 are described in greater detail below. Of course, other constructions for the first field bus control network 716 can by used with the refrigeration system. For example, other field bus types can be used in place of the AS-i compatible bus 728.

A second field bus control network 730, which can also comprise another AS-i bus as previously described herein, is connected to gateway interface 714 and the master controller (rack PLC 720) over a relatively longer distance network 731 (e.g., a twisted pair network, such as, for example, a Siemens' MPI compatible interface or ProfiBUS). In one construction, the second field bus control network 730 is slaved to the rack PLC 720. However, other configurations are possible. Second field bus control network 730 includes a condenser PLC 732 (also referred to as condenser controller), another AS-i master 734, and one or more fan control modules 736 (also referred to as Bus Compatible Fan Control Modules or BCFCMs). For FIG. 1, the condenser PLC 732 corresponds to condenser controller 84, and may also be referred to as providing a network gateway between BCFCM 736 and rack PLC 720. Operational aspects of the condenser PLC 732, AS-i master 734, and BCFCM 736 were also described above with regard to FIG. 1. Of course, other constructions for the second field bus control network 730 can by used with the refrigeration system. For example, other field bus types can be used in place of the AS-i compatible bus.

A third field bus control network 740 communicates with rack PLC 720 over another relatively longer distance communication bus 741, such as, for example, a LonWorks® network (also referred to as a LonWorks® bus or an Echelon network). LonWorks® information and network components are available from the Echelon Corporation of Palo Alto, Calif. The third field bus control network 740 is used to facilitate communications between the master controller (rack PLC 720) and one or more refrigeration cases, which are controlled by one or more case/fixture controllers 744 (also referred to as Bus Compatible Modular Case Controls, BCMCCs, case controllers, or display case controllers), the operation of which is described below. Similar to the other device controller introduced earlier, the one or more case/fixture controllers 744 will also be generically referred to herein as device controllers and subsystem controllers. Communications between the BCMCC 744 and rack PLC 720 occurs via interface gateway 714 and the communication bus 741. The type of gateway device used will typically depend upon the bus/communication protocols employed. In the system illustrated in FIG. 7, BCMCC 744 operates on a LonWorks®/Echelon compatible bus, thus interface gateway 714 is constructed and arranged to integrate communications between such a bus and rack PLC 720. Of course, other constructions for the third field bus control network 740 can by used with the refrigeration system.

Also, as illustrated in FIG. 7, third party controls 746 and 748 (e.g., HVAC, fire, and rack/case controls) can optionally interface to, and become part of, system 700, via communication bus 741. Thus, the system facilitates interoperability between control systems from different sources that are compatible with the gateway and communication standard used for the associated communication bus (e.g., AS-i, ProfiBus, LonWorks®/Echelon or Ethernet). Using distributed intelligence control system 700, for example, third party controls 746 and 748 can be integrated and used if such controls are compatible with LonWorks®/Echelon interface standards and protocols. A third party fixture/case controller that is compatible with communication bus 741 and interface gateway 714 can be used to interface with and control one or more refrigerated fixtures (not shown) via a case/fixture controller (e.g., BCMCC 744). In one construction, the rack PLC 720 can advantageously continue to maintain integrative control over the entire system by retaining knowledge over the operation of BCMCC 744. Accordingly, even when third party controls are desired or required for a part of the overall refrigeration system, the advantages of modularity and distributed control made possible by the disclosed refrigeration system are not lost.

BCMCC 744 and the third party controls 746 and 748 may be collectively referred to as remote terminals associated with third field bus control network 740. In one construction, the communication bus 741 comprises a wireless RF interface (also referred to as an RF link) such that no wiring is required between the remote terminals and the interface gateway 714. Using a wireless RF interface provides substantial advantages, including reducing the amount and complexity of field wiring needed to install the system, and greatly reducing the risk of damage due to external influences such as lightening strikes, high voltage arcing, or high current transmissions in adjoining equipment/wiring. Such external influences are common in some geographic regions and can result in considerable system downtime and/or service expense. RF interfaces may be implemented using broad band spread spectrum (BBSS) transmission systems or narrow band on/off keyed (OOK) transmission systems. BBSS systems provide improved data integrity performance with respect to data transmitted in harsh electrical environments, and often provide higher data throughput rates. OOK systems, on the other hand, are typically less expensive to implement. It should be understood, however, that the third field bus control network 740 may be completely "hard wired" or partially wireless and partially hard wired.

A remote, wireless interface device 750 can be used by system operators, maintenance personnel, and the like to communicate directly with one or more case controllers such as BCMCC 744. In one construction, the interface device 750 comprises an infrared transceiver that operates as a remote keypad for a display module associated with the case controller. Thus, interface device 750 can be used to query case controllers to determine information such as current temperature or set point information or, optionally, to input set point data into case controllers. Such set point data can include, among other items, defrost schedules or temperature set point data. In the construction illustrated in FIG. 7, however, BCMCC 744 receives its primary control inputs from rack PLC 720.

In addition to the three field bus networks already described with respect to FIG. 7, the distributed intelligence control system 700 also includes local and remote human-machine interface (HMI) devices. A remote HMI device 752 provides user access to system status information, which is transmitted to the remote HMI device via network 731. In one construction, the remote HMI device 752 comprises a touch screen device, such as a TP 170A device, available from Siemens (part no. 6AV6545-0BA15-2AX0). Similarly, a local HMI device 754 provides user access to system configuration data, system status data, diagnostic data, and the like. The local HMI device 754 communicates with rack PLC 720, via network 731. In the construction illustrated in FIG. 7, the local HMI device 754 comprises an LCD display with a membrane keyboard, such as an OP3 device, which is available from Siemens (part no. 6AV3503-1DB10). Additional details regarding constructions of remote HMI device 752 and local HMI device 754 are provided in the Appendix.

One of the advantages of using a distributed intelligence control system, such as the system of FIG. 7, is that such a system is generally easier to install than conventional systems, which typically require multiple runs of high power wiring between the rack and each remotely located controlled device, such as display cases, as well as separate wiring to/from each system sensor. For example, prior art systems typically require at least one additional separate wire, often a high power wire requiring compliance with particular standards, for each system element being controlled.

In addition, the distributed intelligence control system is, in one construction, at least partially self-configuring. For example, each AS-i bus compatible device can generate its own unique identification (ID)/address. An AS-i master queries each device on the system, and that device tells the AS-i master its ID/address. For one example method of operation, each BCCSCM on control network 716 would indicate to rack PLC 720 that it is a compressor control module as well as its ID/address. In the event that a duplicate ID/address is generated, the AS-i master instructs the device to pick another value. Thus, as can now be appreciated, a complicated refrigeration control system can be installed with a reduced complexity in the installation process because persons installing the system need not concern themselves with all of the details associated with identifying and addressing each control module in the system.

Likewise and in another construction, each distributed control module in system 700 (e.g., BCCSCM 48, BCSBM 724, BCVCM 726, BCFCM 736, and BCMCC 744) includes processing capability, data storage capability, and provides configuration/set point mirroring, whereby the most recent system configuration and set point data for each module is stored in that module. Such configuration and set point data includes, for example, module ID/address information, control system set points (e.g., case temperature), defrost cycles, alarm history, and the like. Thus, if rack PLC 720 fails and needs to be reprogrammed or replaced, the entire system partially reconfigures itself and supplies the most recent configuration and set point data to the new/ repaired rack PLC. Similarly, if communication with rack PLC 720 is lost, each control module in system 70 can continue to attempt to maintain control by adhering to the most recent set points/schedules provided by rack PLC 720. In this way, the integrity and history associated with system 700 is maintained even when rack PLC 720 is replaced.

More detailed methods of operation for configuring a refrigeration system 700 will now be described in connection with FIGS. 7 and 17–22. When manufacturing or assembling a device or subsystem (e.g., an evaporator, a compressor, a condenser, a refrigeration case, a system branch, etc.) the device manufacturer or assembler (collectively referred to below as manufacturer) couples the device or subsystem controller (e.g., the BCVCM(s) 726, BCSBM (s) 724, BCCSCM(s) 48 and/or 1500, BCFCM(s) 736, BCMCC 744, condenser PLC 732) to the related device or subsystem. In addition, the device manufacture stores an identification code (e.g., model number, serial number, device type, etc.) for the device or subsystem (collectively referred to below as device) in the related device controller. As discussed in connection with FIG. 7, the device controllers are connected (either directly or indirectly) with the rack PLC 720 (which is also referred to as the system controller). Before proceeding further, it should be noted that the rack PLC may also be referred to as the system controller 720. However, unless specifically limited otherwise, other processing units can be used in place of or in combination with the rack PLC to perform one or more operations disclosed below.

With reference to FIG. 7, the one or more technicians assemble the physical structure of the refrigeration system. After or concurrent with assembling the physical structure, the one or more technicians activate the rack PLC 720 and the computer 714. Among other initial operations performed by the rack PLC 720 and the computer 714, the rack PLC 720 establishes a communication network with the devices of the refrigeration system and determines what devices are included with the refrigeration system. In general, the rack PLC 720 initiates one or more signals requesting the device controllers to identify themselves, and identify what devices are coupled to the device controllers (e.g., via the identification codes). Further, the rack PLC 720, with the help of the communication modules (e.g., the gateway interface 714, AS-i masters 722, 734, etc.), establishes the protocols and addresses for communication in the refrigeration system.

After establishing the communication network and the elements of the refrigeration system, the rack PLC 720, with the assistance of the PC interface 714, configures the refrigeration system by providing information (e.g., control and safety parameters, schedules, signals, etc.) to the device controllers. For example, the rack PLC 720 and/or the PC interface 714 includes in memory the identification codes for various devices that can be attached to the refrigeration system. As a specific example, hundreds of compressor models can be used in the refrigeration system and, consequently, the rack PLC 720 and/or the PC interface includes in memory an identification code (e.g., model number) for each possible compressor. Associated with each identification code in memory are limits, equations, values, and other information used by the refrigeration system for operation. Further, databases may also be used for obtaining information based on combination of identification codes. Using the identification codes, the rack PLC acquire values, parameters (control and safety parameters), equations, limits, etc. from memory; perform calculations using the acquired information (e.g., calculate values or limits for the one or more parameters, create schedules, etc.); and acquire similar information from other processing units. The information received at the device controllers is used by the device controllers to locally operate (or control) the devices.

The device controllers (e.g., the BCCSCM described earlier) can include one or more sensors that sense parameters identified by the rack PLC 720. The sensed values are communicated via the established communication network to the rack PLC 720. The rack PLC uses the sensed parameters, stored information/data regarding the refrigeration system, and information stored at the rack PLC (or at other processing units such as the PC interface 714) to operate (or control) the refrigeration system. Controlling the refrigeration system includes providing control signals and information to the device controllers for operating the devices.

Referring now to Tables 1–4, the tables disclose what parameters are maintained at each module for one construction of the refrigeration system. Table 1 discloses the parameters maintained at the compressor control module.

| Compressor Module (BCCSCM) Configuration Data | |
|---|---|
| Operating Parameter | Source |
| Compressor Model Number | Manufacture (User Input) |
| Suction Pressure Cut-In | System Controller |
| Suction Pressure Cut-Out | System Controller |
| Split Suction Assignment | System Controller |
| Discharge Pressure High Limit | System Controller |
| Discharge Temperature High Limit | System Controller |
| Motor Current Limit | System Controller |
| AS-i Address | Manufacture (User Input) |
| Compressor Type | System Controller |
| Number of Sensors | Internal Determination |
| Operating Voltage | System Controller |
| Oil Pressure Limit | System Controller |
| Oil Level Switch Enabled | Internal Determination |
| Motor Temp Limit | System Controller |

With reference to Table 1, the manufacturer of each compressor enters a compressor model number into the compressor control module. The compressor model number, when retrieved by the rack PLC 720, identifies the respective compressor. Using the compressor model number, the rack PLC 720 can obtain related data for the compressor. For example, based on the compressor model number, the rack PLC 720 can obtain the specifications for the compressor, such as compressor manufacture, compressor type (e.g., scroll, screw, reciprocating, etc.), capacity, safety limits, etc. Also, as discussed above, the rack PLC 720 communicates one or more operating parameters to the compressor control module. The parameters provided from the rack PLC 720 to the compressor control module are identified in column two of Table 1 as "System Controller." Other parameters may be communicated from the system controller to the control module and not all parameters are required for the control module in all constructions.

Referring again to Table 1, some of the parameters are established or calculated by the compressor control module. For example, the "number of sensors" parameter is an internal calculation performed by the compressor control module. For example and in one construction, the compressor control module polls for sensors connected to the module. Based on the response, the compressor module can determine how many sensors are connected to the module.

The oil level switch enabled parameter is also an internal determination for the construction shown in Table 1. For some compressor types (e.g., scroll compressors), an oil level switch is used to control the oil level of the compressor.

The compressor module performs an internal determination whether an oil level switch is attached and enabled.

Referring again to Table 1, the parameter "AS-i Address" is identified as a manufacturer or user input. The AS-i address parameter is used by the network for promoting communication between the system controller and the respective compressor module. The system controller can subsequently modify the AS-i address parameter to allow for automatic addressing of the attached device.

Table 2, System Module (BCSBM) Configuration Data, discloses the parameters maintained at the system branch control module for one construction of the refrigeration system.

| System Branch Module (BCSBM) Configuration Data | |
|---|---|
| Operating Parameter | Source |
| Case Model Number | Manufacture (User Input) |
| Defrost Schedule | System Controller |
| Discharge Air Temp Set Point | System Controller |
| Defrost Type | System Controller |
| Number of Defrosts per Day | System Controller |
| Discharge Air Temperature High Limit | System Controller |
| Defrost Termination Temperature | System Controller |
| AS-i Address | Manufacture (User Input) |
| Time and Date | System Controller |

Similar to what was discussed above for the compressor control module, the manufacture of each system branch control module enters a case model number into the control module. The case module number identifies the respective case model to the rack PLC 720. Using the case model number, the rack PLC 720 obtains information relating to the case and the system branch. Also, as discussed earlier, the rack PLC 720 communicates one or more operating parameters to the system branch control module. The parameters provided from the rack PLC 720 to the system branch control module are identified in column two of Table 2 as "System Controller." This information can be maintained at the system controller and at the individual modules. Other parameters may be communicated from the rack PLC 720 to the system branch control module and not all parameters are required for the system branch control module in all constructions. It is also envisioned that the identifying model number can be assigned by installation or service personnel via the system controller for field replacement of a failed device.

Referring again to Table 2, the parameter "AS-i Address" is identified as a manufacturer or user input. The AS-i address parameter is used by the network for promoting communication between the system controller and the respective system branch control module. The system controller can subsequently modify the AS-i address parameter to allow for automatic addressing of the attached device.

Table 3, Value Module (BCVCM) Configuration Data, discloses the parameters maintained at the value control module for one construction of the refrigeration system.

| Valve Module (BCVCM) Configuration Data | |
|---|---|
| Operating Parameter | Source |
| Valve Model Number/Application Code | Manufacture (User Input) |
| Number of Steps | Internal Determination |
| Failsafe Position | System Controller |
| AS-i Address | Manufacture (User Input) |

The manufacture of each valve enters a valve model number/application code into the valve control module. The valve model number identifies the respective valve attached to the valve control module. Using the valve model number, the system controller can obtain information relating to the valve. The parameter(s) provided from the system controller to the valve control module includes the failsafe position parameter for the valve. This parameter can be maintained at the system controller and at the individual modules. Other parameters may be communicated from the rack PLC 720 to the valve control module and not all parameters are required for the valve control module in all constructions.

Referring again to Table 3, the parameter "AS-i Address" is identified as a manufacturer or user input. The AS-i address parameter is used by the network for promoting communication between the system controller and the respective system branch control module. The system controller can subsequently modify the AS-i address parameter to allow for automatic addressing of the attached device.

Additionally, the "number of steps" parameter is a parameter established by the valve control module. For example, the "number of steps" parameter is an internal calculation performed by operating a stepper motor attached to the valve and determining the number of steps performed by the stepper motor.

Table 4, Case Control Module (BCMCC) Configuration Data, discloses the parameters maintained at the system branch control module for one construction of the refrigeration system.

| Case Control Module (BCMCC) Configuration Data | |
|---|---|
| Operating Parameter | Source |
| Case Model Number | Manufacture (User Input) |
| Defrost Schedule | System Controller |
| Discharge Air Temp Set Point | System Controller |
| Defrost Type | System Controller |
| Number of Defrosts per Day | System Controller |
| Discharge Air Temperature High Limit | System Controller |
| Defrost Termination Temp | System Controller |
| Network Address | Manufacture (User Input) |
| Number of Sensors | Internal Determination |
| EEPR Attached Y/N | Internal Determination |
| Number of Steps | Internal Determination |
| Failsafe EEPR Position | System Controller |
| Time and Date | System Controller |

The manufacture of each case enters a case model number into the respective BCMCC. The case module number identifies the case model attached to the case control module. Using the case model number, the rack PLC 720 can obtain information relating to the case. For example, based on the case module number, the system controller can obtain the specifications for the case. The rack PLC 720 communicates one or more operating parameters to the case control module. Additionally, the rack PLC 720 can create and provide one or more schedules to the case control module. The parameters provided from the rack PLC 720 to the case control module are identified in column two as "System Controller." Other parameters may be communicated from the rack PLC 720 to the case control module and not all parameters are required for the case control module in all constructions.

Referring again to Table 4, some of the parameters are established or calculated by the case control module. For example, the "number of sensors" parameter is an internal calculation performed by the case control module. For example and in one construction, the case control module polls for sensors connected to the module. Based on the response, the case control module can determine how many sensors are connected to the module. Other parameters determined internally at the control module include the parameters: "EEPR attached Y/N" and "number of steps." For the "EEPR Attached Y/N" parameter, the case control module polls whether an EEPR is attached to the case control module. The "number of steps" parameter is an internal calculation to determine the number of steps an attached stepper motor includes. This calculation is performed if the case includes an EEPR.

Referring again to Table 4, the parameter "Network Address" is identified as a manufacturer or user input. It should be noted that, for the construction shown in FIG. 7, the case control module communicates with the system controller, via the PC interface, on a RS-485 network using a modbus protocol. Therefore the network address is not an AS-i address.

With reference to FIG. 7, the fan control module (BCFCM) is a controller that activates/deactivates an attached fan. A table of the parameters for the fan control module is not provided because, for the construction shown, the BCFCM only activates or deactivates the fan. However, the rack PLC 720 communicates with the fan control module via the condenser slave module and AS-i master as shown in FIG. 7 and as described above. Therefore, address information is still communicated with the rack PLC 720 based on the principals described herein FIGS. 17–21 include five tables that represent the information communicated to and from the rack PLC 720. The table 1700 (FIG. 17) includes parameters associated with rack data. The table 1800 (FIG. 18) includes parameters associated with suction group data. The table 1900 (FIG. 19) includes parameters associated with compressor data. The parameters in table 1900 are repeated for each compressor of the refrigeration system. The table 2000 (FIG. 20) includes parameters associated with system data. The parameters in table 2000 are repeated for each system branch of the refrigeration system. The table in FIG. 2100 (FIG. 21) includes parameters associated with condenser data.

As discussed earlier, before the refrigeration system (e.g., system 700) can operate, the network needs to map (or identify) the components of the system before the components can communicate among themselves. That is, the addressing system for the components of the network needs to be in place before communication among the network can occur. The rack PLC 720 and/or the PC interface 714 initiate call signals or requests to determine what elements make up the communication network.

For example, the rack PLC 720 commands the attached AS-i master 722 to scan what is attached to the AS-i master 722. In response to call signals initiated by the AS-i master, each compressor control module 48 (or 1500), system branch module 724, and valve module 726 responds by communicating respective addresses to the AS-i master. Based on the result, the AS-i master 722 informs the rack PLC 720 how many modules are attached to the AS-i master 722 and provides addresses to the rack PLC 720 allowing the rack PLC 720 to communicate with the control modules via the AS-i master 722. Similarly, the rack PLC 720 and/or PC interface 714 obtains addressing information from the condenser slave controller 732, and third party controls 724 and 748. Additionally, the rack PLC 720 and/or PC interface 714 can obtain addressing information from the local HMI 754, remote HMI 752, wireless hub 713, local workstation 704, local network server 702, remote workstation 706, etc. The rack PLC 720 can then build a map of the refrigeration system 700 as a result of this information.

Once the communications network is established, the rack PLC 720 begins developing refrigeration system 700. In general, parameter information is communicated among components of the system, resulting in the rack PLC 720 configuring the system. The rack PLC 720 requests a module to identify the component (e.g., compressor, case, valve, condenser) attached to the module. For example, each component can provide a model or ID number identify the respective component. In response to receiving the information, the rack PLC 720 obtains information stored from memory. The information includes safety information, which is selectively shared with the appropriate module(s). The information also includes operation information (control parameters, schedules, etc.), which is also selectively communicated to the appropriate module(s). Further discussion about what how information is obtained, where information is communicated, and where information is stored is discussed in connection with FIG. 17–21.

With reference to tables 1700, 1800, 1900, 2000, and 2100, the first column in each table 1700–2100 relates the parameters associated with each data group. The second column of each tables 1700–2100 indicates the original source of the related parameter. The different types of original sources include an operator entering the data for the associated parameter (referred to as "operator input"), a network query from the system controller to a networked device (referred to as "network query"), a parameter received from a control module (referred to as "BCVCM," "BCSBM," "BCCSCM," "BCMCC," or "BCFCM"), a parameter calculated using one or more pieces of information already obtained (referred to as "calculated"), and a parameter obtained from memory (referred to as "case database" or a variation thereof). For example, the "rack name" parameter of the rack data table 1700 identifies the operator as providing the necessary information. The "number of systems (n)" parameter of the rack data table 1700 is obtained by the rack PLC 720 performing a network query to determine the number of branch systems attached to the rack PLC 720. The "main liquid valve type" parameter of the rack data table 1700 is obtained from the valve control module 726. The "suction pressure set point" parameter of the suction group data table 1800 is a calculated parameter based on refrigerant type and case discharge air set point. Equations known to one skilled in the art can be used to calculate the suction pressure set point. The "operating current data" parameter of the compressor data table 1900 is obtained from a database stored at the PC interface 714. Other parameters within the tables 1700–2100 are obtained using similar methods.

The data and/or information for each parameter is obtained sequentially and is obtained in approximately the order as shown in FIGS. 17–21. However, as also discussed, the order of obtaining the information can vary. Regardless of the order, tables 1700–2100 identify the parameters communicated to and from the rack PLC 720 for one configuration of the refrigeration system 700.

The third and fourth columns 1700–2100 identify whether the parameter is manually entered or automatically obtained.

The fifth column identifies where each parameter is stored, and identifies from where the parameter is initiated and to where the parameter is communicated. As used within tables 1700–2100, the symbol "C" identifies the parameter being stored at the PC interface 714. The symbol "P" identifies the parameter being stored at the rack PLC 720. The symbol "M" identifies the letter being stored at a device control module. The symbol "AM" identifies the parameter being stored at the AS-i master 722. The symbols ">" and "<" identify the flow of the communication (i.e., "source > destination" and from "destination < source").

For example, the "rack name" parameter of table 1700 is maintained at both the PC interface 714 and the rack PLC 720. Additionally, the rack name is originally entered at either the PC interface 714 or the system controller 720, and is subsequently communicated to the other processing units.

For another example, the "compressor model number" parameter originates at the compressor control module 48 (or 1500) and is communicated to the rack PLC 720. From the rack PLC, the compressor model number is communicated from the rack PLC 720 to the PC interface 714.

For yet another example, the "number of systems (n) parameter" parameter is obtained during a network query, and is communicated from the AS-i master 722 to either the PC interface 714 or the rack PLC 720 and then is shared to both the PC interface 714 and the rack PLC 720. Other parameters of tables 1700–2100 are communicated similarly. Before proceeding further, it should be noted that the tables 1700–2100 present one construction for the refrigeration system. The parameters used, the source of the parameters, how the information is obtained for each parameter, the storage location for each parameter, and how a parameter is calculated (if necessary) can vary for other constructions. Moreover, it is envisioned that not all of the parameter shown in tables 1700–2100 may be used and other parameters can be added. Also and as discussed earlier, while the rack PLC 720 and PC interface 714 are shown as separate components, it is envisioned that these components and/or functions performed by these components can be combined or divided differently. Therefore, other constructions of the refrigeration system can affect the tables 1700–2100.

The last column of each table 1700–2100 identifies the parameters necessary for calculating a value or limit.

Once the refrigeration system 700 is configured, the system can begin operation. Of course, one or more subsystems can begin operation (before operation of the refrigeration system as a whole) as the necessary information for operating the subsystem(s) is obtained at the subsystem(s). Once operation of the refrigeration system 700 begins, the system can perform a subsequent configuration. Reasons for a subsequent configuration include an alarm resulting in the deactivation of a device or subsystem, the operator changing the refrigeration system (e.g., adding a component such as adding a compressor), and the refrigeration performing a periodic update or review.

For example, if a compressor 14 is added or removed from the system 700, the operator can inform the rack PLC (e.g., via the PC interface 714) to perform a new configuration for the whole system. Alternatively, the operator can have the system controller update the existing configuration in view of the added component. As another example, the system can perform all of or a portion of the configuration process as part of a periodic maintenance program.

As yet another example, the system can perform all of or a portion of the configuration process when an alarm is detected at the component level. For example, the device controllers receive the safety parameters for the device. When a sensed value of a safety parameter is outside of a sensed limit, the device controller generates an alarm and deactivates the device. The alarm, the parameter causing the alarm, the value of the parameter, and the time and date of the alarm is communicated to the rack PLC. Upon receiving the alarm, the rack PLC 720 can perform all or a portion of the configuration process to update the system in view of the alarm. For example, if a compressor control module 48 (or 1500) detects an alarm condition, the rack PLC 720 can reconfigure the run pattern of the compressors 14 (discussed earlier) in view of the deactivation of the faulty compressor. Other aspects of the refrigeration system can be reconfigured when an alarm is generated by a device. That is, depending on the location of the error, the rack PLC 720 will reconfigure the appropriate operation for the component, related components, and/or related subsystems (generally referred to as applicable components), which relate to the alarm.

In another example, when a component does fail and require replacement, the replacement of the component may result in a new or different device controller being added to the system. The system controller identifies that a device controller has been removed and identifies a new controller has been installed. The new device controller may be the same type as the replaced controller. If the new component/controller is the same as the replaced component/controller, then the new device controller can be configured the same as the old controller. If the new/component controller is different than the replaced/component controller, then the system controller can reconfigure the portion of the refrigeration system including the new device controller. Additionally, the system controller can modify the control parameters of other modules/components to preempt a trending condition that could cause alarm in a single offending module.

Before proceeding further, it is envisioned that in one construction of the refrigeration system, the rack PLC 720 can detect the likelihood of an alarm not yet detected at the component level using data acquired from multiple systems. More specifically, the rack PLC 720 obtains acquired data from multiple devices. Based on acquired data from a first device, the rack PLC 720 can speculate eventual damage to a second device. The rack PLC 720 can generate an alarm condition resulting in the deactivation of the first and/or second device, reconfigure the refrigeration system, and communicate the alarm to the high-level devices.

It should also be noted that while operations of the system are described above, the order of operation could vary. That is, the refrigeration system is a complex system having many parameters (or variables), components, subsystems, etc. Because of the flexibility of the distributed system, a skilled artisan in the field of refrigeration can vary when various operations discussed herein are performed. Therefore, the invention is not limited to the order of operations discussed herein.

Figure 8:
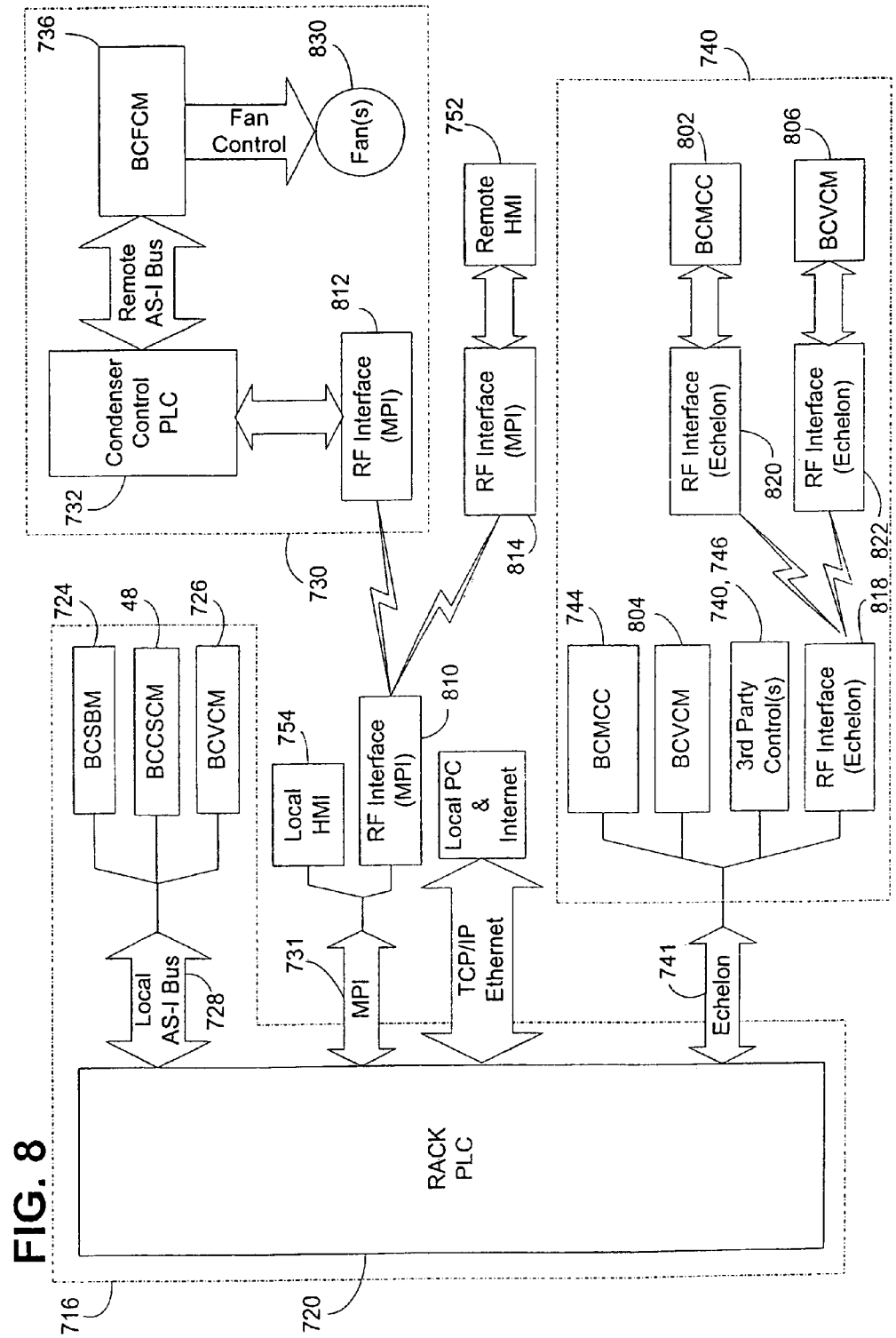
FIG. 8 is a block diagram illustrating aspects of a partially wireless configuration of the commercial refrigeration system of FIG. 7.

FIG. 8 is a block diagram of aspects of the integrated distributed intelligence control system of FIG. 7. FIG. 8 illustrates the use of wireless interfaces between the first field bus control network 716, the second field bus control network 730, and the third field bus control network 740. Further, FIG. 8 illustrates locating one or more case controllers (e.g., BCMCC 802) remote from communication bus 741. Finally, FIG. 8 also illustrates locating additional valve controllers (e.g., BCVCM 804, 806) on communication bus 741 and remotely.

In the partially wireless system depicted in FIG. 8, an MPI compatible RF interface is used to facilitate communications between rack PLC 720 and condenser PLC 732, and between rack PLC 720 and remote HMI 752. More particularly, rack PLC 720 communicates via a wire-based MPI interface 731 with a first MPI compatible RF transceiver 810. It is believed that DECT compliant devices (e.g., DECT Engine MD 32), available from Siemens, can be used to facilitate an MPI compatible wireless interface. A second MPI compatible RF transceiver 812 is associated with condenser PLC 732. Similarly, a third MPI compatible RF transceiver 814 is associated with remote HMI 752.

As explained above with regard to FIG. 7, it is preferable in some constructions to use a LonWorks® compatible bus system for the third field bus network 740. This is because such compatibility is believed to facilitate connectivity and interoperability with third party controls 746 and 748. Further, such a bus typically enjoys a range (i.e., the reliable length of the bus) that exceeds the recommended range of the AS-i standard. Accordingly, in the construction illustrated in FIG. 8, LonWorks® compatible RF interfaces 818, 820, and 822 are used for communications between rack PLC 720, remote case controller 802 (BCMCC 802) and remote valve controller 806 (BCVCM 806). More particularly, the RF interfaces 818, 820, and 822 comprise narrow band RF transceivers, such as RF to Twisted Pair Routers for LonWorks® (also referred to as an RF/TP-49 Router).

As can now be appreciated from the constructions illustrated in FIGS. 7 and 8, rack PLC 720 operates as a master device and communicates with various slave control devices via a plurality of network interfaces. For example, rack PLC 720 communicates with local device-level controllers (BCSBM 724, BCCSCM 48 (or 1500), and BCVCM 726) via local AS-i bus 728. Rack PLC 720 communicates with condenser PLC 732 to control fan controller (BCFCM 736) and fan(s) 830 via an MPI compatible RF interface comprising a hard wired MPI interface 731 between rack PLC 720, local RF interface 810, and remote RF interface 812. Rack PLC 720 communicates with case controllers BCMCC 744 and 802 via communication bus 741, and a wireless link established between RF interfaces 818 and 820. Likewise, rack PLC 720 communicates with valve controllers BCVCM 804 and 806 via communication bus 741, and a wireless link established between RF interfaces 818 and 822.

FIG. 9 is a block diagram of a bus compatible refrigeration branch control system 900, suitable for use as part of a refrigeration system, including the systems depicted in FIGS. 7 and 8. A refrigeration branch includes a number of refrigeration units (e.g., display cases, cold storage rooms, and the like) sharing a common closed-loop refrigeration control path. As illustrated construction of FIG. 9, the refrigeration branch control system 900 includes a Bus Compatible System Branch Module BCSBM 724, which is constructed and arranged for communication with rack PLC 720 via field bus control network 728 (e.g., a local AS-i bus). It should be understood that multiple BCSBMs could be employed in a refrigeration system having multiple refrigeration branches. For convenience, the operation of one construction of a bus compatible refrigeration branch control system (e.g., system 900) will be described with respect to a system having only a single refrigeration branch. It is also to be understood that the disclosure herein may be scaled to accommodate systems employing multiple refrigeration branches. The Appendix hereto identifies one hardware configuration for a BCSBM. Briefly stated, for the construction shown, the BCSBM comprises a processing capability and a data storage capability.

BCSBM 724 effects branch control by controlling the operation of a plurality of solid-state relay devices (SSRs). Such SSRs may include, for example, a suction stop SSR 902, a liquid line SSR 904, and a gas defrost SSR 906. In the construction illustrated in FIG. 9, BCSBM 724 individually controls each of the SSRs 902, 904, and 906. For example, BCSBM 724 controls the suction stop SSR 902 via a first defrost control signal 910. Similarly, BCSBM 724 controls the liquid line SSR 904 via a temperature/refrigeration control signal 912. BCSBM 724 also controls the defrost SSR 906 via a second defrost control signal 914. In one construction, each of these control signals 910, 912, and 914 comprises an on/off signal, directing the associated SSR to be either open circuited (non-conducting) or close circuited (conducting). It should be understood that each of the SSRs 902, 904, and 906 is connected to an associated control valve (valves not shown) such that when the corresponding control signal 910, 912, or 914 is asserted, the SSR conducts and the associated control valve is opened or closed, as appropriate. Finally, BCSBM 724 controls an electronic evaporator pressure regulator valve (EEPR valve) 920 associated with the refrigeration branch via a control line 922. Of course, other devices can be used in place of the SSRs.

Advantageously, the BCSBM 724 provides for distributed control of refrigeration and defrost cycles of an associated refrigeration branch. For example, in one construction, temperature control for a branch is achieved by positioning the associated EEPR valve 920. Case/fixture temperature(s) (e.g., discharge air temperature) is/are provided to rack PLC 720 by a bus compatible modular case control subsystem (e.g., BCMCC 744, which is described in greater detail below with respect to FIGS. 11–13). As such, the system does not require wiring a separate, additional temperature sensor for branch control because existing temperature data is made available to BCSBM 724 via BCMCC 744 and rack PLC 720. Based on the provided temperature information, rack PLC 720 transmits the desired set point to BCSBM 724 over local field bus network 728. BCSBM 724 then drives EEPR valve 920 to the desired setting via control line 922. In another construction, case temperature, door open/close, and defrost termination inputs are added to the BCSBM 724. This allows for operation of branch systems without the need of feedback from the BCMCC 744.

BCSBM 724 can also affect a degree of temperature control by cycling the liquid line solenoid via the liquid line SSR 904. In this regard, rack PLC 720, in one construction, receives discharge air temperature readings from one or more display cases being cooled by the refrigeration branch. Such temperature information originates from one or more bus compatible modular case controllers, as described below. Based on the received temperature information, rack PLC 720 provides liquid line commands to BCSBM 724 over local field bus network 728. BCSBM 724 thereafter cycles liquid line SSR 906 via temperature/refrigeration control line 912.

In another construction, case temperature, door open/close, and defrost termination inputs are added to the BCSBM 724. This allows for operation of branch systems without the need of feedback from the BCMCC.

Referring still to FIG. 9, BCSBM 724 can also be used for defrosting an evaporator coil associated with the refrigeration branch. For example, in one construction, rack PLC 720 determines the defrost scheduling for each branch. When a particular branch is scheduled to commence a defrost cycle, rack PLC 720 instructs BCSBM 724 to begin the defrost cycle. BCSBM 724 thereafter drives the first defrost control line 910 to cause the suction stop SSR 902 to operate the suction stop solenoid so as to cut off the refrigeration cycle. At or about the same time, BCSBM 724 also drives the second defrost control line 914 to cause the gas defrost SSR 906 to open a gas defrost solenoid that allows a gas (e.g., hot gas) to flow through the evaporator coil and through a check valve associated with the liquid line solenoid—in effect, operating the system in reverse. It is to be understood that the use of a hot gas defrost cycle reflects an exemplary construction only; the system can be employed with cool gas defrosting, electric defrosting, and other known methods of defrosting. When the defrost cycle is complete (which may be determined on the basis of time or temperature or other criteria), rack PLC 720 sends an appropriate message to BCSBM 724 to terminate the defrost cycle and begin a new refrigeration cycle.

At the end of a defrost cycle, it may be desirable to initiate a drip cycle in which condensate on the coil is allowed to drip off and flow out through a drain. If a drip cycle desired, rack PLC 720 sends an appropriate command to BCSBM 724 at the end of the defrost cycle. Rather than start a new refrigeration cycle, however, BCSBM 724 removes the second defrost control signal 914 thereby causing the gas defrost SSR 902 to open the gas defrost solenoid, while BCSBM 724 continues to apply the first defrost control signal 910 and maintain the suction stop solenoid in the closed position, via suction stop SSR 902. This continues until the drip cycle terminates.

Similarly, when a fixture/case associated with the refrigeration branch is being cleaned or subject to a maintenance action, it is not normally desirable to operate a refrigeration cycle. Therefore, in such a mode, rack PLC 720 sends a command to BCSBM 724, which causes suction stop SSR 902 to close the suction stop solenoid.

Referring still to FIG. 9, modular branch control system 900 provides, in one construction, a degree of back-up capability, thereby improving overall system robustness, should one or more components fail. For example, if communication with rack PLC 720 is lost, BCSBM 724 is constructed and configured so that it maintains the recent refrigeration and defrost set point and cycle information. Thus, the refrigeration branch remains operable despite the loss of communications with rack PLC 720. Also, when multiple branch control modules are employed to control multiple refrigeration branches, it is preferable that only one branch be in a defrost cycle at any given time. Normally, this scheduling is coordinated by rack PLC 720. In the event that communications with rack PLC 720 are lost, however, each branch controller preferably continue to operate on its prior schedule so that the defrost cycles continue to run at non-overlapping times, despite the loss of communications with rack PLC 720.

Figure 11:
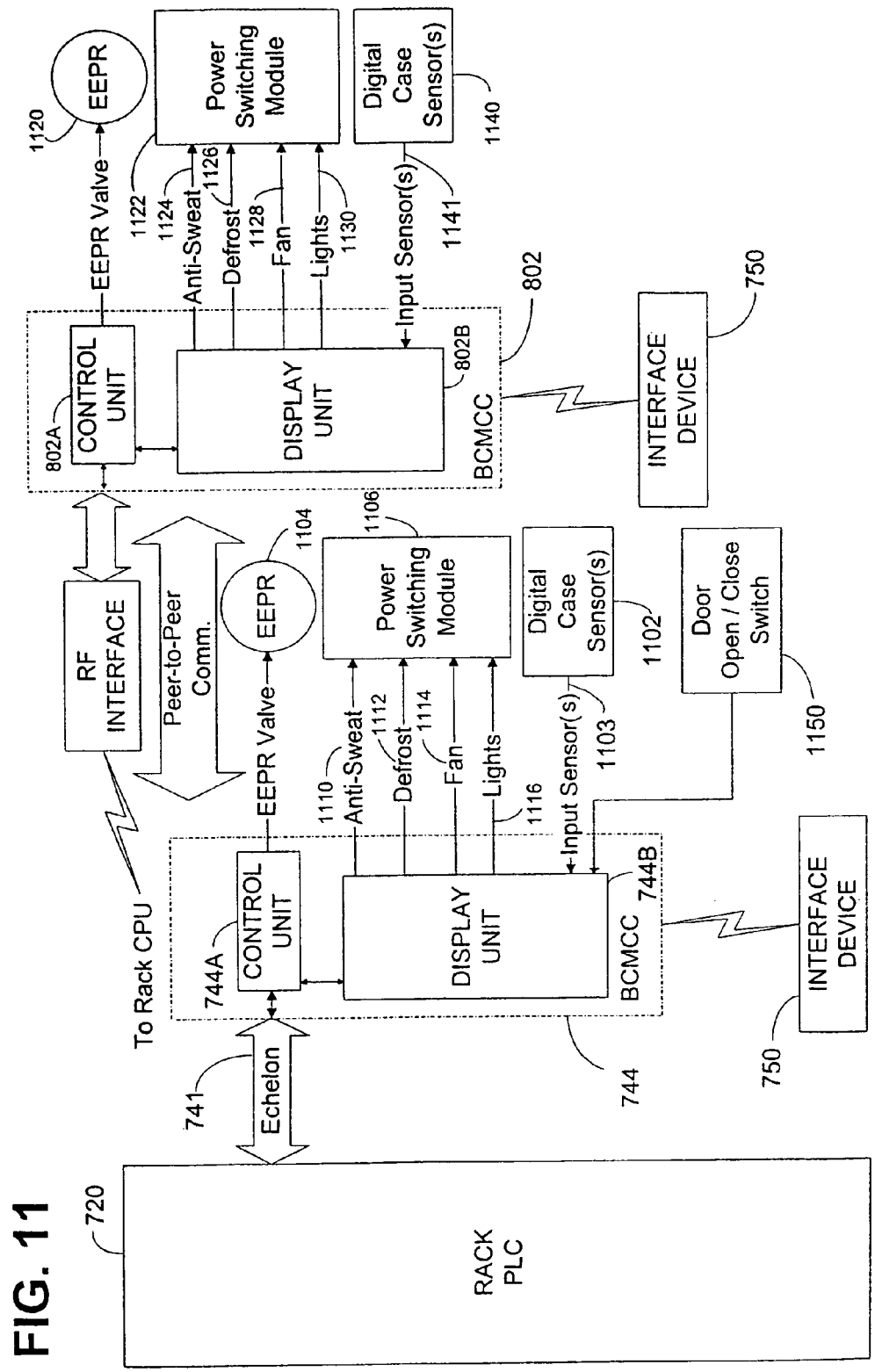
FIG. 11 is a block diagram that illustrates a system using modular case control modules to provide monitoring and control functions for a plurality of refrigeration display cases.

Similarly, if the temperature associated with one or more display cases in the branch is being controlled by a local case controller (e.g., a BCMCC as illustrated in FIG. 11) and that local case controller fails, BCSBM 724 can maintain a degree of temperature control by cycling liquid line SSR 904, in a manner similar to that described above.

FIG. 10 is a block diagram of a commercial refrigeration system that is compatible with the systems depicted in FIGS. 7 and 8, including multiple bus compatible valve controllers. The commercial refrigeration system illustrated in FIG. 10 includes one or more Bus Compatible Valve Control Modules (BCVCMs) 726, 804, and 806.

Each of the BCVCMs 726, 804, and 806 is constructed and arranged, in one configuration, to control an electronically controlled valve associated with the commercial refrigeration system. For a more specific construction, each BCVCM is constructed to receive at least one valve position signal and provide at least one valve drive signal. In one construction, each BCVCM provides a stepper drive output for driving a stepper-motor controlled valve. It is to be understood, however, that the system can be modified for use with other types of valves, such as solenoid controlled valves. A non-exhaustive list of the types of refrigeration system valves that may be controlled in accordance with the distributed intelligence control system include, for example, heat reclaim valves, electronic evaporator pressure regulator valves (e.g., EEPR valves using a stepper-motor rather than a solenoid valve), flooding valves, main liquid pressure reduction valves, receiver pressure regulator valves, surge receiver control valves, split condenser valves, defrost control valves, secondary cooling control valves, oil control and separation valves, and electronic expansion valves (e.g., in a display fixture or a subcooler). Other examples of systems and valves adapted to be controlled by the system may be found in U.S. Pat. Nos. 3,343,375, 4,478,050, 4,503,685, 4,506,523, 5,440,894, 5,743,102, 5,921,092, and 6,067,482, each of which is incorporated herein by reference. The Appendix hereto identifies one hardware configuration for a BCVCM.

The first BCVCM 726 will be used here as an example. As illustrated in FIG. 10, BCVCM 726 is configured to control an electronic expansion valve associated with a subcooler in a low temperature refrigeration branch. Those skilled in the art will recognize that subcoolers may be used to improve system efficiency by helping to shift some of the total system load from low temperature branches to medium or high temperature compressors. First BCVCM 726 communicates directly with rack PLC 720 via field bus control network 728 (e.g., a local AS-i bus) to control the operation of a first electronically controlled valve 1002. The first BCVCM 726 determines the position of the first electronically controlled valve 1002. This step is illustrated schematically as a line 1004 (see also lines 1014 and 1024). In one construction, no physical valve position feedback lines are required. Rather, each electronically controlled valve (e.g., valve 1002) is a stepper-motor controlled valve. The associated BCVCM determines valve position by keeping track of the number of steps the stepper motor has moved relative to a known reference point (i.e., zero point). In order to maintain control, the BCVCM periodically calibrates the valve position by temporarily returning to the reference point and moves the valve to the last commanded position (step) relative to the reference point. With the current position of the valve known, first BCVCM 726 provides the valve position information to rack PLC 720 via control network 728. Similarly, rack PLC 720 provides a desired valve position signal to first BCVCM 726 via control network 728. Upon receipt of the desired position information, first BCVCM 726 provides a valve drive signal to the first electronically controlled valve 1002, via line 1006, to position the valve in the desired position.

The operation and control of the second BCVCM 804, a second valve 1012, and lines 1014 and 1016 is substantially similar to the operation of the first BCVCM 726. The second BCVCM 804 illustrated in FIG. 10, however, is not located on field bus control network 728. Rather, BCVCM 804 is located at a position sufficiently remote from rack PLC 720 to require a different bus, such as field control bus 741 (e.g., a LonWorks®/Echelon bus). Likewise, the third BCVCM 806 operates substantially similarly to the first and second BCVCMs 726 and 804, except that BCVCM 806 communicates with rack PLC 720 via a wireless RF interface (as also illustrated in FIG. 8).

As can now be appreciated, employing valve controllers such as BCVCMs 726, 804, and 806 facilitates distributed control of the total refrigeration system and minimizes the amount of high power wiring required to provide integrated control of a plurality of system valves.

It should be understood that while FIG. 10 illustrates a system having three BCVCMs—BCVCM 726 located on a local AS-i bus, BCVCM 804 located on bus having a relatively longer distance capability (e.g., control bus 741), and BCVCM 806 located on an RF compatible bus—the system is not limited to such an arrangement. Rather, a BCVCM may be used with each motor-driven valve requiring independent monitoring and control. Examples of such motor driven valves are provided in the Appendix.

FIG. 10A is an exemplary schematic of a construction related to peer-to-peer control/communication. More particularly, FIG. 10A illustrates peer-to-peer communications between a case controller configured as a fixture/display monitor (e.g., BCMCC 744; see also FIGS. 11–13) and a valve controller configured to control an evaporator valve associated with a subcooler on a low temperature refrigeration branch. A liquid temperature probe (e.g., digital case sensor 1102) is installed at the inlet to each expansion valve or, alternatively, at the liquid line inlet to each case/fixture lineup (not shown). The liquid line probe provides digital temperature data to the case controller (BCMCC 744), which provides the temperature data to rack PLC 720. Rack PLC 720 supplies an evaporator valve control command to the valve controller (BCVCM 726) which causes the valve controller to drive valve 1002 to the desired position. Alternatively, the valve controller can be programmed to determine the correct position of valve 1002 based on temperature data passed to it by case controller 744, via rack PLC 720.

Figure 12:
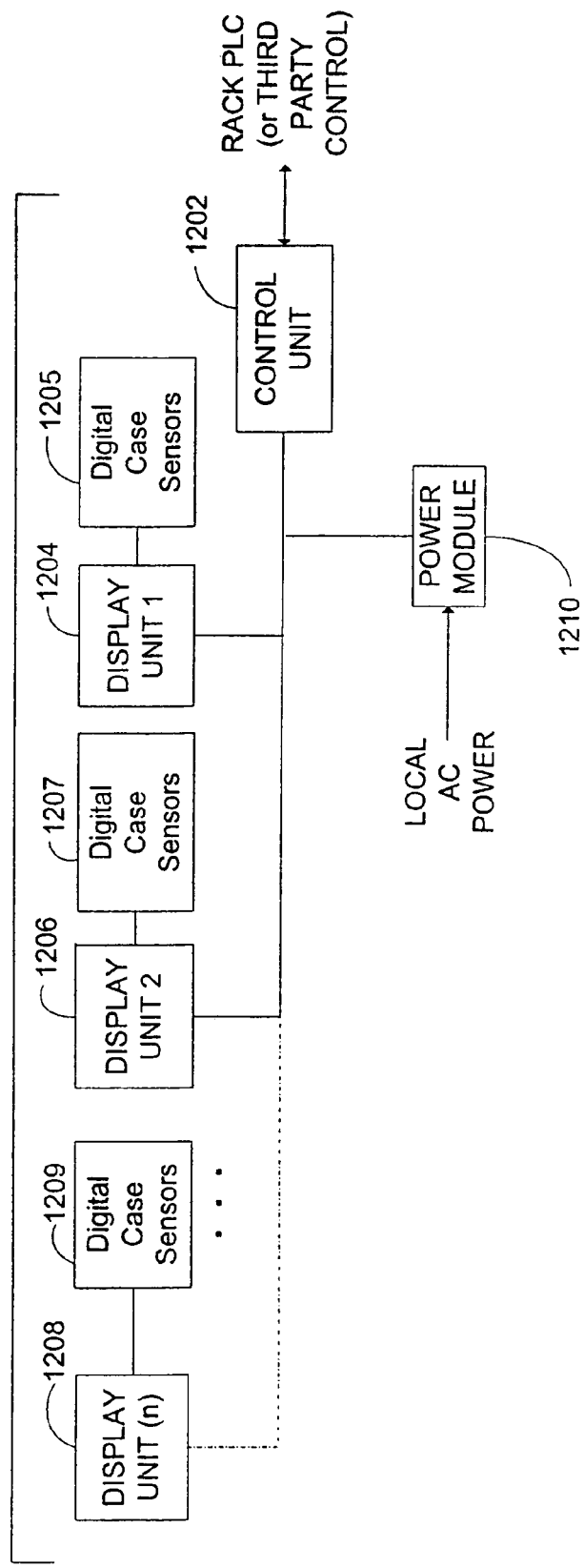
FIG. 12 is a block diagram that illustrates the use of a modular case controller configured for display case monitoring.
Figure 13:
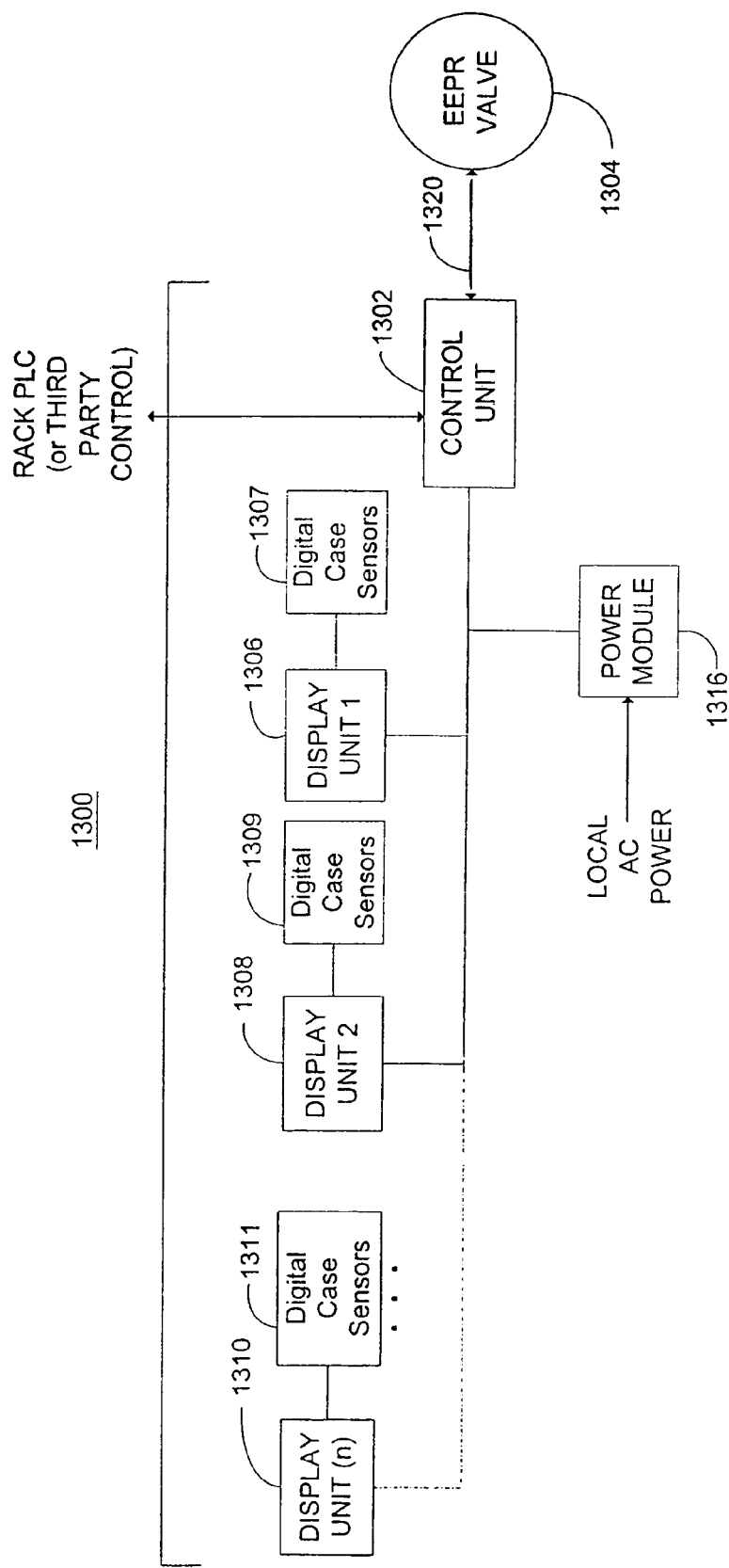
FIG. 13 is a block diagram that illustrates the use of a modular case controller to provide branch control for a plurality of display cases configured in a refrigeration branch.

FIGS. 11–13 are block diagrams of aspects of a commercial refrigeration system according to FIGS. 7 and 8, including various system configurations providing bus compatible modular case monitoring and/or control. Briefly stated, FIG. 11 illustrates a system using bus compatible modular case controller (e.g., BCMCCs 744 and 802) to provide case monitoring and control functions for a plurality of refrigeration display cases (not shown in FIG. 11). Similarly, FIG. 12 illustrates a modular case control system 1200 configured to provide case monitoring information for use by a system controller, such as, rack PLC 720, or third party controller 746 (FIG. 7). Finally, FIG. 13 illustrates the use of a modular case control system 1300 to provide branch control for a plurality of display cases comprising a refrigeration branch.

Referring now to FIG. 11, a first BCMCC 744 is constructed and arranged to communicate with rack PLC 720 via control bus 741 (e.g., a LonWorks®/Echelon bus as shown in FIG. 7). A second BCMCC 802 is constructed and arranged to communicate with rack PLC 720 via a wireless RF interface (see also FIG. 8). It should be understood that FIG. 11 is provided for exemplary purposes only; a given commercial refrigeration installation may include one or a plurality of BCMCCs, each having either a hard wired or wireless interface with a controller such as rack PLC 720 or third party controller 746.

Each BCMCC, in one construction, comprises a control unit (also referred to as a control module) and, possibly, one or more display units (also referred to as display modules). The control unit is responsible for network communications (e.g., control unit 744A communicates with rack PLC 720 via control bus 741). The control unit also includes a stepper drive output for controlling an EEPR valve. The display unit receives sensor data from one or more associated sensors and controls the power switching of various fans, anti-sweat heaters, lights, and defrost heaters via an associated power switching module. As will be made clear by reference to FIGS. 12 and 13 below, one control unit can control multiple display units via a serial link. For example, in one construction, one control unit is capable of interfacing with up to eight distinct display units. Thus, although FIG. 11 illustrates a configuration having one display unit per control unit, such a configuration is not required by the refrigeration system. Each control unit and display unit, in one construction, includes a data processing capability, as well as a data storage capability.

Using BCMCC 744 as an example, a display unit 744A receives temperature information from one or more digital case sensors 1102. In one construction, the digital case sensors 1102 are constructed such that they are individually addressed and provide case temperature data to BCMCC 744 in digital form over a single wire harness 1103. For example, a plurality of digital case sensors 1102 provide digital temperature data with respect to each display case controlled by BCMCC 744. It is to be appreciated that one or more digital case sensors 1102 may be used with each case. Display unit 744B provides the digital temperature data to control unit 744A. Control unit 744A supplies the temperature data to rack PLC 720 via control bus 741. Rack PLC 720 uses the temperature data, along with other system information, to determine appropriate display case control activities. Further, based on system data, including this temperature data, rack PLC 720 determines an appropriate set point. The desired set point is transmitted to control unit 744A, which adjusts the EEPR valve 1104 accordingly. Rack PLC 720 also determines when a particular case requires a defrost action, fan control action, or lighting action. Using case lighting as an example, rack PLC 720 preferably determines when a particular case is to be illuminated and provides an appropriate command to control unit 744A, which relays the command to display unit 744B. Display unit 744B asserts a signal on line 1116 to cause a power switching module 1106 (also referred to as a power module) to activate the light(s) of the associated case(s). Similar control actions are taken for defrost cycling (via line 1112) and fan control (via line 1114). Anti-sweat control actions (e.g., for anti-sweat heaters associated with display fixtures having reach-in doors) are also accommodated by the display unit and power switching module. It is noted, however, that many newer display fixtures do not require complicated anti-sweat controls.

Advantageously, each power module (e.g., power module 1106) can also serve as a local source of power for each BCMCC (including both the control module and the display module). For example, local AC power (not shown) is supplied to BCMCC 744. Power module 1106 converts the local AC power to DC power for use by BCMCC 744. Accordingly, the only wiring used to interface between a BCMCC with other devices in the control system (e.g., rack PLC 720) is relatively low power signal wire, some of which may be replaced by wireless interfaces, as explained herein.

When a BCMCC (e.g., BCMCC 744) is configured to control the power switching of display case activities (e.g., anti-sweat, defrost, fan, or lights), a separate power module (e.g., power module 1106) is, in one construction, provided with each display unit, as shown in FIG. 11. If, however, a BCMCC is not used to control power switching of display case activities, only a single power module is used for each control unit associated with the particular BCMCC. This aspect of the system is illustrated in greater detail with respect to FIGS. 12 and 13 below.

Although in the constructions illustrated in FIGS. 7, 8, and 11 each BCMCC is ultimately controlled by a master controller (e.g., rack PLC 720), one or more BCMCCs in a given refrigeration control system can optionally be configured for peer-to-peer control/communication. Hence, multiple BCMCCs can share temperature data, time data, defrost scheduling data, and the like to improve system efficiency. For example, by sharing information regarding defrost timing, each BCMCC on a given circuit can wait until all displays finish defrosting before starting a refrigeration cycle. By sharing information, such as current defrost status information, each BCMCC is capable of initiating coordinated defrost cycles to maintain minimum refrigeration load requirements and/or ensure sufficient defrost gas (for gas defrost systems).

Advantageously, using the present modular case control system also improves total system fault tolerance. In the event of a network failure, such as the loss of communications with rack PLC 720, each BCMCC is, in one construction, configured to revert to an internal schedule and attempt to provide temperature control by determining the appropriate setting of its corresponding EEPR valve. Using BCMCC 744 of FIG. 11 to illustrate this aspect, if communication with rack PLC 720 is lost, BCMCC 744 attempts to maintain display case(s) temperature at the most recent set point by internally determining a desired setting for EEPR valve 1104. Similarly, display unit 744B continues to provide power switching control for display case activities on an internally derived schedule.

An interface device 750 (e.g., a wireless device using an IR interface) supplies a capability to read and set case/fixture specific data. As described above with respect to FIG. 7, interface device 750 comprises a remote keypad for use with display unit 744B to access temperature data and/or to input set point data. Thus, it is possible to input and monitor set point data and other data associated with a display case using a BCMCC without the use of a master system controller, such as rack PLC 720. It should be understood, however, that when a master controller is present, such controller would preferably override any user set points entered via interface device 750.

Optionally, each display unit (e.g., display unit 744B) can receive one or more general purpose switch inputs. For example, a door open/closed input 1150 can be supplied to display unit 744B when the display unit is used with a walk-in freezer. Display unit 744B could use the door open/closed input 1150 as an indication to turn off the fan(s) (via line 1114 and power switching module 1106) whenever the door is open. Likewise, if door open/closed input 1150 may be used to set an alarm condition, including an audible alarm, if a door is left open longer than a threshold time (e.g., 5 minutes). Other possible switch inputs include a defrost temperature probe (not shown) that provides a discrete switch signal at a preset temperature, indicating that a defrost cycle may be terminated.

Referring still to FIG. 11, the operation of BCMCC 802 is substantially similar to that of BCMCC 744. The primary difference between BCMCC 744 and BCMCC 802 is that the latter illustrates the possibility of using a wireless RF interface for communications between rack PLC 720 and BCMCC 802.

FIG. 12 illustrates the use of a modular case control system (BCMCC 1200) configured to provide fixture/case monitoring capabilities, but not case control capabilities. In describing FIG. 12, other advantageous aspects of modular case monitoring and control using a BCMCC will become apparent. The BCMCC 1200 is arranged to receive sensor data from a plurality of digital case sensors (1205, 1207, and 1209) via a plurality of display units (e.g., display units 1204, 1206, and 1208) over a common digital data transmission channel/line 1212. Such sensor data, in one construction, comprises digital temperature data, as described above with regard to FIG. 11. A single power module 1210, provides power to a single control unit 1202, as well as to all associated display units (1204, 1206, and 1208) and the sensors (1205, 1207, and 1209). Each display unit associated with BCMCC 1200 provides the sensor data to the control unit 1202. Thus, only one control unit is needed to interface with a plurality of display units in the configuration illustrated in FIG. 1. The control unit 1202 supplies the sensor data received from the display units to rack PLC 720 or, alternatively, a third party controller (e.g., third party control 746 of FIG. 7). Rack PLC 720 can use this information to control, among other things, a compressor (e.g., using BCCSCM 48), a branch valve (e.g., using BCSBM 724), another system valve such as an EEPR valve (e.g., using BCVCM 726), or a condenser (e.g., using BCFCM 736), to achieve temperature control of the cases associated with system 1200.

The configuration illustrated in FIG. 12 can also be used to illustrate another example of how peer-to-peer communication and control are made possible by the use of the distributed intelligence control system. An associated digital case sensor can determine the discharge air temperature of each case being monitored by BCMCC 1200. In other words, the discharge air temperature of a first display case in a fixture lineup is monitored by a first digital case sensor (e.g., one of sensors 1205) and provided to control unit 1202 by the first display unit 1204. Differences between control units and display units are discussed above with respect to FIG. 11. Similarly, the discharge air temperature of the second display case is monitored by a second digital case sensor (e.g., one of sensors 1207) and provided to control unit 1202 by the second display unit 1206. This process is repeated for each display unit in the lineup. Control unit 1202 provides the discharge air temperature data to rack PLC 720 over the control network. Rack PLC 720 uses this temperature data to control a liquid line solenoid, via a branch control module (e.g., BCSBM 724) as described above with respect to FIG. 9 to achieve temperature control for the case lineup associated with system 1200.

Another of the many advantages of the distributed intelligence control system can be appreciated by reference to the modular case monitoring system illustrated in FIG. 12. A single control unit 1202 can be used to monitor a plurality of display units (e.g., display units 1204, 1206, and 1208), but each of the displays/fixtures associated with such display units need not necessarily be on the same refrigeration branch. For instance, if display units 1204 and 1206 are associated with fixtures on a low temperature branch and display unit 1208 is associated with a fixture on another branch, each branch can operate on separate (preferably non-overlapping) defrost schedules (which in the case monitoring configuration illustrated in FIG. 12 can be controlled at the rack by a branch control module or a valve control module). Because the system uses distributed intelligence, control unit 1202 receives information from rack PLC 720 to allow each display to correctly reflect the defrost status of the branch with which it is associated. Thus, using the example above, if the low temperature branch were in a defrost cycle, display units 1204 and 1206 would display a status message indicating as such, while display unit 1208 would continue to display present case temperature information. Accordingly, high degrees of case monitoring and display granularity are maintained despite the fact that only one control unit is used.

FIG. 13 is a block diagram that illustrates a branch control system using a modular case control system 1300 for branch control functions. As illustrated in FIG. 13, the BCMCC 1300 includes a control unit 1302 controlling a plurality of display units 1306, 1308, and 1310. A power module 1316 provides a local source of power for BCMCC 1300. The control unit 1302 receives control commands from rack PLC 720 or, alternatively, a third party controller. Control unit 1302 also determines valve position information from an EEPR valve 1304 and provides stepper motor commands to position the EEPR valve 1304 in accordance with commands from rack PLC 720 (or third party controller). In one construction, control unit 1302 determines the valve position of EEPR valve 1304 by monitoring the number of steps applied and comparing that number to a known starting reference. Periodically, the stepper motor may be "re-zeroed" to ensure proper control. When using a BCMCC to provide branch control, the EEPR valve is, in one construction, located with the display case(s) rather than at the main rack with the rack PLC 720. Conversely, when branch control is achieved using a branch control module (e.g., BCSBM 724 of FIG. 9) or a valve control module (e.g., BCVCM 726 of FIG. 10), the EEPR valve is, in one construction, located at the main rack with rack PLC 720.

Referring still to FIG. 13, a commercial refrigeration branch can include one or more display cases associated with the display units 1306, 1308, and 1310. A central controller, such as rack PLC 720, maintains branch control by monitoring various parameters associated with the refrigeration system. Such parameters can include, for example, temperature data, compressor data, suction data, and the like. In the branch control system 1300 of FIG. 13, branch control is maintained by controlling the position of EEPR valve 1304. More particularly, rack PLC 720 determines desired set points (e.g., discharge temperature) for the case lineup associated with BCMCC 1300. Control unit 1302 receives the set point information over the control network and determines the appropriate position for EEPR valve 1304 to achieve the desired set point(s). In particular, control unit 1302 includes a stepper motor drive output connected to EEPR valve 1304 via line 1320. Hence, upon receipt of the desired set point from rack PLC 720, control unit 1302 determines the correct valve position and drives EEPR valve 1304 to the desired position, thereby achieving the desired branch control function.

FIG. 13 can also be used to illustrate another example of how peer-to-peer control/communication is available with the distributed intelligence refrigeration control system. If the discharge, suction, or motor temperatures are high in every compressor and the valve open positions according to the modular case controllers in the system (e.g., BCMCC 1300) are not fully opened, the compressor controller (e.g., BCCSCM of FIG. 7) sends a signal to the respective control units (e.g., control unit 1302), via rack PLC 720, to open the valves (e.g., EEPR valve 1304). If successful, such control action(s) reduce internal compressor temperatures and improve efficiency and compressor life expectancy. Similarly, if compressor temperatures are lower than expected (indicating, perhaps, a potential flood back condition that could damage or ruin a compressor), the compressor controller will search the system, via rack PLC 720, to determine which EEPR valves may be open too far. Thereafter, the valves can be sequentially closed by sending commands to the respective control units (e.g., control unit 1302), via rack PLC 720.

It should be understood, that the BCMCC 1300 illustrated in FIG. 13 could be modified to provide single case control as well. In other words, BCMCC 1300 could be configured to provide complete branch control, or single case control. It should further be understood that one or more of the display units 1306, 1308, or 1310 can be configured to provide power switching control in a manner described above with respect to FIG. 11. In such a configuration, a power module would be required for each display unit that provides power switching control (see FIG. 11).

As has been explained above, one of the advantages of the distributed intelligence control system is the ease with which such system is installed at a user site. The modular case control concept, exemplary configurations of which are depicted in FIGS. 11–13, illustrates this point further. For example, each display unit (e.g., display units 1204, 1206, 1208 of FIG. 12 or 1306, 1308, 1310 of FIG. 13) is, in some constructions, automatically addressed by its associated control unit (e.g., control unit 1202 in FIG. 12 or control unit 1302 in FIG. 13). In other words, upon installation of the system, the control unit automatically determines how many display units are present, as well as their address/location. More specifically, the control unit automatically determines how many display units are attached. The display units are, in one construction, connected in serial fashion (a serial communication link from the control unit to the first display unit, and then out of the first display unit and into the second display unit, and so on).

In one construction, each display unit has the ability to disable communications with all other display units that are "downstream" of it on the serial communication channel/link. After power up, all of the display units on a particular link are sent a command to disable their individual communications outputs. At this point, only the control unit and the first display unit are communicating; remaining display units are "cut off." In this way, the control module (e.g., control unit 1202 in FIG. 12) can now uniquely associate a first address with the first display unit (e.g., display unit 1204 in FIG. 12). After the first display unit is addressed, the control unit instructs this first addressed display unit to turn on its communications output, thereby re-connecting the second display unit (e.g., display unit 1206 in FIG. 12) to the link. Now the control module can uniquely associate an address with the second display unit. This process is repeated until all display units are addressed (e.g., until a communications failure occurs indicating no more displays are present).

Further, each display unit, in one construction, polls each digital case sensor (e.g., sensor 1102 of FIG. 11) associated with that display unit to determine the location of the sensors and type, thereby associating a unique identification/address for each such sensor. The sensor location and type information is forwarded to the control unit associated with that display unit. In one construction, each digital case sensor to be used in a given case/fixture is configured in a wire harness prior to installation. Each sensor, in one construction, includes a memory (e.g., an EEPROM) that is preprogrammed with a number that uniquely identifies the type of sensor (e.g., discharge air temperature, return air temperature, inlet temperature, outlet temperature, product temperature, and so on), as well as the location in the case in which it will be installed (e.g., left side, center, right side). In this way, the system is automatically configured upon installation, and end users and system installers are not presented with the complexity of programming/addressing the system at installation time. The digital case sensors are preferably located to provide temperature information that facilitate specific control functions. Such sensors include, for example, discharge air temperature sensors, return air temperature sensors, product temperature sensors, inlet and outlet refrigeration line temperature sensors, and defrost terminate sensors (e.g., sensors located on the evaporator or in the airstream).

Figure 14:
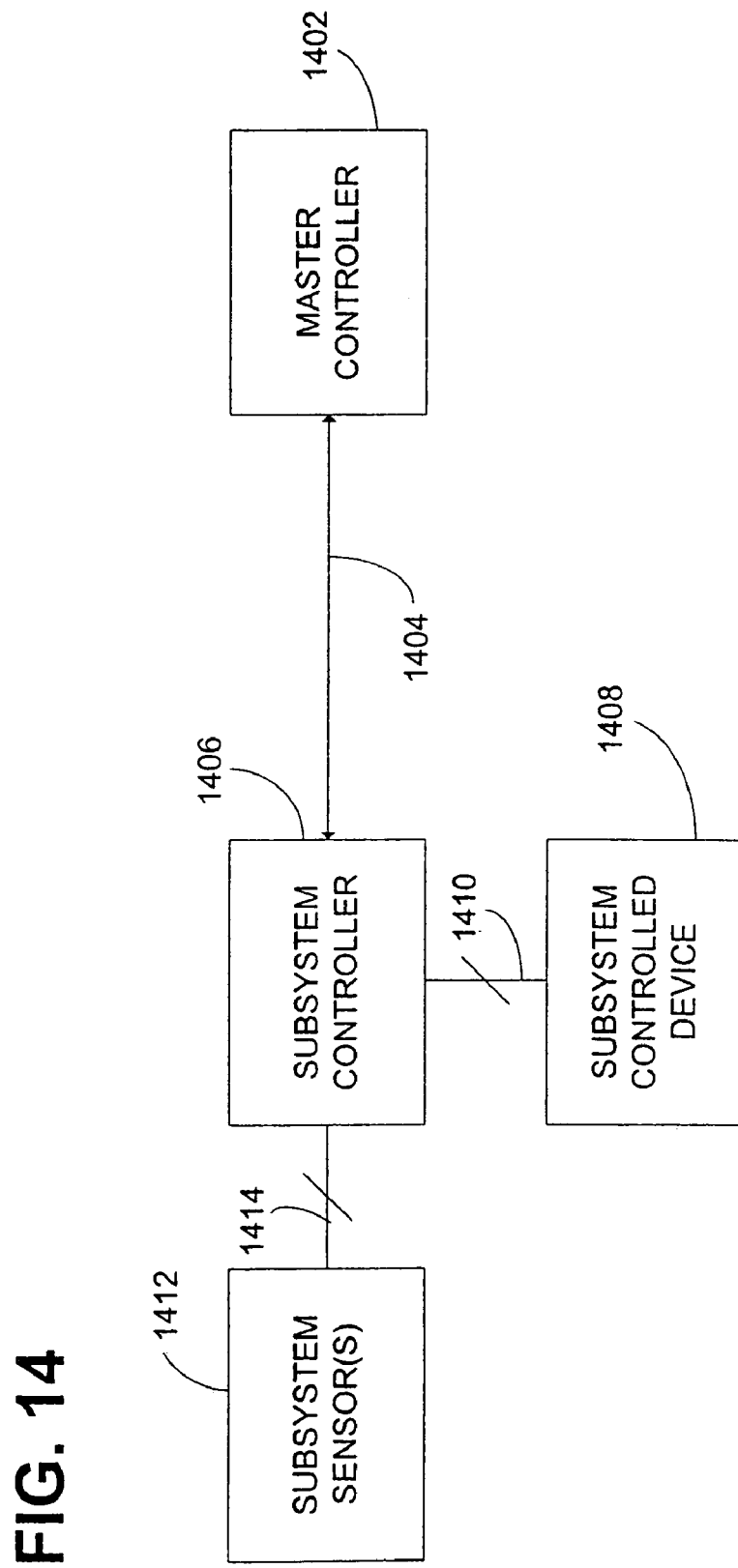
FIG. 14 is a block diagram illustrating the reduced wiring requirements associated with using a distributed intelligence refrigeration control system.

FIG. 14 is a block diagram that helps to illustrate several of the many advantages of using a distributed intelligence refrigeration control system. FIG. 14 is described by way of a specific example including a fixture using modular case control (see FIGS. 11–13). This description is for illustrative purposes only, and should not be construed as limiting the scope of the invention.

A master controller 1402 (e.g., rack PLC 720) communicates with a subsystem controller 1406 (e.g., BCMCC 744) over a communication channel 1404. For one construction, the only wiring between the master controller 1402 and the subsystem controller 1406 is the communication channel 1404; no separate power wiring between them is required. Hence, master controller 1402 and subsystem controller 1406 receive power locally, thereby reducing the installation complexity of the system. Indeed, if communication channel 1404 is a wireless channel, no wiring is required between master controller 1402 and subsystem controller 1406.

Each subsystem controller 1406 in the system is, in one configuration, constructed and arranged to operate one or more subsystem controlled devices 1408 (e.g., an EEPR valve, a solenoid valve, a solid state relay, a power switch, and the like) over one or more control lines 1410. Thus, where multiple wiring runs may be necessary to provide specific control actions, only local wiring is required. In other words, long runs of control wiring are not required between the master controller and the subsystem control device. For example, an EEPR valve associated with a fixture line up is controlled locally; there is no direct control wiring between the EEPR control valve and the master controller.

Similarly, some subsystem controllers in the system are constructed and arranged to receive sensor input data, at a local level, from subsystem sensors 1412 over one or more sensor data busses 1414. For example, a plurality of subsystem sensors 1412 (e.g., digital case sensors 1307 of FIG. 13) provide case temperature data with respect to a plurality of case monitoring locations. In this example, subsystem sensors 1412 are constructed and arranged to communicate with subsystem controller 1406 (e.g., display unit 1306) over a sensor data bus 1414 (e.g., a single twisted pair communication bus). Subsystem controller 1406 transmits the sensor data to master controller 1402 over communication channel 1404 (e.g., display unit 1306 transmits the data to control unit 1302, which transmits the data to rack PLC 720). Thus, master controller 1402 receives remote sensor data without the need for installing complicated and lengthy wiring between master controller 1402 and the remotely located subsystem sensors 1412.

An Appendix hereto includes a series of tables that provide additional information regarding specific aspects of one construction of a commercial refrigeration control.

It is to be understood that the foregoing description, the accompanying figures, and the Appendix have been given only by way of illustration and example, and that changes and modifications in the present disclosure, which will be readily apparent to all skilled in the art, are contemplated as within the scope of the invention, which is limited only by the scope of the appended claims. For example, as explained herein, certain constructions are described with respect to a multiport (MPI) interface for use with serial, digital communications. Those skilled in the art having the benefit of the present disclosure should understand that other field bus configurations may be used, such as ProfiBUS. ProfiBUS is a published standard, and MPI uses RS-485 at the hardware level but uses a proprietary data protocol from Siemens. Both MPI and ProfiBUS can be implemented in hard wired, wireless, or partially wireless configurations. The use of the term hardwired is intended to include fiber optic systems.

Furthermore, although multiple constructions have been described, in part, in terms of bus systems using serial communication standards, the invention can be enjoyed using serial and/or parallel bus structures.

It should also be understood that while aspects of the invention are disclosed in terms of commercial refrigeration display cases, the invention is not so limited. For example, the embodiments disclosed and described herein may be used in other commercial refrigeration applications such as, for example, cold storage rooms (e.g., meat lockers) and the like, as well as industrial, institutional, and transportational refrigeration systems and the like. Accordingly, the specific structural and functional details disclosed and described herein are provided for representative purposes and represent the preferred embodiments.

Further, for purposes of disclosing the numerous constructions, various features have been described by reference to specific terms, such as BCCSCM, BCSBM, BCVCM, and BCMCC. While these terms have been used to ensure disclosure of the numerous constructions, they are the exclusive intellectual property of the assignee of the present application.

In view of the above, it will be seen that the above constructions provide a wide variety of features and results. Manufacturing costs are reduced due to the use of fewer materials and components, as compared to non-networked refrigeration systems. Similarly, fabrication and installation is simplified due to the elimination of high voltage wiring, typically required by prior art systems. The use of modularity allows for standardized manufacturing techniques, while still accommodating customer requirements, such as interfacing with third party control and monitoring devices over standardized communication interfaces. Such improvements in manufacturing, fabrication, and installation also translate into improved system serviceability. The increased granularity of the system resulting from using a distributed control architecture increases the fault tolerance of the system. Implementing the system using optional wireless communication links (e.g., via RF links) where relatively large distances exist between networked components eliminates the cost for installing hardwired links. Such optional wireless links, by their nature, provide improved damage resistance from external problems such as lightening strikes, high voltage arcing, or high current transmission in adjoining equipment and wiring.

APPENDIX

Table 5 provides an overview of an exemplary preferred hardware and network connection set for several components of a refrigeration system suitable for use according to the invention illustrated and discussion herein.

| Device | Target Platform | Network Connections |
| --- | --- | --- |
| Rack PLC | Siemens S7-300 CPU314 | AS-i; LonWorks ®/Echelon; TCP/IP; MPI |
| Condenser PLC | Siemens S7-300 CPU314 | MPI; AS-i |
| Remote HMI | Siemens TP170A | MPI |
| Local HMI | Siemens OP3 | MPI |
| BCCSCM | Atmel AT90S2813 | AS-i |
| BCSBM | Siemens 4 Out AS-i Module | AS-i |
| BCVCM | Atmel AT9052813 | AS-i; LonWorks ®/Echelon |
| BCFCM | AMI S4 AS-i ASIC | AS-i |
| BCMCC | Echelon Neuron | LonWorks ®/Echelon |

-continued

| Device | Target Platform | Network Connections |
|---|---|---|
| Local Workstation | Windows NT | TCP/IP |

Table 6 provides an overview of an exemplary set of preferred input/output (I/O) devices controlled by rack PLC 720 according to the present invention.

| I/O Specifications | | |
|---|---|---|
| Controlled Devices | Max. Network | I/O Device |
| Compressors | 16 AS-i | BCCSCM |
| System Valves (Motor Actuated) | 256 LonWorks ®/Echelon | BCVCM |
| System Valves (Solenoid Actuated) | 64 AS-i | BCSBM |
| Case Lighting Circuits | 32 AS-i | AS-i 4 Out |
| Condenser Fans | 16 MPI | Condenser PLC |
| Satellite Compressor | 2 AS-i | BCCSCM |
| Suction Groups | 4 N/A | N/A |

Table 7 identifies a preferred set of analog inputs, with exemplary ranges, for use by rack PLC 720 to provide refrigeration control in accordance with the invention.

| Analog Inputs | | | | |
|---|---|---|---|---|
| Input | Range | Max. | Network | I/O Device |
| Ambient Temperature | −40°–120° | 1 | MPI | Condenser PLC |
| Liquid Line Temperature | −40°–120° | 1 | Local | S7 Analog I/O |
| Heat Reclaim Pressure | 0–500 PSI | 2 | Local | S7 Analog I/O |
| Receiver Level | 0%–100% | 1 | Local | S7 Analog I/O |
| System Case Temperature | −40°–120° | 256 | LonWorks/Echelon | BCMCC |
| Suction Pressure | 0–200 PSI | 32 | AS-i | BCCSCM |
| Suction Temperature | −40°–120° | 32 | AS-i | BCCSCM |
| Discharge Pressure | 0–500 PSI | 32 | AS-i | BCCSCM |
| Discharge Temperature | 0°–275° | | AS-i | BCCSCM |
| Compressor Motor Current | 2–100 | 1 per compressor | AS-i | BCCSCM |

Table 8 identifies a preferred set of analog inputs, with exemplary ranges, for use by rack PLC 720 to provide refrigeration control in accordance with the invention.

| Digital Inputs | | | | |
|---|---|---|---|---|
| Input | Range | Max. | Network | I/O Device |
| System Defrost Termination Bi-Metal Thermostat | True/False | 32 | AS-i | BCSBM |
| Heat Reclaim Status | True/False | 1 | Local | S7 Digital I/O |
| Compressor Phase Reversal | True/False | 32 | AS-i | BCCSCM |
| Compressor Phase Loss | True/False | 32 | AS-i | BCCSCM |
| Compressor Internal Protect Fail | True/False | 32 | AS-i | BCCSCM |
| Compressor Run Time | 0–99999 | 32 | AS-i | BCCSCM |
| Compressor Oil Fail | True/False | 32 | AS-i | BCCSCM |
| EEPR Valve Position | 0%–100% | 256 | LonWorks/Echelon | BCVCM |

Table 9 identifies a preferred set of capacity-related control functions associated with rack PLC 720.

| Capacity Control | |
|---|---|
| Compressor Cycling Methods | Control Parameter |
| First On First Off | Suction Pressure   Suction Pressure Reset |
| Programmed Sequence (Uneven Comp. capacity) | |
| Real Time Sequence Reconstruction | |
| Other Capacity Control | |
| PWM Control | Pressure/Temperature |
| Unloader support | Pressure/Temperature |
| Variable Speed Drive control | Pressure/Temperature |
| Satellite Control | Pressure/Temperature |

Table 10 identifies a preferred set of system branch control functions associated with rack PLC 720.

| System Branch Control | | |
|---|---|---|
| Defrost | | Case Temperature Control |
| Scheduling/ Initiation Termination | TOD Clock Time Temperature/ Bimetal Thermostat | Liquid Line Solenoid Ctrl   EEPR Suction Ctrl |
| Drip Cycle (User selectable duration) | | |
| Defrost Types | | Case Lighting |
| Electric | Heater Ctrl Branch Liquid Line Ctrl | TOD Control |
| Gas | Liquid Line Ctrl | |
| Off Time | Branch Liquid Line Ctrl | |

EEPR = Electronic Evaporator Pressure Regulator

Table 11 identifies a preferred set of refrigeration system valve and condenser control functions associated with rack PLC 720.

| Valve Control | | |
|---|---|---|
| | Control Parameter | |
| Flooding Valve Control | | |
| Motor Driven | Receiver Level | Discharge Pressure |
| Solenoid Actuated | Receiver Level | Discharge Pressure |
| Heat Reclaim Lockout control | | |
| Solenoid Actuated Main Liquid Valve | Discharge Pressure | H.R. Coil Pressure |
| Motor Driven | Discharge Pressure | Receiver Pressure |
| Solenoid Actuated Receiver Pressure Regulator | Pressure/ Temperature | |
| Motor Driven Auto Surge Valve | Discharge Pressure | Receiver Pressure |
| Motor Driven Split Condenser Valve | Discharge Pressure/Condenser Fan History | |
| Solenoid Actuated/Motor Driven | | |

-continued

| Valve Control | |
|---|---|
| Function | Condenser Control |
| Fan Cycling | Discharge Pressure/Liquid Refrigerant Temp. |
| Condenser Split | Discharge Pressure/Outdoor Ambient Temp. |

Tables 12 and 13 identify a preferred set of alarm conditions for the refrigeration system controlled by rack PLC 720. Table VIIIA identifies conditions having separate alarms associated with hi conditions and low conditions. Table VIIIB identifies conditions having a single system alarm. Both Table VIIIA and VIIIB identify, whether the condition is logged, whether the condition is displayed in real time, a preferred minimum update interval (MUI), and the accuracy of the measured condition.

| Monitoring and Alarm | | | | | | | |
|---|---|---|---|---|---|---|---|
| Label | Source | Hi Alarm | Lo Alarm | Data Log | RT Disp | MUI | Acc. |
| Suction Pressure | BCCSCM | Yes | Yes | Yes | Yes | .5 sec | .1 PSI |
| Suction Temp | BCCSCM | Yes | Yes | Yes | Yes | .5 sec | .5° |
| Discharge Pressure | BCCSCM | Yes | Yes | Yes | Yes | .5 sec | 1 PSI |
| Discharge Temp | BCCSCM | Yes | Yes | Yes | Yes | .5 sec | 1° |
| Case Temp | BCMCC/ Local I/O | Yes | Yes | Yes | Yes | .5 sec | .5° |
| Ambient Temp | Condenser PLC | N/A | N/A | Yes | Yes | .5 sec | .5° |
| Liquid Line Temp | Local I/O | N/A | N/A | Yes | Yes | .5 sec | 1° |
| Receiver Pres. | Local I/O | N/A | N/A | Yes | Yes | .5 sec | 1 PSI |
| Receiver Level | Local I/O | Yes | Yes | Yes | Yes | .5 sec | 1% |
| Liquid Pres. | Local I/O | | N/A | Yes | Yes | .5 sec | 1 PSI |
| Motor Current | BCCSCM | Yes | Yes | Yes | Yes | .5 sec | ±2A |
| Label | Source | System Alarm | Data Log | RT Disp | MUI | Acc. | |
| Def/Ref Status | Internal Clock | N/A | Yes | Yes | N/A | N/A | |
| Oil Fail | BCCSCM | Yes | Yes | N/A | .5 sec | N/A | |
| Phase Loss | BCCSCM | Yes | Yes | N/A | .5 sec | N/A | |
| Phase Reversal | BCCSCM | Yes | No | N/A | .5 sec | N/A | |
| Comp Internal | BCCSCM | Yes | Yes | N/A | .5 sec | N/A | |
| Heat Reclaim I.O. | Local I/O | N/A | N/A | Yes | .5 sec | N/A | |
| Heat Reclaim Stat. | HVAC Input | N/A | Yes | Yes | .5 sec | N/A | |
| Auto Surge Valve Stat* | BCVCM | N/A | Yes | Yes | .5 sec | .1% | |
| Main Liq. Line Pres. | BCVCM | N/A | Yes | Yes | .5 sec | | |
| Differential Valve | | | % Pos | % Pos | | | |

-continued

Monitoring and Alarm

| | | | | | | |
|---|---|---|---|---|---|---|
| Split Cond Stat | Internal | N/A | Yes | Yes | .5 sec | N/A |
| Flooding Valve Stat | BCVCM | N/A | Yes % Pos | Yes % Pos | .5 sec | .1% |
| Receiver Pres Reg. | BCVCM | N/A | Yes | Yes | .5 sec | .1% |
| All Comp Off | Internal | Yes | N/A | N/A | N/A | N/A |
| Cond Fan Status | Internal | N/A | Yes | Yes | .5 sec | N/A |

Table 14 illustrates aspects of a preferred embodiment of a local HMI device 754, suitable for use in the commercial refrigeration systems depicted in FIGS. 7 and 8.

Hardware Detail

| Siemens TP 170A | Siemens Part No. |
|---|---|
| TP 170A | 6AV6545-0BA15-2AX0 |

I/O Specifications

| Controlled Devices | Range | Max. | Network | I/O Device |
|---|---|---|---|---|
| Alarm Output | N/A | 1 | N/A | N.O. Relay |

Functions

| System Configuration | Status Display |
|---|---|
| Site Layout | Refrigeration Status |
| Branch System Configuration | Branch System Status |
| Refrigeration Configuration | Alarm Status |
| Alarm Configuration | Condenser Status |
| Data Logging Configuration | Site Status |
| Diagnostic Display | Maintenance Display |
| Historical Graphing | I/O Forcing |
| Real Time Graphing | Run Time Meter Maintenance |
| Alarm History | Set Clocks |
| User Logs | Clear History |

Table 15 illustrates aspects of a preferred embodiment of a remote HMI device 752, suitable for use in the commercial refrigeration systems depicted in FIGS. 7 and 8.

Hardware Detail

| Siemens OP3 | Siemens Part No. |
|---|---|
| TP 170A | 6AV6545-0BA15-2AX0 |

I/O Specifications

| Controlled Devices | Range | Max. | Network | I/O Device |
|---|---|---|---|---|
| Alarm Output | N/A | 0 | N/A | N.O. Relay |

Functions

| System Configuration | Status Display |
|---|---|
| Local Branch System Configuration | Refrigeration Status |
| Local Refrigeration Configuration | Branch System Status |
| Rack Alarm Configuration | Alarm Status |
| | Condenser Status |
| Diagnostic Display | Maintenance Display |
| Alarm History | I/O Forcing |
| | Run Time Meter Maintenance |
| | Set Clock |
| | Clear History |

Various features and advantages of the invention are set forth in the following claims.

What is claimed is:

1. A method of controlling a refrigeration system comprising
   one or more evaporators,
   a suction header in fluid communication with the one or more evaporators,
   a first compressor comprising a first low side suction input in fluid communication with the suction header and a first high side discharge outlet,
   a second compressor comprising a second low side suction input in fluid communication with the suction header and a second high side discharge outlet,
   a condenser in fluid communication with the first and second high side discharge outlets and the one or more evaporators,
   one or more controllers operable to control the first and second compressors,
   a first sensor coupled to the first compressor, the first sensor being operable to acquire a parameter for the first compressor, the parameter being selected from the group consisting of discharge pressure, discharge temperature, suction pressure, and suction temperature,
   a second sensor coupled to the second compressor, the second sensor being operable to acquire the parameter for the second compressor, the method comprising the acts of:
   providing the refrigeration system;
   acquiring a value for the parameter with each sensor; and
   determining if any of the sensors is faulty including comparing the acquired values.

2. A method as set forth in claim 1 wherein each sensor is coupled to the respective compressors to sense a suction pressure, and wherein the acquired parameter is suction pressure.

3. A method as set forth in claim 1 wherein each sensor is coupled to the respective compressors to sense a suction temperature, and wherein the acquired parameter is suction temperature.

4. A method as set forth in claim 1 wherein each sensor is a dual pressure/temperature sensor and is coupled to the respective compressors to sense a suction pressure and a suction temperature, and wherein the acquired parameter is suction pressure.

5. A method as set forth in claim 1 wherein each sensor is a dual pressure/temperature sensor and is coupled to the respective compressors to sense a suction pressure and a suction temperature, and wherein the acquired parameter is suction temperature.

6. A method as set forth in claim 1 wherein each sensor is coupled to the respective compressors to sense a discharge pressure, and wherein the acquired parameter is discharge pressure.

7. A method as set forth in claim 1 wherein each sensor is coupled to the respective compressors to sense a discharge temperature, and wherein the acquired parameter is discharge temperature.

8. A method as set forth in claim 1 wherein each sensor is a dual pressure/temperature sensor and is coupled to the respective compressors to sense a discharge pressure and a discharge temperature, and wherein the acquired parameter is discharge pressure.

9. A method as set forth in claim 1 wherein each sensor is a dual pressure/temperature sensor and is coupled to the respective compressors to sense a discharge pressure and a discharge temperature, and wherein the acquired parameter is discharge temperature.

10. A method as set forth in claim 1 wherein the determining act further includes determining a sensor is faulty when a sensor does not communicate a signal to the one or more controllers.

11. A method as set forth in claim 1 wherein at least one of the sensors is a digital sensor, and wherein the determining act further includes determining a sensor is faulty when the digital sensor communicates an error code to the one or more controllers.

12. A method as set forth in claim 1 wherein the method further comprises the acts of controlling the operation of the first and second compressors with the one or more controllers based in part on the acquired values, the controlling act includes discounting the acquired value of a faulty sensor.

13. A method as set forth in claim 12 wherein the method further includes utilizing an acquired value from one of the non-faulty sensors in place of the acquired value of the faulty sensor.

14. A method of controlling a refrigeration system comprising
an evaporator, compressor, and condenser in fluid communication,
a system controller operable to control the refrigeration system,
a compressor controller in communication with the system controller, the compressor controller operable to control the compressor and including a digital sensor that senses at least one of a pressure and temperature of the compressor, the method comprising the acts of:
providing the refrigeration system;
receiving an error code at the compressor controller from the digital sensor; and
determining the digital sensor is faulty upon receiving the error code.

15. A method as set forth in claim 14 and further comprising the act of communicating the error code to the system controller.

16. A method as set forth in claim 14 and further comprising the act of communicating to the system controller that the digital sensor is faulty.

17. A method as set forth in claim 14 wherein the compressor further includes a low side suction input in fluid communication with the evaporator and a high side discharge outlet in fluid communication with the condenser, and wherein the digital sensor senses at least one of discharge pressure, discharge temperature, suction pressure, and suction temperature.

18. A method as set forth in claim 17 wherein the digital sensor is a dual pressure/temperature sensor.

19. A method as set forth in claim 18 wherein the digital sensor senses a discharge pressure, and a discharge temperature.

20. A method as set forth in claim 19 wherein the digital sensor senses a suction pressure, and suction temperature.

21. A refrigeration system as set fourth in claim 17 wherein the sensing device generates an analog signal representing a sensed parameter and the (A/D) converter converts the analog signal to a serial digital signal.

22. A method of controlling a refrigeration system comprising
an evaporator, compressor, and condenser in fluid communication,
a case cooled by the evaporator,
a system controller operable to control the refrigeration system,
a case controller in communication with the system controller, the case controller operable to control the case and including a digital sensor that senses at least the temperature of the case, the method comprising the acts of:
providing the refrigeration system;
receiving an error code at the case controller from the digital sensor; and
determining the digital sensor is faulty upon receiving the error code.

23. A method as set forth in claim 22 and further comprising the act of communicating the error code to the system controller.

24. A method as set forth in claim 22 and further comprising the act of communicating to the system controller that the digital sensor is faulty.

25. A method as set forth in claim 22 wherein the digital sensor is a dual pressure/temperature sensor.

26. A method of controlling a refrigeration system comprising
one or more evaporators,
a suction header in fluid communication with the one or more evaporators,
a compressor comprising a low side suction input in fluid communication with the suction header and a high side discharge outlet,
a condenser in fluid communication with the high side discharge outlet and the one or more evaporators,
one or more controllers operable to control the compressor,
a first sensor coupled to the compressor, the first sensor being operable to acquire a suction pressure for the compressor,
a second sensor coupled to the suction header, the second sensor being operable to acquire the suction pressure for the suction header, the method comprising the acts of:
providing the refrigeration system;
acquiring a value with each sensor; and
determining if any of the sensors is faulty including comparing the acquired values.

* * * * *